US012633519B2

(12) United States Patent
Thackeray et al.

(10) Patent No.: US 12,633,519 B2
(45) **Date of Patent: *May 19, 2026**

(54) CATHODE MATERIALS FOR USE IN LITHIUM CELLS AND BATTERIES

(71) Applicant: UCHICAGO ARGONNE, LLC, Chicago, IL (US)

(72) Inventors: Michael M. Thackeray, Naperville, IL (US); Eungje Lee, Naperville, IL (US); Jason R. Croy, Plainfield, IL (US); Boyu Shi, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 690 days.

This patent is subject to a terminal disclaimer.

(21) Appl. No.: 18/075,023

(22) Filed: Dec. 5, 2022

(65) Prior Publication Data

US 2023/0108813 A1     Apr. 6, 2023

Related U.S. Application Data

(63) Continuation-in-part of application No. 17/351,944, filed on Jun. 18, 2021, now abandoned, which is a
(Continued)

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/485* (2013.01); *H01M 4/505* (2013.01); *H01M 4/525* (2013.01);
(Continued)

(58) Field of Classification Search
CPC ...... H01M 4/364; H01M 4/485; H01M 4/505; H01M 4/525; H01M 10/0525; H01M 2004/021; H01M 2004/028
See application file for complete search history.

(56) References Cited

U.S. PATENT DOCUMENTS

| | | | |
|---|---|---|---|
| 5,153,081 | A | 10/1992 | Thackeray et al. |
| 5,160,712 | A | 11/1992 | Thackeray et al. |

(Continued)

FOREIGN PATENT DOCUMENTS

| | | |
|---|---|---|
| WO | 2012067675 | 5/2012 |

OTHER PUBLICATIONS

Thackeray, M. M., Spinel Electrodes For Lithium Batteries, Journal of the American Ceramic Society, vol. 82 (12), 3347-3354 (1999).
(Continued)

*Primary Examiner* — Armindo Carvalho, Jr.
(74) *Attorney, Agent, or Firm* — Olson & Cepuritis, Ltd.

(57) ABSTRACT

A composite electrode active material is described herein, which comprises two or more electrode active materials blended or structurally-integrated together, in one of the materials is a lithiated spinel selected from the group consisting of (a) a lithiated spinel of formula $LiMn_xNi_yM_zO_2$; wherein M comprises at least one metal cation other than manganese and nickel cations; x+y+z=1; 0<x<1.0; 0<y<1.0; 0≤z≤0.5; and the ratio of x:y is in the range of about 1:2 to about 2:1; and (b) a lithiated spinel of formula $LiM^1O_2$, wherein $M^1$ comprises a combination of Mn and Ni transition metal ions in a ratio of Mn to Ni ions of about 2:1 to about 1:1.

36 Claims, 20 Drawing Sheets

Related U.S. Application Data continuation-in-part of application No. 17/313,752, filed on May 6, 2021, now abandoned, which is a continuation-in-part of application No. 17/136,234, filed on Dec. 29, 2020.

(60) Provisional application No. 63/286,251, filed on Dec. 6, 2021, provisional application No. 63/055,993, filed on Jul. 24, 2020.

(51) Int. Cl.
| | |
|---|---|
| *H01M 4/485* | (2010.01) |
| *H01M 4/505* | (2010.01) |
| *H01M 4/525* | (2010.01) |
| *H01M 10/0525* | (2010.01) |

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 5,316,877 | A | 5/1994 | Thackeray et al. |
| 5,981,106 | A | 11/1999 | Amine et al. |
| 6,482,374 | B1 | 11/2002 | Kumar et al. |
| 6,555,269 | B2 | 4/2003 | Cho et al. |
| 6,677,082 | B2 | 1/2004 | Thackeray et al. |
| 6,680,143 | B2 | 1/2004 | Thackeray et al. |
| 6,878,487 | B2 | 4/2005 | Cho et al. |
| 6,916,580 | B2 | 7/2005 | Cho et al. |
| 6,984,469 | B2 | 1/2006 | Kweon et al. |
| 7,087,348 | B2 | 8/2006 | Holman et al. |
| 7,138,209 | B2 | 11/2006 | Kweon et al. |
| 7,303,840 | B2 | 12/2007 | Thackeray et al. |
| 7,314,682 | B2 | 1/2008 | Thackeray et al. |
| 7,384,664 | B2 | 6/2008 | Desten et al. |
| 7,445,871 | B2 | 11/2008 | Suh et al. |
| 7,468,223 | B2 | 12/2008 | Thackeray et al. |
| 7,635,536 | B2 | 12/2009 | Johnson et al. |
| 7,790,308 | B2 | 9/2010 | Johnson et al. |
| 7,927,506 | B2 | 4/2011 | Park |
| 7,935,270 | B2 | 5/2011 | Park |
| 8,080,340 | B2 | 12/2011 | Thackeray et al. |
| 8,808,912 | B2 | 8/2014 | Thackeray et al. |
| 9,070,489 | B2 | 6/2015 | Sharma et al. |
| 10,714,745 | B2 | 7/2020 | Lu et al. |
| 2001/0046628 | A1 | 11/2001 | Oesten et al. |
| 2003/0108790 | A1 | 6/2003 | Manthiram et al. |
| 2005/0026040 | A1 | 2/2005 | Thackeray et al. |
| 2005/0153206 | A1 | 7/2005 | Oesten et al. |
| 2006/0099508 | A1* | 5/2006 | Thackeray ............ H01M 4/505 429/223 |
| 2006/0216605 | A1 | 9/2006 | Shirakata et al. |
| 2009/0136839 | A1 | 5/2009 | Kraznov et al. |
| 2009/0224212 | A1 | 9/2009 | Manthiram et al. |
| 2010/0086853 | A1 | 4/2010 | Venkatachalam et al. |
| 2010/0190058 | A1 | 7/2010 | Thackeray et al. |
| 2010/0207577 | A1 | 8/2010 | Sugiyama et al. |
| 2012/0263998 | A1 | 10/2012 | Thackeray et al. |
| 2013/0078518 | A1 | 3/2013 | Thackeray et al. |
| 2014/0127398 | A1 | 5/2014 | Thackeray et al. |
| 2015/0180032 | A1 | 6/2015 | Thackeray et al. |
| 2019/0207214 | A1* | 7/2019 | Thackeray ........ H01M 10/0525 |

OTHER PUBLICATIONS

Thackeray, M.M., Lithium Insertion Into Manganese Spinels, Mat. Res. Bull., vol. 18, 461-472 (1983).

Thackeray, M., The Need For New Lithium-Ion Battery Materials, The 25th International Battery Seminar & Exhibit, Fort Lauderdale, Florida, Mar. 2008.

Thackeray, M.M. et al., Integrated Electrode Structures for Lithium-Ion Batteries, International Workshop on Fundamentals of Lithium-Based Batteries, Schloss Ringberg, Tegernsee, Germany, Nov. 2008.

Thackeray, M.M. et al., Advances in Manganese-Oxide 'Composite' Electrodes for Lithium-Ion Batteries, Journal of Materials Chemistry 15, 2257-2267 (2005).

Thackeray, M.M., Structural Considerations of Layered and Spinel Lithiated Oxides for Lithium Ion Batteries, Journal of The Electrochemistry Society 142 (8), 2558-2563 (1995).

Thackeray, M.M. et al., Li2MnO3-Stablized LiMO2 (M=Mn, Ni, Co) Electrodes for Lithium-Ion Batteries, Journal of Materials Chemistry 17, 3112-3125 (2007).

Van Der Ven, A. et al., Ordering in Lix(Ni0.5Mn0.5)O2 and Its Relation to Charge Capacity and Electrochemical Behavior In Rechargeable Lithium Batteries, Electrochemistry Communications 6, 1045-1050 (2004).

Ward, R.M. et al., Olivine Composite Cathode Materials For Improved Lithium Ion Battery Performance, U.S. Department of Energy, Journal of Undergraduate Research, vol. 6 (91), 2006.

Winter et al., What are Batteries, Fuel Cells and Supercapacitors? Chemical Reviews 104, 4245-4269 (2004).

Wu, Y. et al., Surface Modification of High Capacity Layered Li[Li0.2Mn0.54Ni0.13Co0.13]O2 Cathodes by AlPO4, Journal of The Electrochemical Society 155 (9), A635-A641, (2008).

Yang, J. et al., Synthesis and Characterization of Carbon-Coated Lithium Transition Metal Phosphates LiMPO4 (M=Fe, Mn, Co, Ni) Prepared Via A Nonaqueous Sol-Gel Route, Journal of The Electrochemical Society 153 (4), A716-A723 (2006).

Yang, J. et al., Intergrown LiNi0.5Mn1.5O4.LiNi⅓Co⅓Mn⅓O2 Composite Nanorods as High-Energy Density Cathode Materials for Lithium-Ion Batteries, Journal of Materials Chemistry A, 1, 13742-13745 (2013).

Meng, Y.S. et al., Cation Ordering in Layered O3 Li[NixLi⅓−2x/3Mn⅔−x/3]O2 (0≤x≤½) Compounds, Chemical Materials 17, 2386-2394 (2005).

Ohzuku, T. et al., Layered Lithium Insertion Material of LiNi½Mn½O2: A Possible Alternative to LiCoO2 for Advanced Lithium-Ion Batteries, Chemistry Letters, 744-745 (2001).

Amatucci, G. et al., Optimization of Insertion Compounds Such as LiMn2O4 for Li-Ion Batteries, Journal of the Electrochemical Society, 149 (12), K31-K46, (2002).

Amine, K. et al., A New Three-Volt Spinel Li1+xMn1.5Ni0.5O4 for Secondary Lithium Batteries, Journal Electrochemical Society, vol. 143, (5), 1607-1613 (1996).

Arora, P. et al., Battery Separators, Chemical Reviews 104 (10), 4419-4462 (2004).

Arunkumar, T.A. et al., Influence of Lattice Parameter Differences on the Electrochemical Performance of the 5 V Spinel LiMn1.5−yNi0.5−zMy+zO4 (M=Li, Mg, Fe, Co, and Zn), Electrochemical and Solid State Letters, vol. 8, (8), A403-A405 (2005).

Belharouak, I. et al., Identification of LiNi0.5O4 Spinel in Layered Manganese Enriched Electrode Materials, Electrochemistry Communications 13, 232-236 (2011).

Cabana, J. et al., Structural and Electrochemical Characterization of Composite Layered-Spinel Electrodes Containing Ni and Mn for Li-Ion Batteries, Journal of The Electrochemical Society 156 (9), A730-A736 (2009).

Cabana, J. et al., Structural Complexity of Layered-Spinel Composite Electrodes for Li-Ion Batteries, J. Mater. Res. 25 (8), 1601-1616 (2010).

Chen, Z. et al., Effect of a ZrO2 Coating on the Structure and Electrochemistry of LixCoO2 When Cycled to 4.5 V, Electrochemical and Solid State Letters, 5 (10), A213-A216, (2002).

Cho, J. et al., Novel LiCoO2 Cathode Material with Al2O3 Coating For A Li Ion Cell, Chemistry of Materials 12, 3788-3791, (2000).

Cho, J. et al., High-Performance ZrO2-Coated LiNiO2 Cathode Material, Electrochemical and Solid-State Letters, 4 (10), A159-A161, (2001).

Choi, W. et al., Superior Capacity Retention Spinel Oxyfluoride Cathodes for Lithium-Ion Batteries, Electrochemical and Solid State Letters, 9 (5), A245-A248 (2006).

Croy, J. R., et al., Designing High-Capacity, Lithium-Ion Cathodes Using X-ray Absorption Spectroscopy, Chemistry of Materials 23, 5415-5424 (2011).

(56) References Cited

OTHER PUBLICATIONS

Croy, J. R. et al., Li2MnO3-Based Composite Cathodes for Lithium Batteries: A Novel Synthesis Approach and New Structures, Electrochemistry Communications 13, 1063-1066 (2011).

Gu, Y. et al., A New "Zero-Strain" Material For Electrochemical Lithium Insertion, Journal of Materials Chemistry A, 1, 6550-6552 (2013).

Gummow, R.J. et al., Improved Capacity Retention in Rechargeable 4 V Lithium/Lithium-Manganese Oxide (Spinel) Cells, Solid State Ionics 69, 59-67 (1994).

Gummow, R.J. et al., A Reinvestigation of the Structures of Lithium-Cobalt-Oxides With Neutron-Diffraction Data, Mat. Res. Bull. 28 (11), 1177-1184 (1993).

Gummow, R.J. et al., Spinel Versus Layered Structures for Lithium Cobalt Oxide Synthesised at 400° C, Mat. Res. Bull. 28 (3), 235-246 (1993).

Gummow, R.J. et al., Characterization of LT-LixCo1−yNiyO2 Electrodes for Rechargeable Lithium Cells, Journal of The Electrochemical Society 140 (12) 3365-3368 (1993).

Gummow, R.J. et al., Lithium-Cobalt-Nickel-Oxide Cathode Materials Prepared at 400° C for Rechargeable Lithium Batteries, Solid State Ionics 53-56, 681-687 (1992).

Gummow, R.J. et al., Structure and Electrochemistry of Lithium Cobalt Oxide Synthesised at 400° C, Mat. Res. Bull. 27 (3), 327-337 (1992).

Jafta, C.J. et al., Microwave-Assisted Synthesis of High-Voltage Nanostructured LiMn1.5Ni0.5O4 Spinel: Tuning the Mn3+ Content and Electrochemical Performance, ACS Applied Materials and Interfaces, vol. 5, 7592-7598 (2013).

Johnson, C.S. et al., Lithium-Manganese Oxide Electrodes with Layered-Spinel Composite Structures xLi2MnO3•(1−x)Li1+yMn2−yO4 (0<x<1, 0≤y≤0.33) for Lithium Batteries, Electrochemistry Communications 7, 528-536 (2005).

Johnson, C.S. et al., Anomalous Capacity and Cycling Stability of xLi2MnO3 • (1−x)LiMO2 Electrodes (M=Mn, Ni, Co) In Lithium Batteries at 50° C, Electrochemistry Communications 9, 787-795 (2007).

Johnson, C.S. et al., The Significance of the Li2MnO3 Component In 'Composite' xLi2MnO3.(1−x)LiMn0.5Ni0.5O2 Electrodes, Electrochemistry Communications 6, 1085-1091 (2004).

Kang, S.H. et al., Layered Li(Li0.2Ni0.15+0.5zCo0.10Mn0.55−0.5z)O2−zFz Cathode Materials for Li-ion Secondary Batteries, Journal of Power Sources 146, 654-657, (2005).

Kang, S.H. et al., Stabilization of xLi2MnO2.(1−x)LiMO2 Electrode Surfaces (M=Mn, Ni, Co) with Mildly Acidic, Fluorinated Solutions, Journal of The Electrochemical Society, 155 (4), A269-A275, (2008).

Kang, S.H. et al., The Effects of Acid Treatment on the Electrochemical Properties of 0.5 Li2MnO3.0.5LiNi0.44Co0.25Mn0.31O2 Electrodes in Lithium Cells, Journal of The Electrochemical Society, 153 (6), A1186-A1192, (2006).

Kim, D. et al., Composite 'Layered-Layered-Spinel' Cathode Structures for Lithium-Ion Batteries, Journal of The Electrochemical Society 160 (1), A31-A38 (2013).

Kim, J.S. et al., The Electrochemical Stability of Spinel Electrodes Coated with ZrO2, Al2O3, and SiO2 From Colloidal Suspensions, Journal of The Electrochemical Society 151 (10), A1755-A1761 (2004).

Kim, J. et al., Electrochemical and Structural Properties of xLi2M'O3 • (1−x)LiMn0.5Ni0.5O2 Electrodes for Lithium Batteries (M'=Ti, Mn, Zr; 0≤x≤0.3), Chemical Materials 16, 1996-2006 (2004).

Kim, D. et al., High-Energy and High Power Li Rich Nickel Manganese Oxide Electrode Materials, Electrochemistry Communications 12, 1618-1621 (2010).

Kim, J. et al., Controlled Nanoparticle Metal Phosphates (Metal=Al, Fe, Ce, and Sr) Coatings on LiCoO2 Cathode Materials, Journal of The Electrochemical Society 152 (6), A1142-A1148 (2005).

Kim, G.H., et al. Improvement of High-Voltage Cycling Behavior of Surface-Modified Li[Ni⅓Co⅓Mn⅓]O2 Cathodes by Fluorine Substitution for Li-Ion Batteries, Journal of The Electrochemical Society 152 (9), A1707-A1713, (2005).

Lee, E. et al., Lithiated Spinel LiCo1−xAlxO2 As A Stable Zero-Strain Cathode, ACS Applied Energy Materials 2, 6170-6175 (2019).

Lee, E. S. et al., Understanding the Effect of Synthesis Temperature on the Structural and Electrochemical Characteristics of Layered-Spinel Composite Cathodes for Lithium-Ion Batteries, Journal of Power Sources 240, 193-203 (2013).

Lee, E. et al., Exploring Lithium-Cobalt-Nickel Oxide Spinel Electrodes For >3.5 V Li-Ion Cells, ACS Applied Materials & Interfaces 8, 27720-27729 (2016).

Long, B.R. et al., Enabling High-Energy, High-Voltage Lithium Ion Cells: Standardization of Coin-Cell Assembly, Electrochemical Testing, and Evaluation of Full Cells, Journal of The Electrochemical Society, 163 (14), A2999-A3009 (2016).

Long, B.R. et al., Advances in Stabilizing 'Layered-Layered' xLi2MnO3 (1−x)LiMO2 (M=Mn, Ni, Co) Electrodes with a Spinel Component, Journal of The Electrochemical Society 161 (14), A2160-A2167 (2014).

Ma, D. et al., Si-Based Anode Materials For Li-Ion Batteries: A Mini Review, Nano-Micro Lett. 6 (4), 347-358 (2014).

Mekonnen, Y. et al., A Review of Cathode and Anode Materials For Lithium-Ion Batteries, Florida International University IEEE Conference Paper 1-6 (2016).

Mukai, K., A Series of Zero-Strain Lithium Insertion Materials That Undergo A Non-Topotactic Reaction, Electrochemica Acta 263, 508-514 (2018).

Nam, K-W et al., In Situ X-ray Diffraction Studies of Mixed LiMn2O4—LiNi⅓Co⅓Mn⅓O2 Composite Cathode in Li-Ion Cells During Charge-Discharge Cycling, Journal of Power Sources 192, 652-659 (2009).

Nestler, T. et al., Separators-Technology Review; Ceramic Based Separators For Secondary Batteries, AIP Conference Proceedings 1597, 155-184 (2014).

Ohzuku, T. et al., Zero-Strain Insertion Material of Li[Li⅓Ti⅔]O4 For Rechageable Lithium Cells, Journal Electrochemical Society 142 (5), 1431-1435 (1995).

Park, B.C. et al., Improvement of Structural and Electrochemical Properties of AlF3-Coated Li[Ni⅓Co⅓Mn⅓]O2 Cathode Materials on High Voltage Region, Journal of Power Sources 178, 826-831 (2008).

Park, S-H. et al., Lithium-Manganese-Nickel-Oxide Electrodes with Integrated Layered-Spinel Structures for Lithium Batteries, Electrochemistry Communications 9, 262-268 (2007).

Rossen, E. et al., Synthesis and Electrochemistry of Spinel LT-LiCoO2, Solid State Ionics 62, 53-60 (1993).

Sun, Y. K. et al., AlF3-Coating to Improve High Voltage Cycling Performance of Li[Ni⅓Co⅓Mn⅓]O2 Cathode Materials For Lithium Secondary Batteries, Journal of The Electrochemical Society 154 (3), A168-A172 (2007).

Thackeray, M.M. , Exploiting the Spinel Structure For Li-Ion Battery Applications: A Tribute to John B. Goodenough, Advanced Energy Materials 2001117, 1-8 (2020).

* cited by examiner

CATHODE MATERIALS FOR USE IN LITHIUM CELLS AND BATTERIES

CROSS-REFERENCE TO RELATED APPLICATIONS

This application claims the benefit of U.S. Provisional Application Ser. No. 63/286,251, filed on Dec. 6, 2021; and this application is a continuation-in-part of U.S. application Ser. No. 17/351,944, filed on Jun. 18, 2021, which is a continuation-in-part of U.S. application Ser. No. 17/313, 752, filed on May 6, 2021, which is a continuation-in-part of U.S. application Ser. No. 17/136,234, filed on Dec. 29, 2020, which claims the benefit of U.S. Provisional Application Ser. No. 63/055,993, filed on Jul. 24, 2020, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials useful for rechargeable lithium-based cells and battery systems.

BACKGROUND

Today, rechargeable lithium-ion batteries (LIBs) command a multi-billion-dollar industry. LIBs operate by shuttling lithium ions between the negative electrode (the anode) and the positive electrode (the cathode) during discharge and charge. Well-known examples of anode materials are carbon, particularly graphite, and the lithium-titanate spinel, $Li_4Ti_5O_{12}$ (LTO). Well-known cathode products include materials with layered structures, compositional variations of the lithium-manganese-oxide spinel, and lithium-iron-phosphate, $LiFePO_4$ (LFP), which has an olivine-type structure. Examples of layered materials include $LiCoO_2$ (LCO), $LiNi_{0.8}Co_{0.15}Al_{0.05}O_2$ (NCA) and various lithium-nickel-manganese-oxide (NMC) compositions such as $LiNi_{0.6}Co_{0.2}Mn_{0.2}O_2$ (NMC622), $LiNi_{0.33}Co_{0.33}Mn_{033}O_2$ (NMC111), and lithium-rich variants, $Li_{1+x}M_{1-x}O_2$ (M=Ni, Mn, Co), alternatively designated in composite notation as $wLi_2MnO_3 \cdot (1-w)LiMO_2$. Examples of lithium-manganese-oxide spinel-type materials include $LiMn_2O_4$ (LMO), and the lithium-rich spinel $Li_{1.01}Mn_{1.97}O_4$. These materials represent electrodes, i.e., both anodes and cathodes, in their stable discharged state, thereby enabling the safe assembly of lithium-ion cells and batteries, as well as the safe transport of these products from manufacturer to customer across the globe.

Gummow et al. reported the discovery of a new polymorphic form of lithium-cobalt-oxide ($LiCoO_2$) in the *Materials Research Bulletin*, Volume 27, pages 327-337 (1992). This compound was designated LT—$LiCoO_2$ because it was synthesized at a relatively low temperature (LT) of 400° C., compared to the previously known layered $LiCoO_2$, which is prepared at a significantly higher temperature (HT), typically 900° C., i.e., HT-$LiCoO_2$. Gummow et al. also reported in *Solid State Ionics*, Volume 53-56, pages 681-687 (1992) that nickel could be substituted for cobalt in the LT-$LiCo_{1-x}Ni_xO_2$ system over the range (0<x≤0.2). From an X-ray structural analysis, it was concluded by Rossen et al.

in *Solid State Ionics*, Volume 62, pages 53-60 (1993) that LT-$LiCoO_2$ had a lithiated-spinel structure, while the refinements of Gummow et al. in the *Materials Research Bulletin*, Volume 28, pages 235-246 (1993) suggested that LT-$LiCoO_2$ samples had a predominant lithiated-spinel-like structure that deviated from the ideal spinel arrangement of cations.

More recently, Lee et al. in *ACS Applied Energy Materials*, Volume 2, pages 6170-6175 (2019) revealed that Al-substitution for cobalt is also possible in LT-$LiCo_{1-x}Al_xO_2$ for (0<x<0.5) but, in this case, the electrochemical signature differs from that provided by LT-$LiCoO_2$ and LT-$LiCo_{1-x}Ni_xO_2$ lithiated-spinel electrodes, exhibiting single-phase behavior on lithium extraction, rather than the typical two-phase behavior expected of spinel electrodes. A structural refinement of LT-$LiCo_{0.85}Al_{0.15}O_2$ (x=0.15) by Lee et al. indicated that this behavior could be attributed to a small amount of cation disorder on the octahedral sites of the lithiated-spinel LT-$LiCo_{1-x}Al_xO_2$ structure. Consequently, these slightly disordered lithiated-spinel LT-$LiCo_{1-x}Al_xO_2$ materials can be defined as having slightly disordered rock salt structures. Like layered $LiCoO_2$, LT-$LiCoO_2$ and substituted derivatives are discharged cathodes. Lithium-ion cells with these cathode materials coupled to graphite (carbon) anodes can therefore be assembled safely in the discharged state, i.e., when all the lithium required for the electrochemical reaction is contained in the cathode. Such cells provide an attractive operating cell voltage of approximately 3.5 V.

Cobalt-containing lithiated-spinel electrode materials, for example, $LiCo_{1-x}M_xO_2$, in which M is one or more metal ions, such as Ni and/or Al, are also of interest as stabilizers for layered lithium-rich and manganese-rich $wLi_2MnO_3 \cdot (1-w)LiMO_2$(M=Ni, Mn, and Co; i.e., NMC) electrodes, as described by Lee et al. in *Applied Materials & Interfaces*, Volume 8, pages 27720-27729 (2016). An advantage of these electrodes is that both lithiated-spinel and layered $wLi_2MnO_3 \cdot (1-w)LiMO_2$ components have a rock salt composition, in which the number of cations equals the number of anions, thereby facilitating their structural integration, particularly when the two components have closely-matched crystallographic lattice parameters. Furthermore, the discovery of LT-$LiCo_{1-x}Al_xO_2$ electrode materials has heightened interest in developing all-solid-state 'spinel-spinel' cells, which can be assembled in their discharged state, for example, by coupling a $Li_4Ti_5O_{12}$ spinel anode to a lithiated-spinel LT-$LiCo_{1-x}Al_xO_2$ cathode with an appropriate lithium-ion conducting solid electrolyte, such as a solid inorganic electrolyte or a solid polymer electrolyte.

The generic family of materials with a spinel-type structure is broad and diverse. Numerous spinel-type compositions are found in nature while many others can be prepared synthetically in the laboratory, usually at elevated temperatures well above room temperature. The lithium spinels, such as $LiMn_2O_4$, $Li_4Mn_5O_{12}$, $LiMn_{1.5}Ni_{0.5}O_4$, and $Li_4Ti_5O_{12}$, which are of interest as electrodes for Li-ion battery applications, are typically prepared at temperatures between 400 and 900° C. By contrast, lithiation of the above-mentioned spinels to form lithiated-spinel products has to be conducted at room temperature or at slightly higher temperatures, e.g., 50° C., by chemical reactions, for example with butyllithium, or by electrochemical reactions in an inert atmosphere because these lithiated-spinel structures are unstable at higher temperatures, particularly if heated in air or oxygen. In this respect, the family of lithiated cobalt-containing spinels, $LiCo_{1-x}M_xO_2$, is distinct because they can be prepared at a moderately high temperature (for example, 400-500° C.) in air or oxygen, thereby offering the possibility of incorporating lithiated spinels as stabilizing components during the preparation of 'layered-layered' $wLi_2MnO_3 \cdot (1-w)LiMO_2(M=Ni, Mn, and Co; "NMC")$ electrode materials.

Of the cathode materials discussed above, LCO, NCA and NMC materials dominate the current global cathode materials market. All of these cathode materials contain cobalt, which is the most expensive and least abundant cathode component used in lithium-ion batteries. Major international efforts are therefore underway to find less expensive nickel-rich and manganese-rich alternatives that are cobalt-free, without compromising the electrochemical performance of lithium-ion cells. This has been a daunting task.

The materials, electrodes, cells and batteries described herein address the need for new cobalt-free, lithium-metal-oxide electrode structures and compositions.

SUMMARY

Currently, there is great interest in developing new materials for lithium-ion cathodes, which are either low-Co, Co-free, or which contain Co but have other desired properties (e.g., improved cycling stability, improved coulombic efficiency; improved specific capacity, and the like relative to lithium cobalt oxide (LCO).

Described herein are composite electrode active materials that comprise a two or more electrode active materials that are blended, or preferably are structurally-integrated together. In some embodiments, the composite electrode active material comprises a first electrode active material blended or structurally-integrated with a second electrode active material that is different from the first electrode active material; wherein the first electrode active material is a lithiated spinel selected from the group consisting of (a) a lithiated spinel of formula $LiMn_xNi_yM_zO_2$; wherein M comprises at least on metal cation other than manganese and nickel cations; $x+y+z=1$; $0<x<1.0$; $0<y<1.0$; $0\leq z\leq 0.5$; and the ratio of x:y is in the range of about 1:2 to about 2:1; and (b) a lithiated spinel of formula $LiM^1O_2$, wherein $M^1$ comprises a combination of Mn and Ni transition metal ions in a ratio of Mn to Ni ions of about 2:1 to about 1:1; and the second electrode active material comprises at least one ordered or partially-disordered material selected from the group consisting of a lithium metal oxide, a lithium metal polyanionic material, a partially-fluorinated derivative of the lithium metal oxide, and a partially-fluorinated derivative of the lithium metal polyanionic material.

Cobalt-free cathode materials are described herein, which have or comprise a lithiated-spinel-type structure. These novel materials open the door to the development and exploitation of lower cost and safer cobalt-free and low-cobalt electrode materials for next generation lithium-ion cells and batteries. In some embodiments, the lithiated spinel materials described herein have the general empirical formula $LiMn_xNi_yM_zO_2$, in which $x+y+z=1$, $0<x<1.0$, $0<y<1.0$, $0\leq z\leq 0.5$, or alternatively in lithiated-spinel notation, $Li_2Mn_{2x}Ni_{2y}M_{2z}O_4$, and in which M is selected from one or more metal cations, excluding Mn and Ni. In some embodiments, M is selected from one or more metal ions, excluding Mn, Ni and Co. In some embodiments, M comprises Mg, Al, Ga, a combination of Mg and Ti in a 1:1 ratio, or a combination thereof. In general, the Mn:Ni ratio in the lithiated-spinel structures described herein is less than 2:1 and greater than 1:2. In some embodiments, the Mn:Ni ratio is close to 1:1. In some other embodiments the lithiated spinel materials are nickel-rich and the Mn:Ni ratio is in the range of about 1:1.1 to about 1:1.95 (e.g., about 1:1.2 to about 1:1.9; or about 1:1.5 to about 1:1.8).

Low-cobalt containing lithium metal oxide materials also are described herein, which have or comprise a lithiated spinel-type structure (preferably predominately lithiated spinel; i.e., the material comprises greater than 50 mol % of the lithiated spinel structure; e.g., greater than 55 mol %, greater than 60 mol %, greater than 70 mol %, greater than 80 mol %, or 90 mol % of the lithiated spinel structure) and which have an overall empirical formula of $LiMn_xNi_yM_zO_2$; wherein M comprises Co and, optionally, other metals excluding manganese and nickel; $x+y+z=1$; $0<x<1.0$; $0<y<1.0$; and $0\leq z\leq 0.5$; in the Mn and Ni are present in a molar Mn:Ni ratio in the range of about 1:2 to about 2:1. In some embodiments, $z\leq 0.2$, or $z\leq 0.4$, or $z\leq 0.5$. In some embodiments, $0.05\leq z$, or $0.1\leq z$, or $0.15\leq z$. For example, in some embodiments, $0\leq z\leq 0.2$, or $0.05\leq z\leq 0.2$, or $0.1\leq z\leq 0.2$, or $0.15\leq z\leq 0.2$, or $0\leq z\leq 0.4$, or $0.05\leq z\leq 0.4$, or $0.1\leq z\leq 0.4$, or $0.15\leq z\leq 0.4$, or $0.2\leq z\leq 0.4$, or $0.3\leq z\leq 0.4$.

Lithium-manganese-nickel-oxide electrode materials for lithium cells and batteries, notably rechargeable Li-ion batteries, also include crystalline, structurally-integrated, lithium-metal-oxides of empirical formula $LiM^1O_2$ wherein $M^1$ comprises a combination of Mn and Ni transition metal ions; the crystal structure of the materials comprises domains of a disordered lithiated-spinel component, a disordered layered component, and optionally a disordered rock salt component, in which the oxygen lattice of the components is cubic-close packed. In general, the Mn:Ni ratio in the lithiated-spinel structures described herein is less than about 2:1, and preferably about 1:1 (i.e., 1.05:1 to 0.95:1, or 1.02:1 to 0.98:1, or 1.01:1 to 0.99:1). Optionally, the lithium-manganese-nickel-oxide electrode materials can be blended or structurally-integrated with other cathode materials and structures, notably lithium-metal-oxide- and lithium-metal-polyanionic materials and structures, such as layered, spinel, lithiated-spinel, rock salt, olivine and partially disordered and/or partially-fluorinated derivatives thereof. Following the principles of this invention, selected examples and compositions of these materials and structures are: layered $Li_2MnO_3$, $LiNi_{1-x-y}Mn_xCo_yO_2$ (NMC) and lithium-rich derivatives thereof, such as $xLi_2MnO_3 \cdot (1-x)$ $LiNi_{1-x-y}Mn_xCo_yO_2$; spinel $LiMn_{1.5}Ni_{0.5}O_4$; lithiated-spinel $LiCo_{1-x}Al_xO_2$ and $LiCo_{1-x-y}Ni_xAl_yO_2$; disordered rock salt materials and structures, including lithium-rich compositions, and olivine $LiFePO_4$. Optionally, $M^1$ is $M^2_{(1-w)}M^3_w$, such that the material has the empirical formula $LiM^2_{(1-w)}M^3_wO_2$, wherein $M^2$ is a combination of Mn and Ni transition metal ions in a ratio of Mn to Ni ions of about 2:1 to about 1:1; $M^3$ is one or more metal cations selected from the group consisting of an Al cation, a Ga cation, a Mg cation, a Ti cation, and a Co cation; and $0<w\leq 0.5$.

Lithium-manganese-nickel-oxide materials of formula $LiM^1O_2$ described herein can be blended or structurally-integrated with one or more ordered or disordered, layered $(Li_2M^4O_3)$ compositions and structures, in which $M^4$ is one or more metal cations, selected preferably from Mn, Ti, and Zr cations. Alternatively, the lithium-manganese-nickel-oxide $(LiM^1O_2)$ materials can be blended or structurally-integrated with one or more ordered or partially disordered, layered or lithiated-spinel $(LiM^5O_2)$ materials and structures, in which $M^5$ is different from $M^1$ and comprises one or more metal cations, selected preferably from first-row transition metal cations, such as Mn, Ni, and Co cations, optionally substituted by minor amounts of one or more of Al, Ga and Mg cations, and partially-fluorinated derivatives thereof. In yet another alternative, the lithium-manganesenickel-oxide-based $LiM^1O_2$ materials can be blended or structurally-integrated with a combination of the $Li_2M^4O_3$ and $LiM^5O_2$ materials and structures and partially-fluorinated derivatives thereof. As such, these electrode materials can be generally described as having blended or integrated structures with layered- and lithiated-spinel character.

In yet another aspect, a method for preparing a material of formula $LiM^2_{(1-w)}M^3_wO_2$ is described herein. The method comprises the steps of (a) atomizing a precursor solution with oxygen to form liquid droplets; (b) spraying the liquid droplets into a methane/oxygen pilot flame of a flame-spray pyrolysis (FSP) unit to vaporize and oxidize the metal salts to produce a precursor powder; and (c) heating the precursor powder in air at a selected temperature in the range of about 400 to about 650° C. (preferably 400 to 600° C.) to form the material of empirical formula $LiM^2_{(1-w)}M^3_wO_2$; wherein the precursor solution comprises stoichiometrically-required amounts of a Li salt, a $M^2$ salt, and a $M^3$ salt dissolved in non-aqueous solvent or an aqueous solvent, wherein optionally, the lithium salt is present in a molar excess of less than about 10 mol %; $M^2$ is a combination of Mn and Ni transition metal ions in a ratio of Mn to Ni ions of about 2:1 to about 1:1; $M^3$ is one or more metal cations selected from the group consisting of an Al cation, a Ga cation, a Mg cation, a Ti cation; and a Co cation; and $0<w≤0.5$.

An electrode for a lithium electrochemical cell typically comprises particles of the electrode active material a binder matrix (e.g., poly(vinylidene difluoride and the like) coated on a current collector comprising a conductive material. Current collectors for electrochemical cells can be, e.g., a conductive carbon fiber paper, aluminum foil, and the like.

An electrochemical cell comprises an anode, a cathode, an ion-conducting separator between the anode and the cathode, and a lithium-containing electrolyte contacting the anode, the cathode, and the separator. A battery comprises a plurality of electrochemical cells electrically connected in series, in parallel, or in both series and parallel.

The following non-limiting embodiments of the materials and methods described herein are provided below to illustrate certain aspects and features of the compositions and methods described herein.

Embodiment 1 comprises a composite electrode active material comprising a first electrode active material blended or structurally-integrated with a second electrode active material that is different from the first electrode active material; wherein: the first electrode active material is a lithiated spinel selected from the group consisting of (a) a lithiated spinel of formula $LiMn_xNi_yM_zO_2$; wherein M comprises at least on metal cation other than manganese and nickel cations; $x+y+z=1$; $0<x<1.0$; $0<y<1.0$; $0≤z≤0.5$; and the ratio of x:y is in the range of about 1:2 to about 2:1; and (b) a lithiated spinel of formula $LiM^1O_2$, wherein $M^1$ comprises a combination of Mn and Ni transition metal ions in a ratio of Mn to Ni ions of about 2:1 to about 1:1; and the second electrode active material comprises at least one ordered or partially-disordered material selected from the group consisting of a lithium metal oxide, a lithium metal polyanionic material, a partially-fluorinated derivative of the lithium metal oxide, and a partially-fluorinated derivative of the lithium metal polyanionic material.

Embodiment 2 comprises the composite electrode active material of embodiment 1, wherein M comprises cobalt.

Embodiment 3 comprises the composite electrode active material of embodiment 1 to 2, wherein the lithium metal oxide has a structure selected from the group consisting of a layered structure, a spinel structure, a lithiated-spinel structure, rock salt structure, and a combination of two or more of the foregoing structures.

Embodiment 4 comprises the composite electrode active material of any one of embodiments 1 to 3, wherein the lithium metal polyanionic material has an olivine-type structure.

Embodiment 5 comprises the composite electrode active material of any one of embodiments 1 to 4, wherein $0≤z≤0.2$, or $0.05≤z≤0.2$, or $0.1≤z≤0.2$, or $0.15≤z≤0.2$, or $0≤z≤0.4$, or $0.05≤z≤0.4$, or $0.1≤z≤0.4$, or $0.15≤z≤0.4$, or $0.2≤z≤0.4$, or $0.3≤z≤0.4$.

Embodiment 6 comprises the composite electrode active material of any one of embodiments 1 to 5, wherein the second electrode active material comprises a layered compound of formula $Li_2M^4O_3$, wherein $M^4$ is at least one metal cation selected from the group consisting of a Mn cation, a Ti cation, and a Zr cation.

Embodiment 7 comprises the composite electrode active material of any one of embodiments 1 to 6, wherein the second electrode active material comprises a layered compound of formula $LiM^5O_2$, wherein $M^5$ comprises at least one first row transition metal cation, and optionally at least one non-transition metal cation.

Embodiment 8 comprises the electrode active composite material of embodiment 1, wherein the electrode active composite material is a lithiated spinel-lithiated spinel of formula $aLiM^1O_2•(1-a)LiM^7O_2$ in which $0<a<1$; wherein the first electrode active material is the lithiated spinel of formula $LiM^1O_2$, and the second electrode active material is a lithiated-spinel of formula $LiM^7O_2$ and wherein $M^7$ comprises two or more cations selected from the group consisting of a Mn cation, a Ni cation, a Co cation, and a $M^6$ cation; and $M^6$ comprises at least one cation other than Mn Ni, and Co cations.

Embodiment 9 comprises the electrode active material of embodiment 8, wherein $M^6$ is at least one cation of a metal selected from the group consisting of Al, Ga, Mg, and Ti.

Embodiment 10 comprises the electrode active composite material of embodiment 9, wherein the lithiated spinel-lithiated spinel is a material of formula $$0.9LiMn_{0.5}Ni_{0.5}O_2•0.1LiCo_{0.85}Al_{0.15}O_2.$$

Embodiment 11 comprises a composite electrode active material comprising a first electrode active material that is structurally-integrated with second electrode active material; wherein: the first electrode active material is a layered material of empirical formula $Li_2M^4O_3$, wherein $M^4$ is at least one metal cation selected from the group consisting of a Mn cation, a Ti cation, and a Zr cation; the second electrode active material is a lithiated spinel of formula $LiM^1O_2$, wherein $M^1$ comprises a combination of Mn and Ni transition metal ions in a ratio of Mn to Ni ions of about 2:1 to about 1:1; and the composite electrode active material is a layered-lithiated spinel material of formula $bLi_2M^4O_3•(1-b)LiM^1O_2$, in which $0<b<1$.

Embodiment 12 comprises the composite electrode active material of embodiment 11, wherein the material of formula $LiM^1O_2$ comprises domains of a disordered lithiated-spinel component, a disordered layered component, and a disordered rock salt component, in which the oxygen lattice of the components is cubic-close packed, and in which greater than 0 percent and less than 20 percent of lithium ions of the lithiated spinel and layered components are disordered among the octahedral sites normally occupied by the transition metal ions, and a corresponding percentage of the transition metal ions are disordered among the octahedral sites normally occupied by lithium ions, in fully-ordered, lithiated spinel and layered structures.

Embodiment 13 comprises the composite material of embodiment 12, wherein greater than about 1, 2, 3, 4, 5, 6, 7, 8, 9, 10, 11, 12, 13, 14, 15, 16, 17, 18, or 19 percent and less than 20 percent of the lithium ions of the material of formula $bLi_2M^4O_3 \cdot (1-b)LiM^1O_2$ are disordered among the octahedral sites normally occupied by the transition metal ions, and a corresponding percentage of the transition metal ions are disordered among the octahedral sites normally occupied by lithium ions, in fully-ordered, lithiated spinel and layered structures.

Embodiment 14 comprises the composite material of embodiments 12 or 13, wherein greater than 10 percent and less than 20 percent of the lithium ions of the material of formula $bLi_2M^4O_3 \cdot (1-b)LiM^1O_2$ are disordered among the octahedral sites normally occupied by the transition metal ions, and a corresponding percentage of the transition metal ions are disordered among the octahedral sites normally occupied by lithium ions, in fully-ordered, lithiated spinel and layered structures.

Embodiment 15 comprises the composite electrode active material of any one of embodiments 12 to 14, wherein in $M^1$ is $M^2_{(1-w)}M^3_w$; $M^2$ comprises a combination of Mn and Ni transition metal ions; and $M^3$ is at least one metal cation selected from the group consisting of an Al cation, a Ga cation, a Mg cation, a Ti cation; and a Co cation; and $0<w<0.1$.

Embodiment 16 comprises the composite electrode active material of any one of embodiments 12 to 15, wherein the composite electrode active material is a structurally integrated layered-lithiated spinel of formula $0.1Li_2MnO_3 \cdot 0.9LiMn_{0.5}Ni_{0.5}O_2$.

Embodiment 17 comprises a electrode active material comprising the electrode active composite material of any one of embodiments 12 to 16, mechanically blended with or structurally integrated with a lithiated spinel of formula $LiM^7O_2$, wherein $M^7$ comprises two or more cations selected from the group consisting of a Mn cation, a Ni cation, a Co cation, and a $M^6$ cation; and $M^6$ comprises at least one cation other than Mn Ni, and Co cations.

Embodiment 18 comprises the electrode active material of embodiment 17, wherein $M^6$ is at least one cation of a metal selected from the group consisting of Al, Ga, Mg, and Ti.

Embodiment 19 comprises an electrode active material comprising the composite electrode active material of any one of embodiments 12 to 18, mechanically blended with or structurally integrated with a layered compound of formula $LiM^5O_2$, wherein $M^5$ comprises at least one first row transition metal cation.

Embodiment 20 comprises the composite material of embodiment 19, wherein $M^5$ further comprises at least one non-transition metal cation.

Embodiment 21 comprises an electrode active composite material comprising a first electrode active material that is mechanically blended with or structurally-integrated with a second electrode active material different from the first electrode active material, and a third electrode active material different from the first and second electrode active materials; wherein: the first electrode active material is a layered material of formula $Li_2M^4O_3$, wherein $M^4$ is at least one metal cation selected from the group consisting of a Mn cation, a Ti cation, and a Zr cation; the second electrode active material is a lithiated spinel of formula $LiM^1O_2$, wherein $M^1$ comprises a combination of Mn and Ni transition metal ions in a ratio of Mn to Ni ions of about 2:1 to about 1:1; and the third electrode active material is selected from the group consisting of (a) a layered material of formula $LiM^5O_2$; wherein $M^5$ comprises at least one first-row transition metal cation, and (b) a lithiated spinel of formula $LiM^7O_2$, wherein $M^7$ comprises two or more cations selected from the group consisting of a Mn cation, a Ni cation, a Co cation, and a $M^6$ cation; and $M^6$ comprises at least one cation other than Mn Ni, and Co cations.

Embodiment 22 comprises the electrode active composite material of embodiment 21, wherein $M^5$ additionally comprises at least one non-transition metal cation.

Embodiment 23 comprises the electrode active composite material of embodiment 21 or 22, wherein $M^6$ is at least one cation of a metal selected from the group consisting of Al, Ga, Mg, and Ti.

Embodiment 24 comprises the electrode active composite material of embodiment 21, wherein the composite electrode active material is a structurally integrated layered-lithiated spinel-lithiated spinel of formula $cLi_2M^4O_3 \cdot (1-c-d)LiM^1O_2 \cdot dLiM^7O_2$ in which $0<|c-d|<1$; $0<c<0.2$; and $0<d<0.8$.

Embodiment 25 comprises the composite material of embodiment 21, wherein the composite electrode active material is a structurally integrated layered-lithiated spinel-lithiated spinel material of formula $0.1Li_2MnO_3 \cdot 0.8LiMn_{0.5}Ni_{0.5}O_2 \cdot 0.1LiCo_{0.85}Al_{0.15}O_2$.

Embodiment 26 comprises the electrode active composite material of embodiment 21, wherein the composite electrode active material is a structurally-integrated layered-lithiated spinel-layered material of formula $eLi_2M^4O_3 \cdot (1-e-f)LiM^1O_2 \cdot fLiM^5O_2$ in which $0<|e-f|<1$; $0<e<0.2$; and $0<f<0.8$.

Embodiment 27 comprises the electrode active composite material of embodiment 26, wherein $M^5$ is a combination of at least one first-row transition metal cation and at least one non-transition metal cation selected from the group consisting of an Al cation, a Ga cation, and a Mg cation.

Embodiment 28 comprises the electrode active composite material of embodiment 26 or 27, wherein the layered-lithiated spinel-layered material is a compound of formula $0.1Li_2MnO_3 \cdot 0.8LiMn_{0.5}Ni_{0.5}O_2 \cdot 0.1LiCo_{0.98}Ti_{0.01}Mg_{0.01}O_2$.

Embodiment 29 is an electrode active material for a lithium electrochemical cell with a lithiated spinel structure having the empirical formula $LiMn_xNi_yM_zO_2$; wherein M comprises Co and, optionally, other metals besides manganese and nickel; $x+y+z=1$; $0<x<1.0$; $0<y<1.0$; $0\leq z\leq 0.2$; and having a x:y ratio in the range of about 1:1.1 to about 1:2.

Embodiment 30 is the electrode active material of embodiment 29, in which $0\leq z\leq 0.1$.

Embodiment 31 is the electrode active material of embodiment 29, wherein M comprises Co and Al.

Embodiment 32 comprises the electrode active composite material of any one of embodiments 29 to 31, wherein the compound has the formula $LiMn_{0.35}Ni_{0.6}Co_{0.01}Al_{0.04}O_2$, which preferably was prepared at a temperature of about 400 to 500° C.

Embodiment 33 comprises the electrode active composite material of any one of embodiments 1 to 32, wherein a portion of the oxygen has been replaced by fluorine (e.g., less than 10 mole percent of the oxygen is replaced by fluorine).

Embodiment 34 comprises the electrode active composite material of any one of embodiments 1 to 33, wherein the metal ions thereof are partially disordered relative to ideal lithiated spinel and layered structure.

Embodiment 35 comprises an electrochemical cell comprising an anode, a cathode, and a lithium-containing electrolyte contacting the anode and cathode, wherein the cathode comprises the electrode active composite material of any one of embodiments 1 to 34.

Embodiment 36 comprises a battery comprising a plurality of the electrochemical cell of embodiment 35 electrically connected in series, in parallel, or in both series and parallel.

DETAILED DESCRIPTION

Figure 1A:
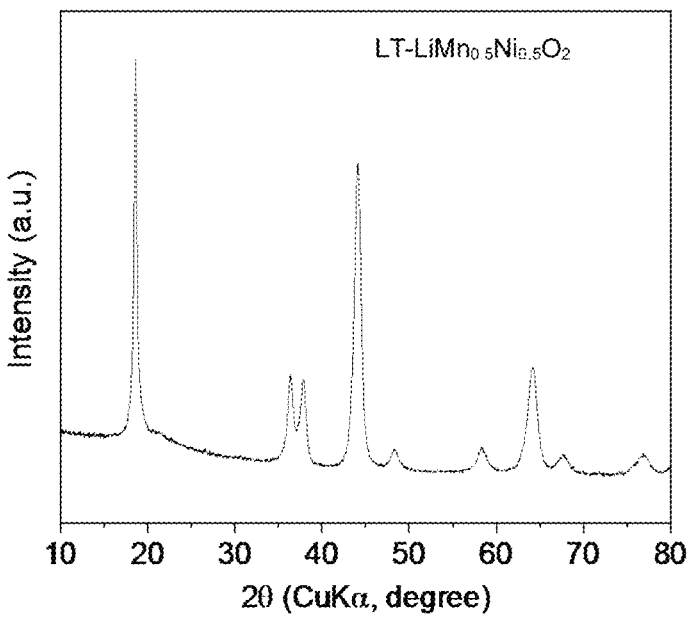
FIG. 1A depicts the X-ray diffraction pattern of LT-$LiMn_{0.5}Ni_{0.5}O_2$.

Materials with a spinel-type structure, as epitomized by the prototypic mineral known as spinel, which has the formula $MgAl_2O_4$, are abundant in nature and they are diverse in their composition. For the lithium battery industry, lithium-metal-oxide electrodes with a spinel-type structure, such as lithium titanate, $Li_4Ti_5O_{12}$ ($Li[Li_{1/3}Ti_{5/3}]O_4$), and lithium manganate $LiMn_2O_4$ and substituted derivatives thereof, e.g., $Li[Mn_{2-\delta}Li_\delta]O_4$, can be prepared by a variety of synthetic techniques at elevated temperatures. High-temperature synthesis is important and necessary for fabricating electrode particles with an acceptably high packing density. On the other hand, it is well-known that lithiated spinels, such as $Li_7Ti_5O_{12}$ ($Li_2[Li_{1/3}Ti_{5/3}]O_4$) and $Li_2[Mn_2]O_4$ can be prepared electrochemically at room temperature and slightly elevated temperature (e.g., 60° C.). However, when heated at elevated temperatures, particularly in air or oxygen, these lithiated spinel structures are unstable and tend to transform to other structure types. Indeed, only a few examples of lithiated spinels that can be prepared at an elevated temperature of about 400° C. are known to exist, notably those in the family of lithiated-cobalt-oxide spinels $LiCo_{1-x}M_xO_2$, alternatively in spinel notation, $Li_2Co_{2-2x}M_{2x}O_4$ (e.g., where M=Ni, Al, Ga), as described by Gummow et al. and by Lee et al. in references already provided herein.

Described herein is a cobalt-free lithium battery electrode active material which comprises a lithiated spinel structure and has an empirical formula $LiMn_xNi_yM_zO_2$, wherein M comprises one or more metal cations other than manganese, nickel and cobalt, $x+y+z=1$, $0<x<1.0$, $0<y<1.0$, $0\leq z\leq0.5$; and a ration of x:y in the range of about 1:2 to about 2:1. In some embodiments, the x:y ratio is about or equal to 1:1. Optionally, M comprises one or more metal cation selected from the group consisting of an Al cation, a Ga cation, and a combination of Mg and Ti cations. In some embodiments, at least two of the Li, Mn, Ni and M cations in the lithiated spinel are partially disordered over the octahedral sites of the lithiated-spinel structure, and the lithiated-spinel structure may contain cation and/or anion defects or deficiencies. The lithium, oxygen, and/or total non-lithium metal content of the lithiated spinel composition $LiMn_xNi_yM_zO_2$ can vary by up to about 5 percent from an ideal 1:1:2 respective elemental stoichiometry. A portion of the oxygen (e.g., less than about 10%) may be replaced by fluorine, if desired, e.g., to increase operating voltage and/or cycling stability. In some embodiments, $0\leq z\leq0.2$, or $0.05\leq z\leq0.2$, or $0.1\leq z\leq0.2$, or $0.15\leq z\leq0.2$, or $0\leq z\leq0.4$, or $0.05\leq z\leq0.4$, or $0.1\leq z\leq0.4$, or $0.15\leq z\leq0.4$, or $0.2\leq z\leq0.4$, or $0.3\leq z\leq0.4$.

As described herein, the lithiated spinel material of empirical formula $LiMn_xNi_yM_zO_2$, can be mechanically blended or structurally integrated with a second electrode active material, such as one or more other lithium metal oxide, e.g., $LiCoO_2$ with a layered-type structure and/or $LiCoO_2$ with a lithiated-spinel-type structure. In some embodiments, Co comprises less than about 33 mol % of non-lithium metal ions in the electrode active material (e.g., less than 20 mol % or less than 10 mol %).

A lithiated spinel of formula $LiMn_xNi_yM_zO_2$, wherein M comprises one or more metal cations other than manganese, nickel and cobalt, $x+y+z=1$, $0<x<1.0$, $0<y<1.0$, $0\leq z\leq0.5$; and having a molar x:y ratio in the range of about 1:2 to about 2:1, can be prepared by heating a mixture of precursor salts at a temperature in the range of about 200 to about 600° C. (e.g., 400 to 600° C. or 500 to 600° C.) in an oxygen-containing atmosphere (e.g., air); wherein the precursor salts comprises salts of Li, Mn, Ni and M cations with anions selected from the group consisting of carbonate, hydroxide, oxide, and nitrate; and the Li, Mn, Ni and M salts are present in a stoichiometric ratio selected to provide a target lithiated spinel of formula $LiMn_xNi_yM_zO_2$. In some embodiments, the lithium salt is lithium carbonate, and the Ni, Mn, M salts are single or mixed metal hydroxides of Ni, Mn, and M metal cations.

Particles of the electrode active materials described herein can be coated with a metal-oxide (e.g., a lithiated-spinel of formula $LiCo_{1-x}Al_xO_2$) a metal fluoride, or a metal phosphate layer to stabilize the underlying core material.

Also described herein is a crystalline, structurally-integrated, lithium-metal-oxide composite electrode material of empirical formula $LiM^1O_2$, wherein $M^1$ comprises a combination of Mn and Ni transition metal ions in a ratio of Mn to Ni ions of about 2:1 to about 1:1 (e.g., about 1.5:1 or about 1.1:1). The crystal structure of the material comprises domains of a disordered lithiated-spinel component, a disordered layered component, and a disordered rock salt component, in which the oxygen lattice of the components is cubic-close packed, and in which greater than 0 percent and less than 20 percent (e.g., about, or up to about 1, 2, 3, 4, 5, 6, 7, 8, 9, 10, 11, 12, 13, 14, 15, 16, 17, 18, or 19%) of lithium ions of the lithiated spinel and layered components are disordered among the octahedral sites normally occupied by the transition metal ions, and a corresponding percentage of the transition metal ions are disordered among the octahedral sites normally occupied by lithium ions, in fully-ordered, lithiated spinel and layered structures. In some preferred embodiments greater than 10 percent and less than 20 percent of the lithium ions of the lithiated spinel and layered components are disordered among the octahedral sites normally occupied by the transition metal ions, and a corresponding percentage of the transition metal ions are disordered among the octahedral sites normally occupied by lithium ions, in fully-ordered, lithiated spinel and layered structures. In some embodiments, about 11 to 19, 15 to 18, or 16 to 17 percent of the lithium ions of the lithiated spinel and layered component structures are disordered among the octahedral sites normally occupied by the transition metals, and a corresponding percentage of the transition metal ions are disordered among the octahedral sites normally occupied by lithium ions, in fully ordered, lithiated spinel and layered structures. As in other materials described herein, a portion of the oxygen in the material of formula $LiM^1O_2$ can be replaced by fluoride (e.g., less than 10 atom percent of the oxygen is replaced by fluoride).

In some cases, the disordered lithiated spinel and layered components of the material of formula $LiM^1O_2$ have X-ray diffraction (XRD) patterns in which the pattern of the disordered lithiated spinel component conforms to cubic space group symmetry Fd-3m with crystallographic formula: $(Li_{0.83}M^1{}_{0.17})_{2(16c)}[Li_{0.83} M^1{}_{0.17}]_{2(16d)}]O_{4(32e)}$, the oxygen ions are cubic-close packed, about 16 to about 17 percent of lithium ions that would be located in 16c octahedral sites in a fully ordered lithiated spinel structure are located in 16d sites, and about 16 to 17 percent of the transition metal ions that would normally be located in 16d octahedral sites in a fully ordered lithiated spinel structure are present in 16c sites; the XRD pattern of the disordered layered component conforms to trigonal space group symmetry R-3m with crystallographic formula $(Li_{0.83}M^1{}_{0.17})_{(3a)}$ $[Li_{0.17} M^1{}_{0.83}]_{(3b)}]O_{2(6c)}$, the oxygen ions are cubic-close-packed, about 16 to about 17 percent of lithium ions that would normally be located in 3a octahedral sites in a fully ordered layered material are located in 3b octahedral sites, and about 16 to 17 percent of the transition metal ions that would normally be located in 3b octahedral sites in the fully ordered layered structure are present in 3a octahedral sites.

In some embodiments, $M^1$ in formula $Li M^1O_2$ is $M^2{}_{(1-w)}M^3{}_w$, $M^2$ is a combination of Mn and Ni transition metal ions; $M^3$ is one or more other metal cations selected from the group consisting of an Al cation, a Ga cation, a Mg cation, a Ti cation; and a Co cation; and $0<w\leq0.1$. Optionally, $M^2$ is a combination of Mn and Ni transition metal ions in a Mn to Ni ratio of about 1:1 (i.e., 1.05:1 to 0.95:1, or 1.02:1 to 0.98:1, or 1.01:1 to 0.99:1). In some preferred embodiments, $M^3$ is an Al cation, while in other embodiments, $M^3$ is a Co cation. The lithium, $M^1$, and/or oxygen, content of the material can vary by up to about 5 percent from an ideal 1:1:2 $Li:M^1:O$ respective elemental stoichiometry. The cubic-close-packed oxygen lattice can deviate from ideal cubic-close-packing such that the crystal symmetry of one or more of the components is lowered by an anisotropic variation of at least one lattice parameter length of the unit cell by up to about 5%. Isotropic refers to a property of a material which is independent of spatial direction, whereas anisotropic is direction dependent. These two terms are commonly used to explain the properties of the material in basic crystallography, as is well known in the art. For example, the cubic-close-packed oxygen lattice can deviate from ideal cubic-close-packing such that the crystal symmetry of one or more of the components is lowered by an anisotropic variation of at least one lattice parameter length of the unit cell by up to about 2%.

The material of empirical formula $LiM^1O_2$ can be mechanically blended with or structurally integrated with a one or more other electrode active material.

Also described herein is a crystalline, structurally-integrated, lithium-metal-oxide composite electrode material of empirical formula $LiM^2_{(1-w)}M^3_wO_2$, wherein $M^2$ is a combination of Mn and Ni transition metal ions in a ratio of Mn to Ni ions of about 2:1 to about 1:1; $M^3$ is one or more metal cations selected from the group consisting of an Al cation, a Ga cation, a Mg cation, a Ti cation; and a Co cation; and $0<w\leq0.5$; the crystal structure of the material of empirical formula $LiM^2_{(1-w)}M^3_xO_2$ comprises domains of a disordered lithiated-spinel component, a disordered layered component, and optionally a disordered rock salt component, in which the oxygen lattice of the components is cubic-close packed, and in which greater than 0 and less than 20 percent of lithium ions of the lithiated spinel and layered components are disordered among the octahedral sites normally occupied by the transition metal ions, and a corresponding percentage of the transition metal ions are disordered among the octahedral sites normally occupied by lithium ions, in fully-ordered, lithiated spinel and layered structures.

In some embodiments of $LiM^2_{(1-w)}M^3_wO_2$, $w\leq0.2$, or $w\leq0.3$, or $w\leq0.4$, or $w\leq0.5$; and $0.05\leq w$, or $0.1\leq w$, or $0.15\leq w$, or $0.3\leq w$. In some embodiments, greater than 10 percent and less than 20 percent of the lithium ions of the lithiated spinel and layered component structures are disordered among the octahedral sites normally occupied by the transition metals, and a corresponding percentage of the transition metal ions are disordered among the octahedral sites normally occupied by lithium ions, in fully ordered, lithiated spinel and layered structures. In some embodiments, the ratio of Mn to Ni ions is about 1:1 (e.g., about 1.05:1 to 0.95:1; or about 1.02:1 to 0.98:1). In some preferred embodiments, $M^3$ is Co and $0<w\leq0.35$, preferably $0.3<w\leq0.35$. Optionally, the lithium, $M^2$, $M^2$, and/or oxygen content of the material varies by up to about 5 percent from an ideal 1:(1-w):2 respective elemental stoichiometry.

The cubic-close-packed oxygen lattice of $LiM^2_{(1-w)}M^3_wO_2$ can deviate from ideal cubic-close-packing such that the crystal symmetry of one or more of the components is lowered by an anisotropic variation of at least one lattice parameter length of the unit cell by up to about 5% (e.g., by up to about 2%).

Materials of formula $LiM^2_{(1-w)}M^3_wO_2$ can be prepared by a method comprising the steps of (a) atomizing a precursor solution with oxygen to form liquid droplet; (b) spraying the liquid droplets into a methane/oxygen pilot flame of a flame-spray pyrolysis (FSP) unit to vaporize an oxidize the metal salts to produce a precursor powder; and (c) heating the precursor powder in air at a selected temperature in the range of about 400 to about 650° C. (preferably 400 to 600° C. or 500 to 600° C.) to form the material of empirical formula $LiM^2_{(1-w)}M^3_wO_2$; $M^2$ is a combination of Mn and Ni transition metal ions in a ratio of Mn to Ni ions of about 2:1 to about 1:1; $M^3$ is one or more metal cations selected from the group consisting of an Al cation, a Ga cation, a Mg cation, a Ti cation; and a Co cation; and $0<w\leq0.5$; and wherein the precursor solution comprises a Li salt, a $M^2$ salt, and a $M^3$ salt which are dissolved in a non-aqueous solvent or an aqueous solvent in stoichiometrically-required amounts required to achieve a target molar $Li:M^2:M^3:O$ ratio of 1:(1-w):w:2, and optionally, the lithium salt is present in the precursor solution in a molar excess of less than about 10 mol %. Optionally, before step (a), the precursor solution is prepared by dissolving the Li salt, the $M^2$ salt, and the $M^3$ salt in an aqueous solvent or a non-aqueous solvent; wherein optionally the Li salt is included in an excess of up to about 10 mol %. In some cases, each of the Li salt, the $M^2$ salt, and the $M^3$ salt is a salt of an organic acid, such as acetic acid, propionic acid, or acetylacetic acid. In some embodiments, the solvent is an organic solvent (e.g., a solvent selected from the group consisting of acetonitrile, 2-ethylhexanocid acid, and a combination thereof).

For Co-free, lithiated-spinel electrode materials of formula $LiMn_xNi_yM_zO_2$, alternatively $Li_2Mn_{2x}Ni_{2y}M_{2z}O_4$ in lithiated-spinel notation, in which $x+y+z=1$, $0<x<1.0$, $0<y<1.0$, $0\leq z\leq0.5$, and M is a metal cation excluding Mn, Ni and Co, the reversible electrochemical capacity generated predominantly from redox reactions that occur on the nickel ions, as it does in layered $LiMn_{0.5}Ni_{0.5}O_2$ and spinel $LiMn_{1.5}Ni_{0.5}O_4$ electrodes, while the tetravalent Mn ions operate predominantly as electrochemically-inactive spectator ions during charge and discharge of the cell. The strategy uses the $LiMn_{0.5}Ni_{0.5}O_2$ composition as a building block to synthesize and stabilize a new family of Mn- and Ni-based lithiated-spinel electrode structures as emphasized in Table 1 in which the normalized and generalized lithiated-spinel notation, $LiMn_xNi_yM_zO_2$, is used for convenience to aid the discussion.

In some embodiments of $LiMn_xNi_yM_zO_2$ materials, the x:y ratio in these lithiated-spinel structures is less than 2:1 and greater than 1:2, preferably close to 1:1, and more preferably 1:1, to yield fully-discharged $LiMn_xNi_yM_zO_2$ electrodes in which the Mn and Ni ions adopt tetravalent and divalent oxidation states, or oxidation states as close to those ideal values as possible. In some other embodiments, the materials are Ni-rich, with an x:y ratio in the range of about 1:1.1 to about 1.2 (e.g., about 1:1.2 to about 1:1.9, or about 1:1.5 to about 1:1.8).

In some embodiments of $LiMn_xNi_yM_zO_2$ materials, M is selected from one or more of Mg, Al and Ga or, alternatively, a combination of Mg and Ti in a 1:1 ratio also referred to herein as 1:1 Mg—Ti). In yet another embodiment; M can be a combination of two or more of Mg, Al, Ga, or 1:1 Mg—Ti. In yet other embodiments, M can comprise Co, preferably low levels of Co such that the ratio of Co:(Mn+Ni) is less than about 0.2, more preferably the ratio of Co:(Mn+Ni) is less than about 0.1.

The lithiated-spinel structures described herein may deviate slightly from their ideal stoichiometric composition by containing cation and/or anion defects or deficiencies, as is known for metal oxide structures. In this case, the sum of x+y+z in $LiMn_xNi_yM_zO_2$ may deviate slightly from 1 (e.g., up to about 5 mol % deviation), while the oxygen content may deviate slightly from 2 (e.g., up to about 5 mol % deviation). Moreover, it is well known that lithium metal oxides can be synthesized that are either slightly lithium-rich or slightly lithium-deficient, such as found within the $Li_{1+x}Mn_{2-x}O_4$ spinel ($0<x<0.33$) and $Li_{1-x}Mn_2O_4$ ($0<x<1$) spinel systems, respectively. Thus, the lithiated spinel $LiMn_xNi_yM_zO_2$ electrode materials may deviate from ideal stoichiometry by up to about 5 mol % in the lithium, oxygen or total non-lithium metal content thereof.

In a further embodiment, it is known that F ions can be substituted for the O ions in lithium-metal-oxides, especially near surfaces or within bulk environments, notably Li-rich environments as well as in the presence of oxygen vacancies and local disorder within defect-containing oxides. These F ions can provide, for example, enhanced stability, particularly for Mn-containing compositions, against metal dissolution, surface damage, and reduced cycling and rate performance. Therefore, another aspect of the materials described herein includes $LiMn_xNi_yM_zO_{2-\delta}F_\delta$ electrode materials in which $0<\delta<0.1$.

The term "spinel" as used herein in reference to metal oxide materials refers to a material having a spinel-type crystal structure. The prototype "spinel" is the mineral $MgAl_2O_4$. As explained in Thackeray, *J. Am. Ceram. Soc;* 1999; 82, 3347-54, spinels have a generic structure $A[B_2]X_4$ where A refers to cations in the 8a tetrahedral sites and B refers to cations in the 16d octahedral sites of the cubic space group symmetry $Fd\overline{3}m$ (sometimes written as Fd-3m or simply Fd3m, particularly in older literature due to the difficulty of typing a macron over the number 3). The X anions, such as oxygen anions, located at the 32e sites form a cubic-close-packed array. Thus, the prototypical spinel can be written in the following form, which identifies the sites of the various cations a within the spinel crystal structure: $(A)_{8a}[B_2]_{16d}O_4$ (i.e., X=O) where the square brackets delineate crystallographically independent octahedral sites. There are 64 tetrahedral sites in a typical unit cell, one eighth of which are occupied by the A cations, and 32 octahedral sites, one half of which are occupied by the B cations within the unit cell. Lithium ions can be inserted into a spinel structure to form a product with rock salt stoichiometry, and which has a structure, referred to as a "lithiated spinel", of formula $LiAB_2O_4$, alternatively $Li[A]_{16c}[B_2]_{16d}O_4$, i.e., in which the A cations are displaced from tetrahedral 8a sites of the normal spinel structure to octahedral 16c sites along with the added lithium. In the lithiated-spinels, the ratio of cations to anions is 1:1, which is sometimes referred to as a rock salt stoichiometry.

Lithiated-spinel structures with the ideal spinel configuration of atoms also can be represented in spinel notation by the formula $Li_{2(16c)}[M_{2(16d)}]O_{4(32e)}$, where 16c and 16d refer to all the octahedral sites and 32e to the cubic-close-packed oxygen sites of the crystallographic space group, Fd-3m. This space group, is also adopted by the prototypic structure of the mineral 'spinel', $Mg_{(8a)}Al_{2(16d)}O_{4(32e)}$, in which the magnesium ions occupy the tetrahedral 8a sites and aluminum the octahedral 16d sites and by the lithium-manganese-oxide spinel structure, $Li_{(8a)}Mn_{2(16d)}O_{4(32e)}$, in which the lithium ions occupy the tetrahedral 8a sites and manganese ions the octahedral 16d sites. This cubic space group is used herein for convenience to simplify the structural discussion of the lithiated-spinel materials described herein and, particularly, because spinel and lithiated-spinel structures can adopt lower symmetry, as is the case for the spinel, $Mn_3O_4$, and the lithiated spinel, $Li_2[Mn_2]O_4$, respectively, both of which have tetragonal symmetry, $I4_1/amd$.

The crystallographic symmetry of the cobalt-free lithiated-spinel structures described herein is therefore not restricted to one space group.

It should be noted that lithiated spinels, $Li_{2(16c)}[M_{2(16d)}]O_{4(32e)}$, can also be regarded as having a rock-salt-type structure because the positively charged Li and M cations occupy all the octahedral sites (16c and 16d) of a cubic-close-packed oxygen lattice. The materials may include ordered and/or partially-disordered lithiated-spinel (rock salt) $LiMn_xNi_yM_zO_2$ electrode structures (alternatively $Li_2Mn_{2x}Ni_yM_{2z}O_4$), in which the disorder occurs, for example, between the lithium ions on the octahedral 16c sites and the metal ions on the octahedral 16d sites of a structure with predominant lithiated-spinel character. Such disorder can result in structures with increasing layered character or, alternatively, to structures with a more random distribution of cations in localized regions of the electrode structure, thereby affecting the electrochemical signature and voltage profile of the cell during charge and discharge. Some localized disorder of the lithium and other metal ions between octahedral and tetrahedral sites may also be possible in these electrode structures. During the electrochemical extraction of lithium during cell charging and reinsertion of lithium during cell discharge in the lithiated-spinel electrodes of described herein, the lithium ions diffuse predominantly through a 3-dimensional intersecting pathway of 8a tetrahedra and 16c octahedra (wherein 8a and 16c refer to crystallographic designations of specific spinel crystal lattice sites). It should, however, be recognized that any disorder of the Li, Mn, Ni or metal (M) ions, as well as the presence of a structurally-integrated layered component in the structure of the electrode material will likely affect these diffusion pathways and the profiles of the electrochemical charge and discharge reactions expected for ordered lithium-metal-oxide spinel electrodes, which are characterized by two-phase (constant voltage) behavior. It can therefore be understood that during electrochemical charge and discharge of the lithiated-spinel electrodes, the lithium-ions, in particular, will be disordered over both tetrahedral and octahedral sites of the structure.

The compositional space, structural features and atomic arrangements of the lithiated-spinel-related materials described herein are broad in scope, the electrochemical properties of which will be dependent on the selection of the metal cations, M, and the location of the electrochemically-active- and electrochemically-inactive metal ions within the ordered- or partially-disordered lithiated-spinel-related structures.

Figure 1B:
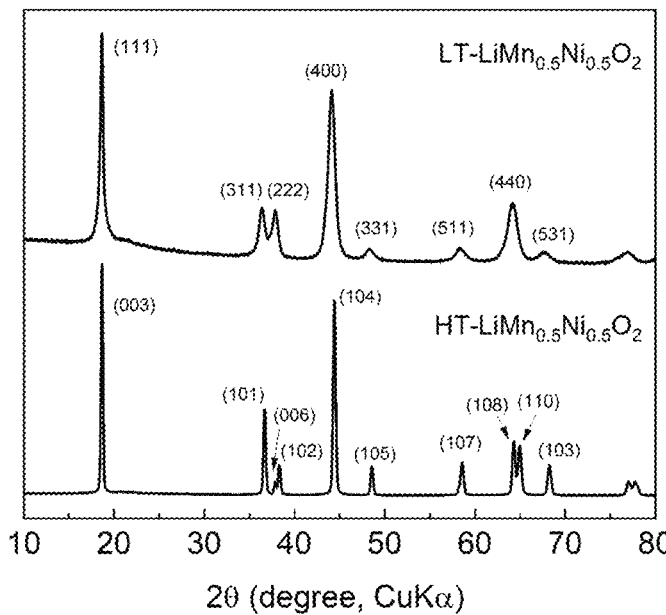
FIG. 1B depicts the observed XRD pattern of LT-$LiMn_{0.5}Ni_{0.5}O_2$ with cubic symmetry and the simulated XRD pattern of HT-$LiMn_{0.5}Ni_{0.5}O_2$ with trigonal symmetry.

There is a remarkable crystallographic anomaly between a disordered lithiated-spinel LT-$LiMn_{0.5}Ni_{0.5}O_2$ structure described herein, alternatively designated LT-$Li_2MnNiO_4$ for convenience, and a disordered layered LT-$LiMn_{0.5}Ni_{0.5}O_2$ structure with the same chemical formula and composition overall, as described as follows. FIG. 1A shows the observed XRD pattern of a LT-$Li_2MnNiO_4$ sample, synthesized by a solid-state reaction of $Li_2CO_3$ and $Mn_{0.5}Ni_{0.5}(OH)_2$ precursors in air at 400° C. The diffraction peaks can be indexed to a cubic unit cell (space group=Fd-3m) with lattice parameter, $\alpha=8.217$ Å. In contrast, the well-known, polymorphic layered structure, HT-$LiMn_{0.5}Ni_{0.5}O_2$ prepared at higher temperature, typically 1000° C., has a complex structure with overall trigonal symmetry, $R\overline{3}m$ (also referred to as R-3m), in which approximately 9% of the transition metals reside in the lithium layers, as described by Meng et al. in *Chemistry of Materials*, Volume 17, pages 2386-2394 (2005). This difference in crystallographic symmetry, which introduces more diffraction peaks in the XRD pattern of HT-LiMn$_{0.5}$Ni$_{0.5}$O$_2$ makes it extremely difficult to distinguish the high-symmetry (cubic) LT-Li$_2$MnNiO$_4$ product from the lower-symmetry (trigonal) product, HT-LiMn$_{0.5}$Ni$_{05}$O$_2$, the XRD pattern of which is reported by Meng et al. in the above-mentioned reference, and also shown in the simulated XRD pattern of HT-LiMn$_{0.5}$Ni$_{0.5}$O$_2$ in FIG. 1B.

Figure 1C:
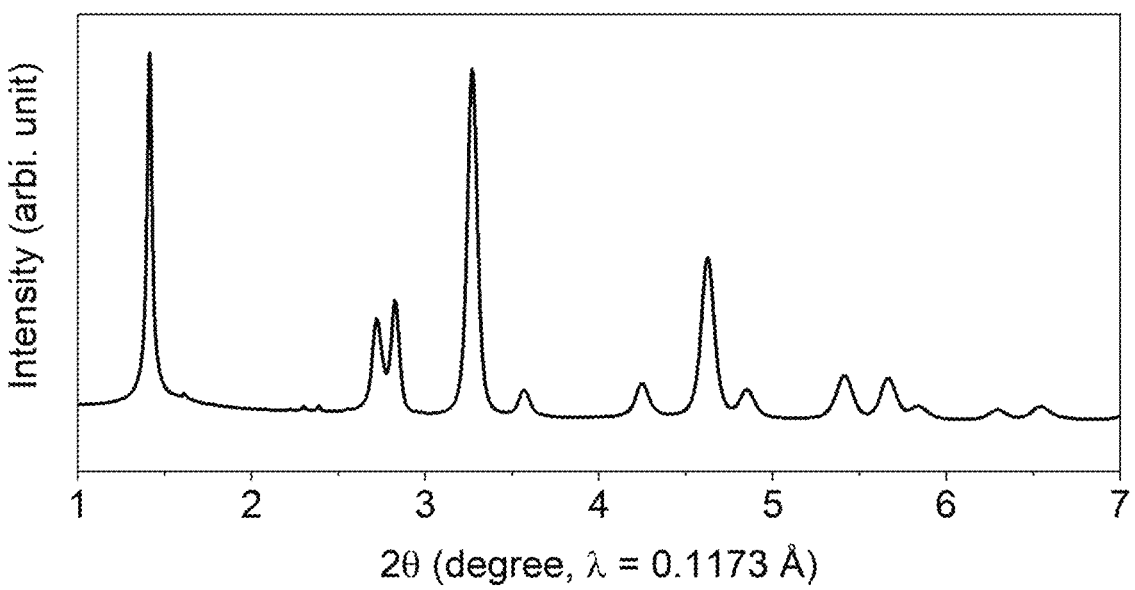
FIG. 1C depicts the observed synchrotron XRD pattern of LT-$LiMn_{0.5}Ni_{0.5}O_2$.
Figure 1D:
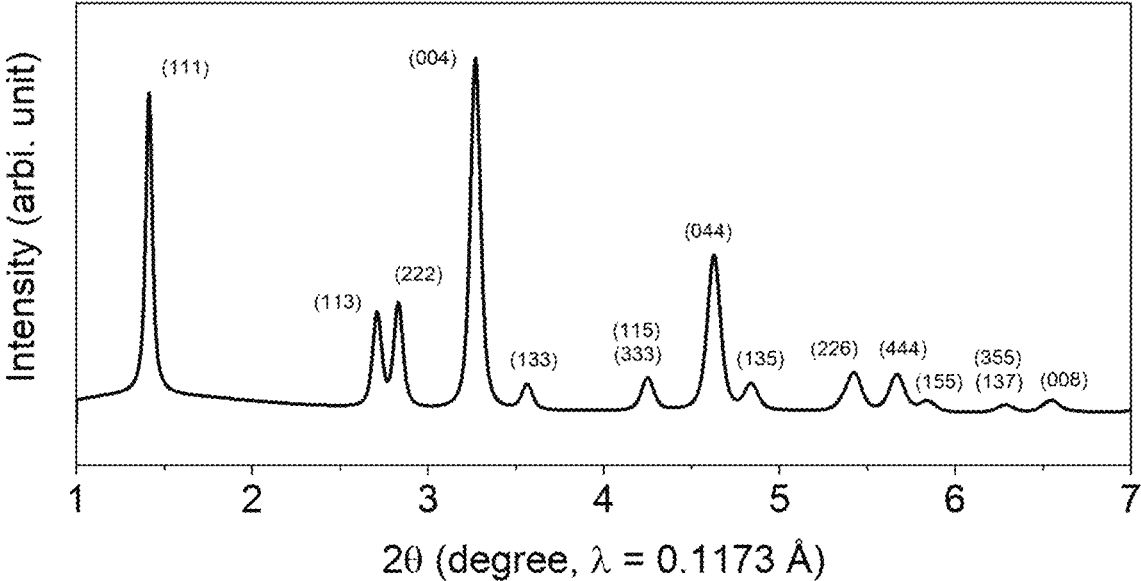
FIG. 1D depicts the calculated synchrotron XRD pattern of a lithiated-spinel model, LT-$LiMn_{0.5}Ni_{0.5}O_2$, indexed to cubic Fd-3m symmetry.

A structural (Rietveld) refinement of the XRD pattern of a LT-Li$_2$MnNiO$_4$ sample (FIG. 1C) using synchrotron data obtained from the Advanced Photon Source at Argonne National Laboratory not only confirmed that the peaks could be matched to a cubic structure (space group Fd-3m) but also that 17% of the Li ions on the 16c sites were exchanged with Mn/Ni ions on the 16d sites of an ideal, ordered-lithiated-spinel Li$_{2(16c)}$[M$_{2(16d)}$]O$_{4(32e)}$ structure (FIG. 1D). Constraining the Mn:Ni ratio to be 1:1 during the refinement yielded a disordered rock salt configuration with strong lithiated-spinel-type character, (Li$_{0.83}$M$_{0.17}$)$_{2(16c)}$ [Li$_{0.17}$M$_{0.83}$]$_{2(16d)}$O$_{4(32e)}$ (M=Mn, Ni) relative to the fully-ordered arrangement Li$_{2(16c)}$[Mn$_{0.5}$Ni$_{0.5}$]$_{2(16d)}$O$_{4(32c)}$. (See Table 2 in Example 6 for the full results of this refinement.) This level of Li/M site-exchange is significantly higher than it is in the Co-based lithiated-spinel materials, LT-LiCo$_{1-x}$Al$_x$O$_2$, in which there is about 2% of site-exchange between the lithium and cobalt/aluminum ions, as reported by Lee et al., in *ACS Applied Energy Materials*, Volume 2, pages 6170-6175 (2019).

Figure 1E:
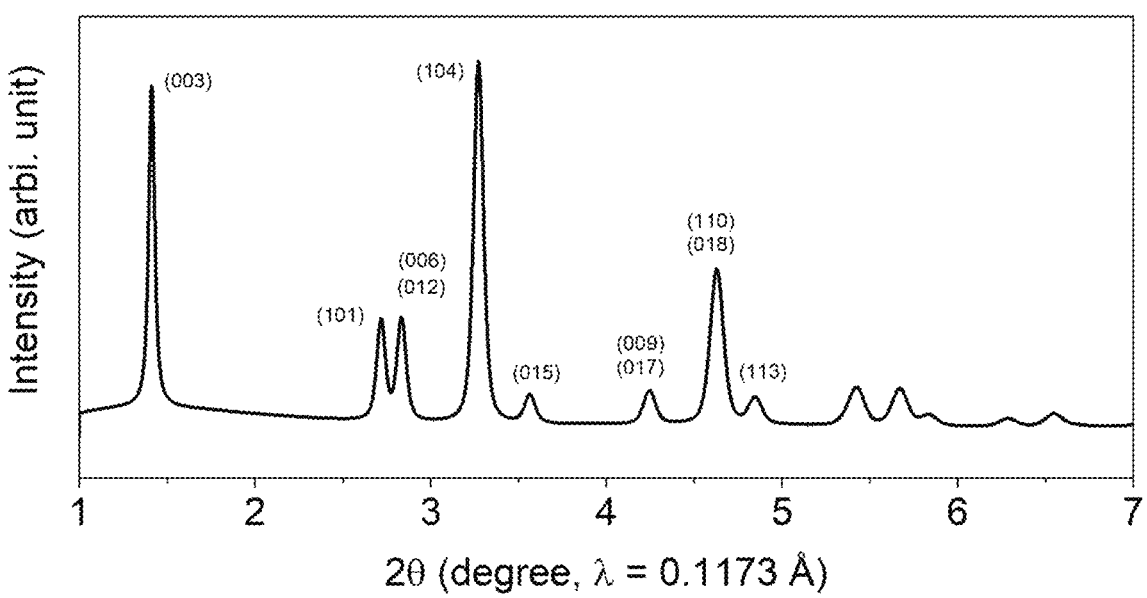
FIG. 1E depicts the calculated synchrotron XRD pattern of a layered model, LT-$LiMn_{0.5}Ni_{0.5}O_2$, indexed to trigonal R-3m symmetry.

Surprisingly, a second Rietveld refinement of the XRD peaks of the LT-Li$_2$MnNiO$_4$ (LT-LiMn$_{0.5}$Ni$_{0.5}$O$_2$) sample showed that the pattern could also be matched to a disordered layered structure with cubic symmetry (Li$_{0.17}$M$_{0.83}$) [Li$_{0.83}$Mo$_{0.17}$]O$_2$ in which approximately 5/6 (about 83%) of the M cations and approximately 1/6 (about 17%) of the Li$^+$ ions resided in alternate layers of a cubic-close-packed structure, yielding an essentially identical XRD pattern to the disordered lithiated-spinel arrangement described above (FIG. 1E). (See Table 3 in Example 6 for the full results of this refinement.) The refinement of this model, using the lower symmetry space group R-3m to allow for cation disorder between the layers, yielded a c/$\alpha$ ratio=4.92 which, within experimental error is, for all intents and purposes, very close or equivalent to the value of 4.90 for a cubic unit cell. Such a crystallographic anomaly, i.e., a situation that deviates from what is expected or normal, would also exist between a perfectly ordered, cubic lithiated-spinel structure, such as Li$_2$[Co$_2$]O$_4$, and its perfectly ordered, trigonal layered counterpart, LiCoO$_2$, but only if the layered structure is ideally cubic close-packed (i.e., with a c/$\alpha$ ratio of 4.90) which, in practice, it is not (c/$\alpha$=4.99), as highlighted by Rossen et al. in *Solid State Ionics*, Volume 62, pages 53-60 (1993).

Small variations in the exact chemical composition and symmetry of electrode materials can occur, for example, during synthesis, and through experimental error when calculating composition or determining crystallographic lattice constants and crystal symmetry with high precision which will be dependent on the quality of the materials themselves and the instrumentation used for such analyses. Thus, there may be small deviations in crystallographic composition and symmetry of the electrode materials described herein. For example, the determined lithium, transition metal/M, and/or oxygen, content of the material can vary by up to about 5 percent from an ideal 1:1:2 respective elemental stoichiometry. In electrode materials containing substituted cations or anions, such as aluminum or fluorine ions, the degree of substitution can vary by less than 2 percent when less than 10 atom percent of the transition metal ions or oxygen ions are replaced by aluminum or fluorine ions, respectively. From a crystallographic standpoint, the cubic-close-packed oxygen lattice of the disordered lithiated spinel, disordered layered and disordered rock salt components can deviate slightly from ideal cubic-close-packing as a result of localized ordering of the cations, imperfections, dislocations or cationic or anionic defects. For example, localized ordering within a disordered layered component with trigonal symmetry, R-3m, may result in slight deviations from an ideally cubic-close-packed oxygen lattice in which the crystallographic ratio of the c and $\alpha$ lattice parameters of the unit cell (c/a) is 4.90, by about 0.5 percent to a c/$\alpha$ ratio of about 4.92. Furthermore, the cubic-close-packed oxygen lattice of the disordered lithiated spinel, disordered layered and disordered rock salt components can deviate from ideal cubic-close-packing such that the crystal symmetry of one or more of the components is lowered by an anisotropic variation of at least one lattice parameter length of the unit cell by up to about 5 percent, preferably by up to about 2 percent.

With respect to the Mn:Ni ratio in some embodiments of the materials described herein, it has been found that a 1:1 ratio typically provides better performing electrodes. However, from a cost viewpoint, because manganese is less expensive than nickel, it could be advantageous to increase the Mn content in the Mn:Ni ratio to higher levels at the expense of lower performance, in which case the Mn:Ni ratio can vary between 2:1 and 1.1:1. As used herein in conjunction with numerical values for the ratios or proportions of elements in an empirical formula (e.g., 1:1, 2:1, or 1:1:2), the word "about" means that the specified values can vary by up to 5 percent from the stated value, which will not unduly affect the performance of the material in a lithium electrochemical cell. For example, "about 1:1 Mn to Ni" means to Mn and Ni components of the ratio can vary by up to 5%, such that the ratio of Ni to Mn can be from 1.05:1 to 0.95:1; and "about 1:1:2 Li to M to O" means that each of the components of the ratio can vary by up to 5%, i.e., the Li and M components of the ratio can be from 1.05 to 0.95, and the O component of the ratio can be from 2.1 to 1.9.

Figure 15:
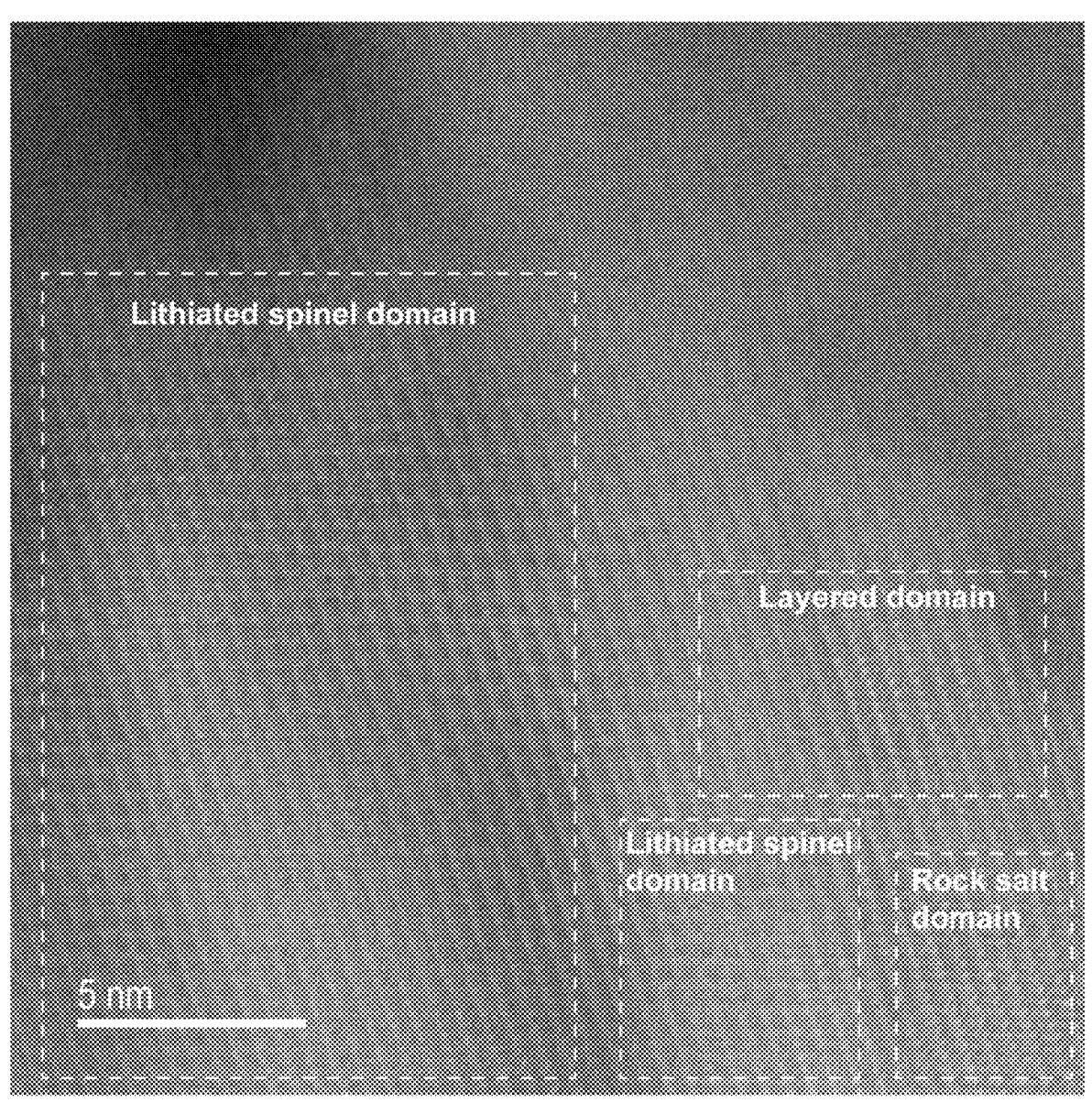
FIG. 15 depicts a high-resolution transmission electron microscope image of LT-$LiMn_{0.5}Ni_{0.5}O_2$.

Of the two structural models described above, it is believed that a partially disordered (17%) lithiated-spinel model, (Li$_{0.83}$M$_{0.17}$)$_{2(16c)}$[Li$_{0.17}$M$_{0.83}$]$_{2(16d)}$O$_{4(32e)}$, in which interconnected 3-D pathways for Li-ion transport are still likely to exist, may be the more favored structural model for LT-Li$_2$MnNiO$_4$ (LT-LiMn$_{0.5}$Ni$_{0.5}$O$_2$). This finds some support in the voltage profile of the Li/LT-LiMn$_{0.5}$Ni$_{0.5}$O$_2$ cell shown in FIG. 2, which is defined by major electrochemical processes at approximately 3.6 and 4.6 V, consistent with the difference of about 1 V that separates the reversible lithium extraction reactions from tetrahedral and octahedral sites in a Li$_x$Mn$_2$O$_4$ (0≤x≤2) spinel electrode, respectively. Furthermore, lithium extraction from a layered HT-LiMn$_{0.5}$Ni$_{0.5}$O$_2$ electrode occurs at a significantly higher potential (about 3.9 V) as shown by Ohzuku and Makimura in *Chemistry Letters*, Volume 30, No. 8, pages 744-745 (2001). Nevertheless, the possibility of coexistence between disordered rock salt materials, such as those containing a disordered lithiated spinel component, a disordered layered component, and a disordered rock salt component (i.e., other than a disordered lithiated spinel component and a disordered layered component) cannot be discounted. Indeed, high-resolution transmission electron microscopy (HRTEM) images of a LT-LiMn$_{0.5}$Ni$_{0.5}$O$_2$ sample obtained from the Environmental Molecular Sciences Laboratory at the Pacific Northwest National Laboratory have confirmed the coexistence of a lithiated-spinel component in a $LiMn_{0.5}Ni_{0.5}O_2$ electrode, which is structurally integrated with layered- and rock salt components in a common, shared metal oxide matrix, as demonstrated in FIG. 15. In FIG. 15, the characteristic pattern of a predominately layered structure has prominent, relatively evenly spaced rows (i.e., layers) of the transition metal ions (e.g., the rows of lighter dots in the portion labeled "disordered layered" FIG. 15). In contrast, the lithiated spinel structure has a cross-hatched appearance, while the region attributed to "disordered rock salt" has the prominent rows of a layered structure, but the rows are less distinct from the inter-row spaces.

Figure 5:
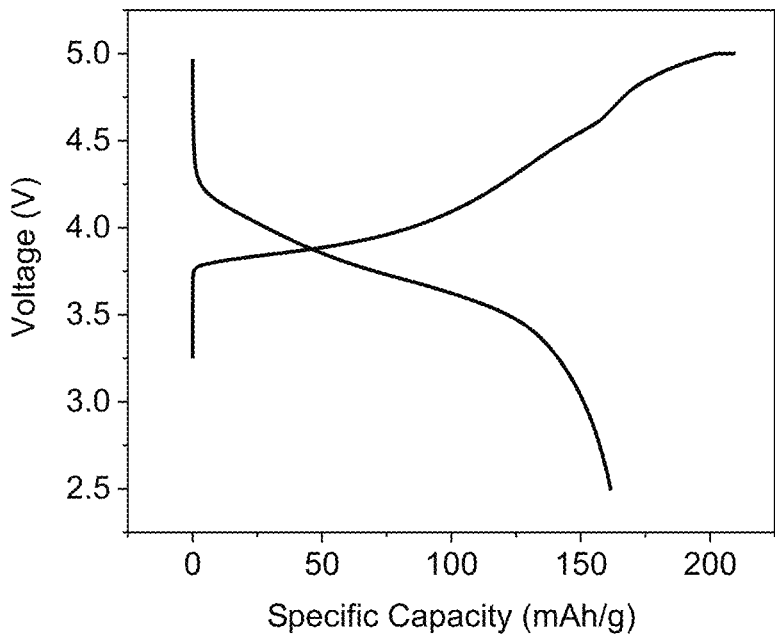
FIG. 5 depicts the initial voltage (V) vs. specific capacity (mAh/g) plot of a Li/LT-$LiMn_{0.45}Ni_{0.45}Al_{0.1}O_2$ cell.

Unlike the two-plateau behavior of a Li/LT-$LiMn_{0.5}Ni_{0.5}O_2$ cell (FIG. 2), the voltage profile of a cell with an Al-substituted LT-$LiMn_{0.45}Ni_{0.45}Al_{0.1}O_2$ electrode appears to operate largely by an apparent single-phase process with a gradually sloping voltage profile at an average voltage of 3.75 V (FIG. 5). This feature is similar to that observed in a Mg-substituted electrode, LT-$LiMn_{0.45}Ni_{0.45}Mg_{0.1}O_2$, and in an Al-substituted LT-$LiCo_{1-x}Al_xO_2$ electrode which, in the latter case, is attributed to some disorder of Al between the octahedral 16c sites and the octahedral 16c sites of a lithiated-spinel structure with space group symmetry Fd-3m, as described by Lee et al. in *ACS Applied Energy Materials*, Volume 2, pages 6170-6175 (2019). Such substitution in the electrode materials can therefore be used to tailor the electrochemical profile of a lithium cell.

The electrode materials described herein can include one or more disordered lithiated-spinel components, structurally integrated with one or more disordered layered components. Furthermore, because the cation-to-anion ratio in the disordered lithiated-spinel and disordered structures is about 1:1, both components can also be regarded as having partially disordered rock salt structures, such that disordered-layered-and/or disordered-rock salt components coexist with the disordered lithiated-spinel electrode components. Therefore, the $LiMn_xNi_yM_zO_2$ electrode materials of this invention can include one or more components comprising a partially disordered lithiated-spinel component and a partially-disordered layered component.

In an ideal, fully-ordered lithiated spinel of empirical formula $Li[TM]O_2$, where TM stands for transition metal, the transition metal ions and lithium ions are arranged in two different types of alternating layers in which a first layer comprises 75% TM ions and 25% Li ions, and an adjacent second layer comprises 25% TM ions and 75% lithium ions. Similarly, in a fully-ordered, layered structure of empirical formula $Li[TM]O_2$, the TM ions and Li ions are arranged in two different types of alternating layers in which a first layer comprises 100% TM ions, and a second adjacent layer comprises 100% Li ions. In the partially-disordered lithiated spinel and layered component structures of the material of empirical formula $LiMn_xNi_yM_zO_2$ described herein, a portion of the TM ions of the first layer are replaced by Li ions and a portion of the Li ions in the second layer are replaced by TM ions, leading to disorder among the ions in the different layers. Preferably, in terms of percentage, the extent of the disorder of the Mn/Ni/M cations relative to the Li cations in the alternating first and second layers ranges from 80:20 to 90:10, and more preferably from 81:19 to 85:15.

Some embodiments of the electrode materials described herein constitute a structurally-integrated, lithium-metal-oxide composite electrode material of empirical formula $LiM^1O_2$ for an electrochemical cell wherein $M^1$ comprises a combination of Mn and Ni transition metal ions; the crystal structure of the material comprises domains of a disordered lithiated-spinel component, a disordered layered component, and a disordered rock salt component, in which the oxygen lattice of the components is cubic-close packed, and in which greater than 10 percent and less than 20 percent of lithium ions of the lithiated spinel and layered components are disordered among the octahedral sites normally occupied by the transition metal ions, and a corresponding percentage of the transition metal ions are disordered among the octahedral sites normally occupied by lithium ions in fully-ordered, lithiated spinel and layered structures.

In a further embodiment, any of the electrode materials described herein can be reacted further, or physically blended, with one or more other lithium metal oxide materials, e.g., cobalt-containing lithium-metal-oxide components, such as layered or lithiated-spinel $LiCoO_2$ or substituted components such as LT-$LiCo_{1-x}Al_xO_2$ reported by Lee et al. in *ACS Applied Energy Materials*, Volume 2, pages 6170-6175 (2019) to form either two-component- or multi-component electrode structurally integrated materials that contain the lithiated-spinel $LiMn_xNi_yM_zO_2$ materials described herein. Ideally, the cobalt content in these 'mixed' electrodes should be as low as possible, preferably close to zero, when it is possible that some Co may be incorporated within the lithiated-spinel structure. A specific embodiment, therefore, includes lithiated-spinel $LiMn_xNi_yM_zO_2$ materials in which M can be Co with z at most 0.2 for x+y+z=1, and preferably less than, or equal to z=0.1, or most preferably, less than or equal to 0.05 to keep the Co content as low as possible.

In a further aspect, the lithium-manganese-nickel-oxide ($LiMn_xNi_yM_zO_2$ or $LiM^1O_2$) materials of the invention can be mechanically blended with or structurally-integrated with one or more other ordered or disordered electrode active material such as a lithium metal oxide, a lithium metal polyanionic material, a partially-fluorinated derivative of the lithium metal oxide, and a partially-fluorinated derivative of the lithium metal polyanionic material. Such materials can have layered, spinel, lithiated spinel, and olivine-type structures. In one embodiment, the lithiated spinel of formula $LiMn_xNi_yM_zO_2$ or $LiM^1O_2$ is mechanically blended with or structurally-integrated with a layered $Li_2M^4O_3$ materials and structures, in which $M^4$ is one or more metal cations, selected preferably from Mn, Ti, and Zr cations. In another embodiment, the lithiated spinel of formula $LiMn_xNi_yM_zO_2$ or $LiM^1O_2$ is mechanically blended with or structurally-integrated with one or more ordered or disordered, layered ($LiM^5O_2$) or lithiated-spinel ($LiM^1O_2$) materials and structures, in which $M^5$ is one or more metal cations, selected preferably from first-row transition metal cations and optionally one or more non-transition metal cations, such as, e.g., Mn, Ni, and Co cations, an Al cation, a Ga cation, and a Mg cation, and partially-fluorinated derivatives thereof; and $M^7$ comprises two or more cations selected from the group consisting of a Mn cation, a Ni cation, a Co cation, and a $M^6$ cation; and $M^6$ comprises at least one cation other than Mn Ni, and Co cations (e.g., Al, Ga, Mg, and Ti, cations). Optionally, less than 10 atom percent of the oxygen of the electrode active materials can be exchanged by fluorine. As such, these electrode active materials can be generally described as having blended or integrated structures with layered- and lithiated-spinel character. Specific examples of composite $aLi_2M^4O_3\bullet(1-b)LiM^5O_2$ materials, represented in composite notation and by generalized $LiM^5O_2$ formulae, are provided below; the examples include a slightly disordered lithiated-spinel component structure, $LiCo_{0.85}Al_{0.15}O_2$ and a layered component structure, $LiCo_{0.98}Ti_{0.01}Mg_{0.01}O_2$. Also described herein are lithium-rich lithiated spinel materials of empirical formula $LiMn_xNi_yM_zO_2$; wherein M comprises Co and, optionally, other metals besides manganese and nickel; $x+y+z=1$; $0<x<1.0$; $0<y<1.0$; $0\leq z\leq0.2$; and having a molar Mn:Ni ratio in the range of about 1:1.1 to about 1:2 (e.g., about 1:1.2 to about 1:1.9, or about 1; 1.5 to about 1:1.8. Preferably, $0\leq z\leq0.1$. In some preferred embodiments, M comprises Co and Al. An example of a Ni-rich lithiated spinel material is $LiMn_{0.35}Ni_{0.6}Co_{0.01}Al_{0.04}O_2$, alternatively $LiMn_{0.7}Ni_{1.2}Co_{0.02}Al_{0.08}O_2$, two samples of which were prepared, one at 400° C. and one at 500° C. Both materials $LiMn_xNi_yM_zO_2$ electrode materials described herein can be used as protective coatings for other underlying lithium-metal-oxide electrode materials, such as layered Li—Ni—Mn—O and Li—Mn—Ni—Co—O (NMC) electrode materials and spinel Li—Mn—O (LMO) electrode materials and substituted and compositional variations of these materials.

Non-limiting examples of cobalt-free, lithiated-spinel materials described herein are provided in Table 1, Section (a). Section (b) of Table 1 provides non-limiting examples of compositions comprising at least one cobalt-free lithiated spinel as described herein in combination with (e.g., structurally integrated with, or mixed with) at least one cobalt-containing component.

TABLE 1

| Lithiated-spinel $LiMn_xNi_yM_zO_2$ electrode compositions (M = one or more metal cations excluding M = Mn, Ni, Co) | | |
|---|---|---|
| Electrode Composition (net) | Molecular Mass (g) | Theoretical Capacity (mAh/g) (Amount of Li extracted) |
| a) Co-free compositions | | |
| $LiMn_{0.50}Ni_{0.50}O_2$ | 95.754 | 280.01 (1.0 Li) |
| $LiMn_{0.45}Ni_{0.45}Al_{0.10}O_2$ | 92.771 | 260.11 (0.9 Li) |
| $LiMn_{0.40}Ni_{0.40}Al_{0.20}O_2$ | 89.770 | 238.94 (0.8 Li) |
| $LiMn_{0.35}Ni_{0.35}Al_{0.30}O_2$ | 83.821 | 191.92 (0.6 Li) |
| $LiMn_{0.4}Ni_{0.4}Ti_{0.1}Mg_{0.1}O_2$ | 91.609 | 234.14 (0.8 Li) |
| b) Multi-component compositions comprising one or more lithiated-spinel $LiMn_xNi_yM_zO_2$ component and one or more Co-containing component | | |
| $LiMn_{0.45}Ni_{0.45}Al_{0.05}Co_{0.05}O_2$ | 94.369 | 269.91 (0.95 Li) |
| $LiMn_{0.40}Ni_{0.40}Al_{0.10}Co_{0.10}O_2$ | 92.983 | 259.52 (0.90 Li) |
| $LiMn_{0.45}Ni_{0.45}Co_{0.10}O_2$ | 95.966 | 279.39 (1.00 Li) | had X-ray diffraction spectra (FIG. 28 and FIG. 29) consistent with a structure comprising intergrown disordered lithiated-spinel and layered components. The 500° C. sample exhibited superior capacity, which may be attributed to a greater conversion of the lithiated spinel component towards a layered configuration (compare FIG. 30 with FIG. 31), as discussed in Example 11, below.

Non-limiting examples of structurally-integrated materials and compositions include, e.g.:

1. Layered-lithiated spinel:
   $0.1Li_2MnO_3\cdot0.9LiMn_{0.5}Ni_{0.5}O_2$
2. Layered-lithiated spinel-lithiated spinel:
   $0.1Li_2MnO_3\cdot0.8LiMn_{0.5}Ni_{0.5}O_2\cdot0.1LiCo_{0.85}Al_{0.15}O_2$
3. Layered-lithiated spinel-layered:
   $0.1Li_2MnO_3\cdot0.8LiMn_{0.5}Ni_{0.5}O_2\cdot0.1LiCo_{0.98}Ti_{0.01}Mg_{0.01}O_2$
4. Lithiated spinel-lithiated spinel
   $0.9LiMn_{0.5}Ni_{0.5}O_2\cdot0.1LiCo_{0.85}Al_{0.15}O_2$ The electrode materials described herein can include surface treatments and coatings to protect the surface of the electrode particles from undesirable reactions with the electrolyte, for example, by treating or coating the electrode particles with layers of metal-oxide, metal-fluoride or metal-phosphate materials to shield and protect the electrodes from highly oxidizing charging potentials and from other undesirable effects, such as electrolyte oxidation, oxygen loss, and/or dissolution. Such surface protection enhances the surface stability, rate capability and cycling stability of the electrode materials. In some embodiments the lithiated-spinel $LiCo_{1-x}Al_xO_2$ ($0<x<0.5$) materials, may be used as protective layers or coatings for the lithiated-spinel $LiMn_xNi_yM_zO_2$ electrode materials described herein, particularly when formed by grinding or ball milling the electrode materials with lithiated-spinel $LiCo_{1-x}Al_xO_2$ ($0<x<0.5$) compounds. Conversely, the lithiated-spinel As used herein the term "lithium battery" refers to electrochemical cells and combinations of electrochemical cells in which lithium (e.g., lithium ion) shuttles between a Si anode and a cathode, and includes so-called full cells, as well as so-called half-cells (e.g. comprising a lithium metal anode).

Electrodes for lithium electrochemical cells typically are formed by coating a slurry of electrode active material in a solvent with a polymeric binder (e.g., poly(vinylidene difluoride); PVDF) onto a current collector (e.g., metal foil, conductive carbon fiber paper, and the like), and drying the coating to form the electrode. Some examples of electrode active materials can be found, e.g., in Mekonnen, Y., Sundararaj an, A. & Sarwat, A. I. "A review of cathode and anode materials for lithium-ion batteries," *SoutheastCon* 2016, Norfolk, VA, pp. 1-6, (2016), which is incorporated herein by reference in its entirety.

The electrodes utilize binders (e.g., polymeric binders) to aid in adhering cathode active materials to the current collectors. In some cases, the binder comprises a poly (carboxylic acid) or a salt thereof (e.g., a lithium salt), which can be any poly(carboxylic acid), such as poly(acrylic acid) (PAA), poly(methacrylic acid), alginic acid, carboxymethylcellulose (CMC), poly(aspartic acid) (PAsp), poly(glutamic acid) (PGlu), copolymers comprising poly(acrylic acid) chains, poly(4-vinylbenzoic acid) (PV4BA), and the like, which is soluble in the electrode slurry solvent system. The poly(carboxylic acid) can have a $M_n$, as determined by GPC, in the range of about 1000 to about 450,000 Daltons (preferably about 50,000 to about 450,000 Daltons, e.g., about 130,000 Daltons). In some other embodiments, the binder may comprise anionic materials or neutral materials such as fluorinated polymer such as poly(vinylidene difluoride) (PVDF), carboxymethylcellulose (CMC), and the like.

Lithium-ion electrochemical cells described herein comprise a cathode (positive electrode), an anode (negative electrode), and an ion-conductive separator between the cathode and anode, with the electrolyte in contact with both the anode and cathode, as is well known in the battery art. It is well understood that the function of a given electrode switches from being a positive or negative electrode depending on whether the electrochemical cell is discharging or charging. Nonetheless, for the sake of convenient identification, the terms "cathode" and "anode" as used herein are applied as identifiers for a particular electrode based only on its function during discharge of the electrochemical cell.

Cathodes typically are formed by combining a powdered mixture of the active material and some form of carbon (e.g., carbon black, graphite, or activated carbon) with a binder such as (polyvinylidene difluoride (PVDF), carboxymethylcellulose, and the like) in a solvent (e.g., N-methylpyrrolidone (NMP) or water) and the resulting mixture is coated on a conductive current collector (e.g., aluminum foil) and dried to remove solvent and form an active layer on the current collector.

The anode comprises a material capable of reversibly releasing and accepting lithium during discharging and charging of the electrochemical cell, respectively. Typically, the anode comprises a carbon material such as graphite, graphene, carbon nanotubes, carbon nanofibers, and the like, a silicon-based material such as silicon metal particles, a lead-based material such as metallic lead, a nitride, a silicide, a phosphide, an alloy, an intermetallic compound, a transition metal oxide, and the like. The anode active components typically are mixed with a binder such as (polyvinylidene difluoride (PVDF), carboxymethyl cellulose, and the like) in a solvent (e.g., NMP or water) and the resulting mixture is coated on a conductive current collector (e.g., copper foil) and dried to remove solvent and form an active layer on the current collector.

In some embodiments the anode comprises silicon-containing particles, preferably combined with carbon particles. The silicon-containing particles can be silicon nanoparticles, silicon/silicon oxide (Si/SiOx) nanocomposite particles, silicon nanotubes, microporous silicon, an alloy or intermetallic compound of silicon with a metal such as magnesium, calcium, nickel, iron, or cobalt. Some examples of useful silicon-containing materials are discussed in Ma et al., *Nano-Micro Lett.*, 2014, 6 (4):347-358, which is incorporated herein by reference in its entirety. Some other examples are mentioned in Zhu et al., *Chemical Science,* 2019 10, 7132., which is incorporated herein by reference in its entirety. Si/SiOx nanocomposite particles include e.g., materials described in co-owned application Ser. No. 15/663,268 to Wenquan Lu et al., filed on Jul. 28, 2017, now U.S. Pat. No. 10,714,745, which is incorporated herein by reference in its entirety.

Preferably, the silicon-containing particles, when utilized in the anode, have an average size in the range of about 50 to about 200 nm, more preferably about 70 to about 150 nm. The carbon particles can be carbon microparticles or nanoparticles. Non-limiting examples of carbon materials include, e.g., carbon black, graphite, carbon nanotubes, carbon nanofibers, and graphene. Preferably, the electrode includes silicon and carbon particles in a respective weight ratio (Si:C) of about 1:9 to about 9:1, more preferably about 1:5 to about 8:1. The binder typically comprises about 5 to about 30 percent by weight (wt %), preferably about 10 to about 20 wt %, of the active material coated on the current collector, based on the combined weight of the silicon, carbon and binder in the finished electrode (i.e., after drying). The loading of silicon and carbon particles and binder on the current collector typically is in the range of about 0.6 to about 3.2 mg/cm², preferably about 0.8 to about 2.7 mg/cm².

As used herein, the terms "structurally-integrated" and "structurally-integrated composite" when used in relation to a lithium metal oxide a material refers to materials that include domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite lithium metal oxides are different from and generally have different properties than mere mixtures or combinations of two or more metal oxide components (for example, mere mixtures do not share a common oxygen lattice).

In electrochemical cell and battery embodiments described herein, the electrolyte comprises an electrolyte salt (e.g., an electrochemically stable lithium salt or a sodium salt) dissolved in a non-aqueous solvent. Any lithium electrolyte salt can be utilized in the electrolyte compositions for lithium electrochemical cells and batteries described herein, such as the salts described in Jow et al. (Eds.), *Electrolytes for Lithium and Lithium-ion Batteries*; Chapter 1, pp. 1-92; Springer; New York, NY (2014), which is incorporated herein by reference in its entirety.

Non-limiting examples of lithium salts include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, combinations of two or more thereof, and the like. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 5 M, e.g., about 0.5 M to 2 M, or 1 M to 1.5 M. A preferred lithium salt is LiPF$_6$.

The non-aqueous solvent for the electrolyte compositions include the solvents described in Jow et al. (Eds.), *Electrolytes for Lithium and Lithium-ion Batteries*; Chapter 2, pp. 93-166; Springer; New York, NY (2014), which is incorporated herein by reference in its entirety. Non-limiting examples of solvents for use in the electrolytes include, e.g., an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds.

In some embodiments, the non-aqueous solvent for a lithium electrochemical cell as described herein can be an ionic liquid. Any electrochemically stable ionic liquid solvent can be utilized in the electrolytes described herein, such as the solvents described in Jow et al. (Eds.), *Electrolytes for Lithium and Lithium-ion Batteries*; Chapter 4, pp. 209-226; Springer; New York, NY (2014), which is incorporated herein by reference in its entirety. In the case of lithium electrochemical cells and batteries, the ionic liquid can optionally include a lithium cation, and can act directly as the electrolyte salt.

The electrolyte compositions for lithium electrochemical cells and batteries described herein also can optionally comprise an additive such as those described in Jow et al. (Eds.), *Electrolytes for Lithium and Lithium-ion Batteries*; Chapter 3, pp. 167-182; Springer; New York, NY (2014), which is incorporated herein by reference in its entirety. Such additives can provide, e.g., benefits such as SEI, cathode protection, electrolyte salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

Electrochemical cells typically comprise a cathode, an anode typically comprising carbon, silicon, lead, metallic lithium, some other anode active material, or a combination thereof; and a porous separator between the cathode and anode, with the electrolyte in contact with the anode, the cathode and the separator.

A battery can be formed by electrically connecting two or more such electrochemical cells in series, parallel, or a combination of series and parallel. The electrodes described herein preferably are utilized as the anode in a full-cell configuration in lithium-ion and sodium-ion cells and batteries. Electrochemical cells and battery designs and configurations, anode and cathode materials, as well as electrolyte salts, solvents and other battery or electrode components (e.g., separator membranes, current collectors), which can be used in the electrolytes, cells and batteries described herein, are well known in the secondary battery art, e.g., as described in "Lithium Batteries Science and Technology" Gholam-Abbas Nazri and Gianfranco Pistoia, Eds., Springer Science+Business Media, LLC; New York, NY (2009), which is incorporated herein by reference in its entirety.

The separator component of the lithium-ion cell can be any separator used in the lithium battery art. A typical material is a porous polyalkylene material such as microporous polypropylene, microporous polyethylene, a microporous propylene-ethylene copolymer, or a combination thereof, e.g., a separator with layers of different polyalkylenes; a poly(vinylidene-difluoride)-polyacrylonitrile graft copolymer microporous separator; and the like. Examples of suitable separators are described in Arora et al., *Chem. Rev.* 2004, 104, 4419-4462, which is incorporated herein by reference in its entirety. In addition, the separator can be an ion-selective ceramic membrane such as those described in Nestler et al., *AIP Conference Proceedings* 1597, 155 (2014), which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as PVDF and the like to aid in adhering the active materials to the current collectors. In the cells and batteries described herein, the active cathodes are the lithiated-spinel materials, $LiMn_xNi_yM_zO_2$, defined herein, which optionally can be utilized with a carbon material such as graphite, and the anode active material typically is a lithium metal, carbon, and the like. Cell assembly typically is carried out on automated equipment. The first stage in the assembly process is to sandwich a separator between the anode and the cathode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed, the cell typically is subjected to at least one controlled charge/discharge cycle to activate the electrode materials and in some cases form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.,* 2016; 163 (14): A2999-A3009, which is incorporated herein by reference in its entirety. This procedure involves a 1.5 V tap charge for 15 minutes at C/3 current limit, followed by a 6-hour rest period, and then 4 cycles at C/10 current limit, with a current cutoff (i≤0.05 C) at the top of each charge.

Cathodes comprising the cobalt free lithiated spinel materials described herein can be utilized with any combination of anode and electrolyte in any type of rechargeable battery system that utilizes a non-aqueous electrolyte.

The following general methodology and non-limiting Examples are provided to illustrate certain features of the compositions and methods described herein.

METHODOLOGY 1. Synthesis of $LiMn_xNi_yM_zO_2$ (M=Al) Materials

A parent, unsubstituted $LiMn_{0.5}Ni_{0.5}O_2$ electrode material (x=0.5; y=0) is prepared by a 'low-temperature' method reported previously by Gummow et al. in *Mat. Res. Bull.* 27, 327 (1992), and U.S. Pat. No. 5,160,712. Cation substituted materials of formula $LiMn_xNi_yAl_zO_2$, for x=0.45, 0.35, 0.30; y=0.45, 0.35, 0.30; and z=0.1, 0.2, 0.3, respectively, as listed in Table 1, are prepared by solid-state reaction of lithium carbonate ($Li_2CO_3$, >99%), manganese hydroxide, nickel hydroxide, and aluminum nitrate ($Al(NO_3)_3 \cdot 9H_2O$, >99%)

precursors. Alternatively, mixed-metal precursors, such as manganese-nickel hydroxide, or metal oxide precursors, such as manganese dioxide, can be used. Stoichiometric amounts of the precursors are thoroughly mixed using a mortar and pestle, and fired in air at 400° C. in a furnace for approximately 6 days. The heating rate is about 2° C. per min. The samples are cooled in the furnace without controlling the cooling rate. Samples can also be prepared in air at higher temperature, i.e., at 450, 500, 550 and 600° C. to increase the layered character of the $LiMn_{0.5}Ni_{0.5}O_2$ and $LiMn_yNi_yAl_zO_2$ electrode structures.

It should be noted that for materials in which the Mn:Ni ratio is 1:1, and in which the manganese and nickel ions are tetravalent and divalent, respectively, for example $LiMn_{0.45}Ni_{0.45}Al_{0.10}O_2$, the full electrochemical capacity of the electrode (260 mAh/g, Table 1) would, in principle, be associated with the oxidation of $Ni^{2+}$ to $Ni^{4+}$ and the extraction of 0.9 $Li^+$ ions from an electrode structure in which only 45% of the non-lithium metal ions (Mn, Ni, Al) is nickel. It is anticipated that such an electrode composition would have significant cost and safety advantages over their nickel-rich NMC counterparts, for example, $LiNi_{0.8}Mn_{0.1}Co_{0.1}O_2$ (NMC811) and $LiNi_{0.6}Mn_{0.2}Co_{0.2}O_2$ (NMC622) in lithium-ion cells. In addition, nearest neighbor Mn—Ni interactions may assist electronic conductivity of these lithiated-spinel-related electrodes during electrochemical operation.

METHODOLOGY 2. Synthesis of Two-Component Materials Comprising a $LiMn_xNi_yAl_zO_2$ Component and a Cobalt-Containing Lithium-Metal-Oxide Component The materials of Example 1 are combined with a LT-$LiCoO_2$ lithiated-spinel product that is prepared at 400° C. as described by Lee et al. in *ACS Applied Energy Materials, Volume* 2, pages 6170-6175 (2019), either by mechanical blending, for example, by high-energy ball milling at room temperature, or by reaction in air at temperatures between 400 and 600° C. to yield composite electrode structures with two or more lithium-metal-oxide components that can be integrated structures or blended mixtures having either lithiated-spinel character or a combination of lithiated-spinel and layered character, and disordered structural variations thereof.

METHODOLOGY 3. Synthesis of $LT-LiM^1O_2$ Materials Using Flame Spray Pyrolysis (FSP) and Low Temperature Sintering A precursor solution is prepared by dissolving stoichiometric amounts of a nickel salt (e.g., nickel acetylacetonate), a cobalt salt (e.g., cobalt acetylacetonate), a manganese salt (e.g., manganese acetylacetonate) in the required Ni:Co:Mn_ratio for a target $LT-LiM^1O_2$ composition (where $M^1$ comprises Ni, Mn and Co, e.g., LT-NMC111 where Ni:Co:Mn is 1:1:1) and a small excess of a lithium salt (e.g., lithium propionate) to compensate for lithium loss in the flame, in a solvent. Typically, about 1 to about 10% excess lithium salt, and preferably less than 10% excess lithium salt, are dissolved in an appropriate solvent (i.e., a solvent capable of dissolving the salts, such as water, or an organic solvent (e.g., a polar organic solvent) a C1 to C6 alcohol (e.g., methanol ethanol, or propanol, isopropanol), a nitrile such as acetonitrile or propionitrile and the like, an amide such as N,N-dimethylformamide, acetamide, and the like), a C1 to C10 organic acid, such as formic acid, acetic acid, propionic acid, hexanoic acid, 2-ethylhexanoic acid, and the like, or a combination of two or more such solvents. A preferred solvent is acetonitrile and 2-ethylhexanoic acid (5:5 by volume) at a concentration of 0.31 mol/L. The precursor solution is then atomized with oxygen to form liquid droplets, which are sprayed into the methane/oxygen pilot flame of a FSP unit, thereby vaporizing and oxidizing the metal salts to form a precursor powder comprising the requisite ratio of transition metal ions to lithium ion for the target composition. The resulting powder is subsequently sintered at a temperature in the range of about 400 to about 650° C. in air for about 3 to about 5 days. In some embodiments, the transition metal and lithium salts comprise organic acid anions such as, e.g., acetate, propionate, acetylacetonate, and the like. Some preferred solvents suitable for use with the FSP method include polar organic solvents such as acetonitrile, 2-ethylhexanoic acid, or a combination of thereof.

METHODOLOGY 4. Electrochemical Evaluations

Coin-type cells (2032, Hohsen) are constructed in an argon-filled glovebox (<5 ppm $O_2$ and $H_2O$). The cathode consists of approximately 84 percent by weight (wt %) of $LiMn_xNi_yM_zO_2$ powder (M=Al), 8 wt % carbon, and 8 wt % PVDF binder on aluminum foil. The anode is metallic lithium foil or an alternative host electrode for lithium, such as graphite or $Li_4Ti_5O_{12}$. The electrolyte is typically 1.2 M $LiPF_6$ in a 3:7 (w/w) mixture of ethylene carbonate and ethyl-methyl carbonate. For the cycling experiments, $Li/LiMn_xNi_yM_zO_2$ cells (M=Al) are galvanostatically charged and discharged between 2.5 and 4.2 V at a current rate of either approximately 15 mA/g or approximately 60 mA/g. The electrochemical experiments are conducted at approximately 30° C.

EXAMPLE 1

$LT-LiMn_{0.5}Ni_{0.5}O_2$ $LT-LiMn_{0.5}Ni_{0.5}O_2$ was prepared as follows:

A $Mn_{0.5}Ni_{0.5}(OH)_2$ precursor was first prepared by a co-precipitation reaction in an aqueous solution containing manganese sulfate ($MnSO_4$) and nickel sulfate ($NiSO_4$). A $LT-LiMn_{0.5}Ni_{0.5}O_2$ electrode material was synthesized by a 'low-temperature' solid-state reaction of the $Mn_{0.5}Ni_{0.5}(OH)_2$ precursor and lithium carbonate ($Li_2CO_3$, >99%). Stoichiometric amounts of the precursors were thoroughly mixed using a mortar and pestle, and fired in air at 400° C. for approximately 72 hours. The heating rate was about 2° C. per min, and the samples were cooled in the furnace without controlling the cooling rate. The X-ray diffraction (XRD) pattern (Cu K$\alpha$ radiation, $\lambda$=1.5406 Å) of $LT-LiMn_{0.5}Ni_{0.5}O_2$ is shown in FIG. 1.

$Li/LT-LiMn_{0.5}Ni_{0.5}O_2$ cells were assembled and evaluated as follows: Coin-type cells (2032, Hohsen) were assembled in an argon-filled glovebox (<5 ppm $O_2$ and $H_2O$) for electrochemical tests. The cathode electrode consisted of approximately 84 wt % of $LT-LiMn_{0.5}Ni_{0.5}O_2$ powder, 8 wt % carbon, and 8 wt % polyvinylidene difluoride (PVDF) binder on an aluminum foil current collector. The anode was metallic lithium foil. The electrolyte was 1.2 M lithium hexafluorophosphate ($LiPF_6$) in a 3:7 mixture of ethylene carbonate and ethyl methyl carbonate. The coin cell was galvanostatically charged and discharged between 2.5 and 5.0 V at a constant current of approximately 15 mA/g. Electrochemical experiments were conducted at about 30°

Figure 2:
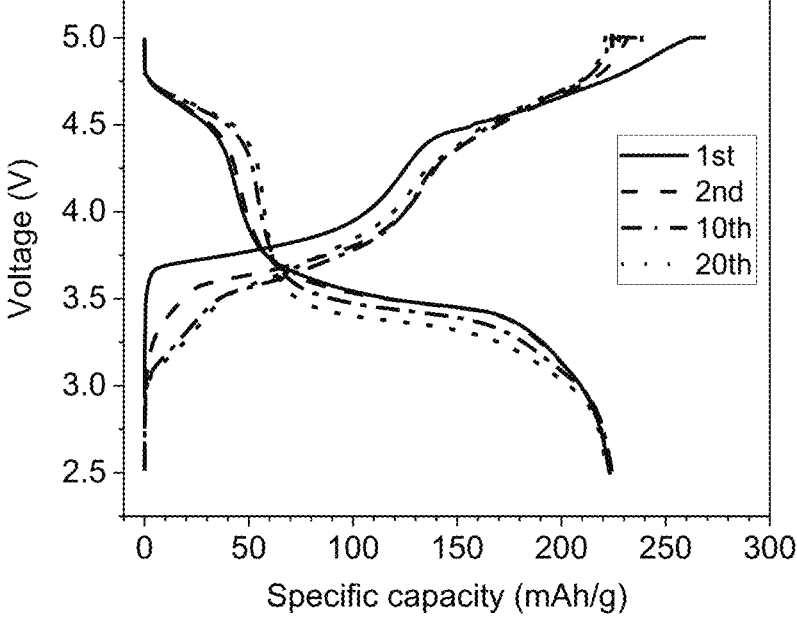
FIG. 2 depicts the voltage (V) vs. specific capacity (mAh/g) plots of a Li/LT-$LiMn_{0.5}Ni_{0.5}O_2$ cell.

C. Voltage (V) vs. specific capacity (mAh/g) plots of a Li/LT-LiMn$_{0.5}$Ni$_{0.5}$O$_2$ cell cycled between 5.0 and 2.5 V for the first 20 cycles are shown in FIG. 2.

Ex situ synchrotron XRD patterns collected at different states of charge (SOC) showed that the LT-Li$_2$MnNiO$_4$ electrode structure maintains its cubic symmetry during the entire charge/discharge cycle and that the overall lattice volume change of 2.7% during cycling is significantly less than it is for the well-known spinels Li$_x$Mn$_2$O$_4$ (16%) and Li$_x$Mn$_{1.5}$Ni$_{0.5}$O$_4$ (12%) when discharged to about 2.5 V (0≤x≤2).

EXAMPLE 2

LT-LiMn$_{0.5}$Ni$_{0.5}$O$_2$

LT-LiMn$_{0.5}$Ni$_{0.5}$O$_2$ was prepared as described in Example 1.

Figure 3:
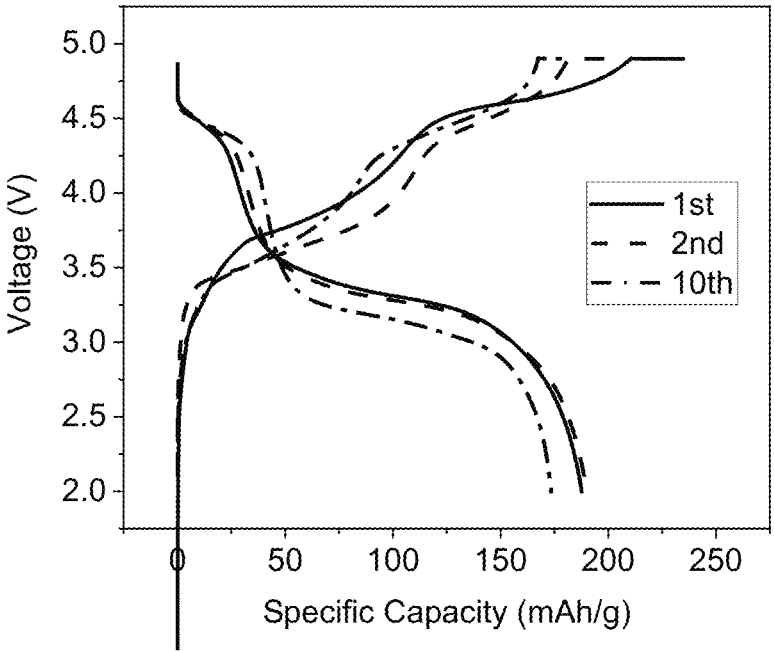
FIG. 3 depicts the voltage (V) vs. specific capacity (mAh/g) plots of a graphite/LT-$LiMn_{0.5}Ni_{0.5}O_2$ cell.

Graphite/LT-LiMn$_{0.5}$Ni$_{0.5}$O$_2$ cells were assembled following a similar procedure as described in Example 1, except that a graphite anode was used instead of metallic Li, and were evaluated as follows: Anode laminates were prepared by coating a graphite slurry on copper foil. The composition of the graphite slurry was 91.83 wt % graphite powder, 2 wt % carbon black, 6 wt % PVDF binder, and 0.17% oxalic acid. Coin cells were cycled between 2.0 to 4.9 V at a constant current of 100 mA/g. Voltage (V) vs. specific capacity (mAh/g) plots of a graphite/LT-LiMn$_{0.5}$Ni$_{0.5}$O$_2$ cell cycled between 4.9 and 2.0 V for the first 10 cycles are shown in FIG. 3.

EXAMPLE 3

LT-LiMn$_{0.45}$Ni$_{0.45}$Al$_{0.1}$O$_2$

Figure 4:
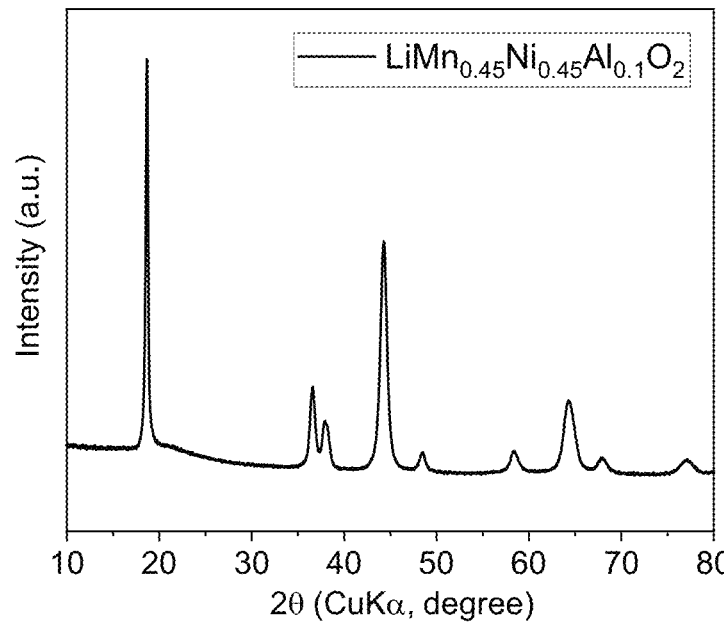
FIG. 4 depicts the X-ray diffraction pattern of LT-$LiMn_{0.45}Ni_{0.45}Al_{0.1}O_2$.

LT-LiMn$_{0.45}$Ni$_{0.45}$Al$_{0.1}$O$_2$ was prepared as follows: The LT-LiMn$_{0.45}$Ni$_{0.45}$Al$_{0.1}$O$_2$ powder was prepared following a similar procedure described in Example 1. Stoichiometric amounts of Li$_2$CO$_3$, Mn$_{0.5}$Ni$_{0.5}$(OH)$_2$, and aluminum nitrate nonahydrate (Al(NO$_3$)$_3$•9H$_2$O, >98%) precursors were thoroughly mixed with a planetary ball mill (RESTCH PM 200). The mixed powder was pressed into a pellet and fired in air at 400° C. for approximately 72 hours. The XRD pattern (Cu Kκ radiation, λ=1.5406 Å) of the LT-LiMn$_{0.45}$Ni$_{0.45}$Al$_{0.1}$O$_2$ product is shown in FIG. 4.

Figure 6:
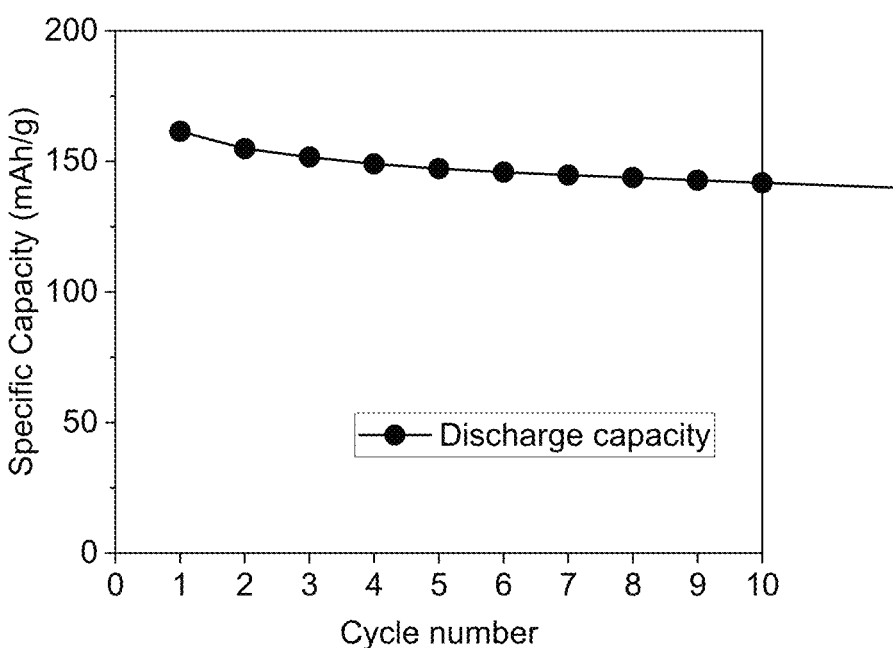
FIG. 6 depicts the specific capacity vs. cycle number plots of a Li/LT-$LiMn_{0.45}Ni_{0.45}Al_{0.1}O_2$ cell.

Li/LT-LiMn$_{0.45}$Ni$_{0.45}$Al$_{0.1}$O$_2$ cells with a metallic Li anode were assembled and evaluated as described in Example 1. The initial voltage (V) vs. specific capacity (mAh/g) plot of a Li/LT-LiMn$_{0.45}$Ni$_{0.45}$Al$_{0.1}$O$_2$ cell cycled between 5.0 and 2.5 V is shown in FIG. 5. Specific capacity vs. cycle number plots for this cell, cycled between 5.0 and 2.5 V for the first 10 cycles, are shown in FIG. 6.

Of particular note is that the voltage profile of the cell in which Al is used as a minor substituent in the LT-LiMn$_{0.45}$Ni$_{0.45}$Al$_{0.1}$O$_2$ electrode (FIG. 5) does not show the pronounced two-step process during charge and discharge, similar to that observed in cells containing the parent lithiated-spinel electrode LT-LiMn$_{0.5}$Ni$_{0.5}$O$_2$ (FIG. 2). However, this feature is similar to that observed in a Mg-substituted electrode, LT-LiMn$_{0.45}$Ni$_{0.45}$Mg$_{0.1}$O$_2$, and also in a reference Al-substituted LT-LiCo$_{1-x}$Al$_x$O$_2$ electrode, which is attributed to some disorder of Al between the octahedral 16c sites and the octahedral 16c sites of a lithiated-spinel structure with space group symmetry Fd3̄m, as described by Lee et al. in *ACS Applied Energy Materials*, Volume 2, pages 6170-6175 (2019).

EXAMPLE 4

Figure 7:
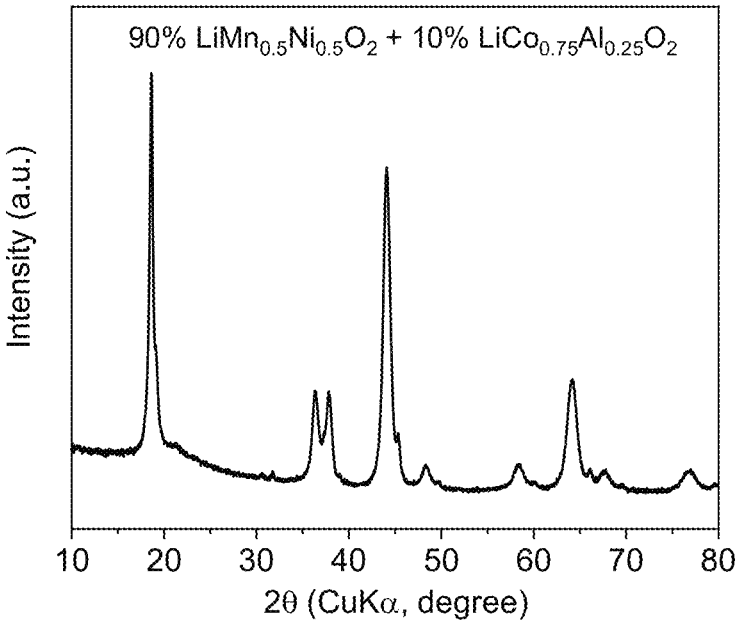
FIG. 7 depicts the X-ray diffraction pattern of a LT-$LiMn_{0.5}Ni_{0.5}O_2$+LT-$LiCo_{0.75}Al_{0.25}O_2$ electrode powder, blended in a 90:10 percent ratio, respectively.

Physical Blend: LT-LiMn$_{0.5}$Ni$_{0.5}$O$_2$ (90%)+10 wt % LT-LiCo$_{0.75}$Al$_{0.25}$O$_2$ LT-LiMn$_{0.5}$Ni$_{0.5}$O$_2$ was prepared by the method described in Example 1. LT-LiCo$_{0.75}$Al$_{0.25}$O$_2$ was prepared as follows: Stoichiometric amounts of Li$_2$CO$_3$, CoCO$_3$, and Al(NO$_3$)$_3$•9H$_2$O were thoroughly mixed using a mortar and pestle. The mixture was then fired in air at 400° C. for 6 days. A blended electrode material was prepared by mechanically grinding the LT-LiMn$_{0.5}$Ni$_{0.5}$O$_2$ and LT-LiCo$_{0.75}$Al$_{0.25}$O$_2$ powders in a 90:10 percent ratio by mass using a mortar and pestle. The XRD pattern (Cu Kα radiation, λ=1.5406 Å) of a LT-LiMn$_{0.5}$Ni$_{0.5}$O$_2$+LT-LiCo$_{0.75}$Al$_{0.25}$O$_2$ electrode powder, blended in a 90:10 percent ratio by mass, respectively, is shown in FIG. 7.

Figure 8:
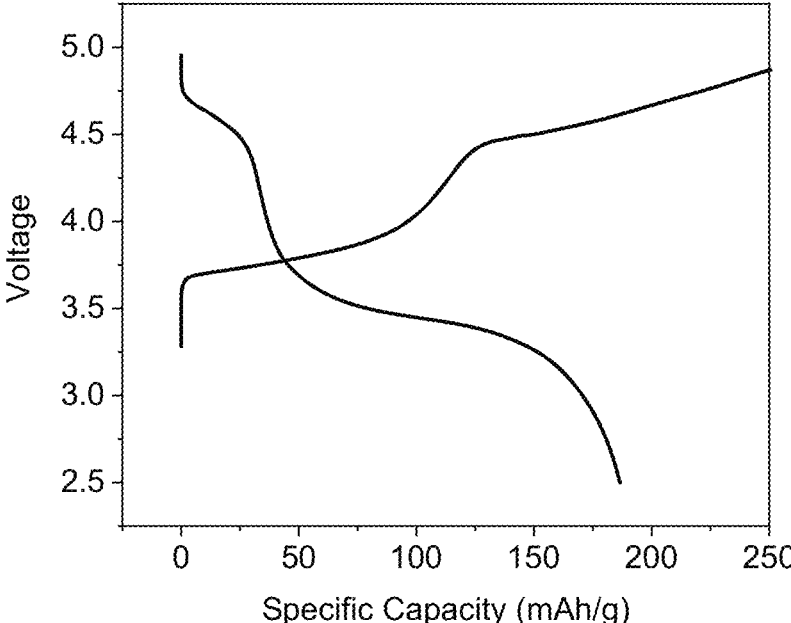
FIG. 8 depicts the electrochemical profile of the initial discharge of a Li/LT-$LiMn_{0.5}Ni_{0.5}O_2$+LT-$LiCo_{0.75}Al_{0.25}O_2$ cell.
Figure 9:
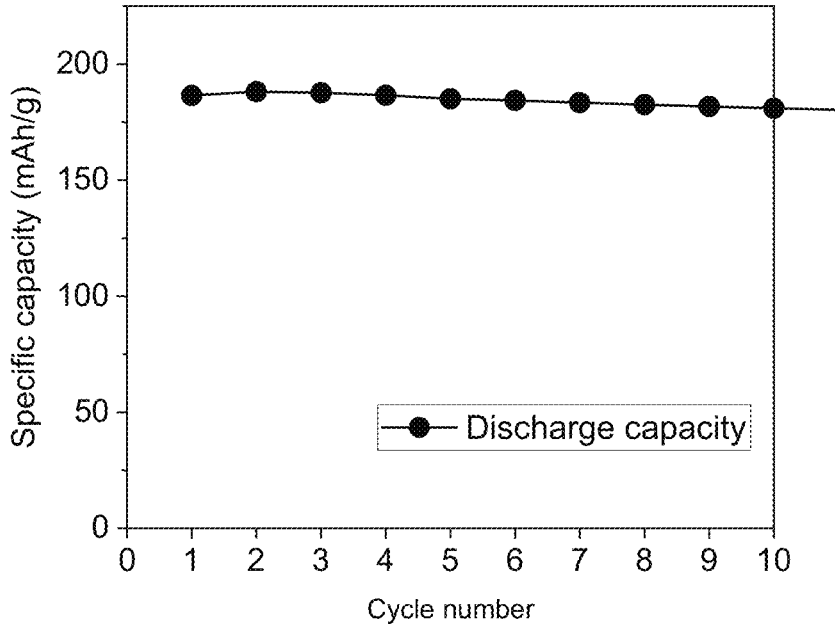
FIG. 9 depicts the specific capacity vs. cycle number plots of a Li/LT-$LiMn_{0.5}Ni_{0.5}O_2$+LT-$LiCo_{0.75}Al_{0.25}O_2$ cell.

Li/LT-LiMn$_{0.45}$Ni$_{0.45}$Al$_{0.1}$O$_2$ cells with a metallic Li anode were assembled and evaluated as described in Example 1. The electrochemical profile of the initial charge and discharge of a Li/LT-LiMn$_{0.5}$Ni$_{0.5}$O$_2$+LT-LiCo$_{0.75}$Al$_{0.25}$O$_2$ cell when activated to 5.0 V and discharged to 2.5 V as a function of voltage (V) and specific capacity (mAh/g) is shown in FIG. 8. Corresponding specific capacity vs. cycle number plots of this Li/LT-LiMn$_{0.5}$Ni$_{0.5}$O$_2$+LT-LiCo$_{0.75}$Al$_{0.25}$O$_2$ cell cycled between 5.0 and 2.5 V for the first 10 cycles is shown in FIG. 9.

EXAMPLE 5

LT-LiMn$_{0.475}$Ni$_{0.475}$Co$_{0.05}$O$_2$

Figure 10:
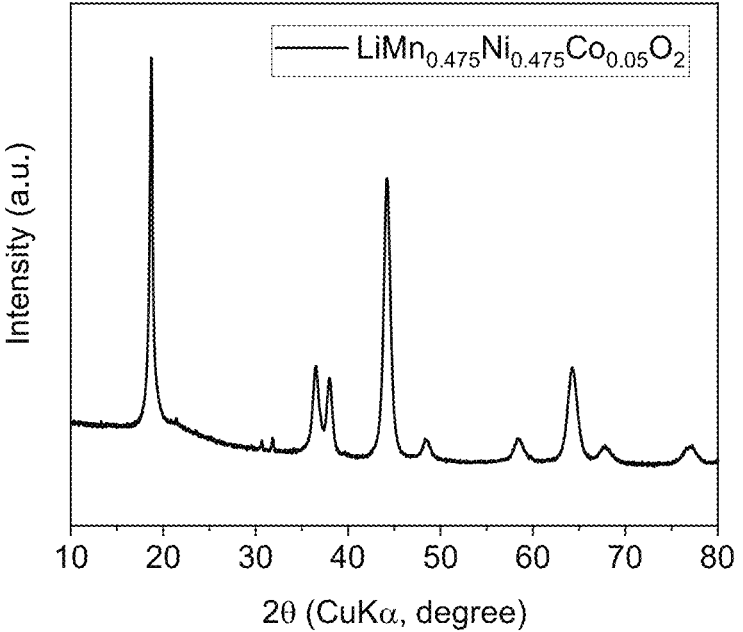
FIG. 10 depicts the X-ray diffraction pattern of LT-$LiMn_{0.475}Ni_{0.475}Co_{0.05}O_2$.

LT-LiMn$_{0.475}$Ni$_{0.475}$Co$_{0.05}$O$_2$ powder was prepared following a similar procedure to that described in Example 1. Stoichiometric amounts of Li$_2$CO$_3$ and Mn$_{0.475}$Ni$_{0.475}$Co$_{0.05}$(OH)$_2$ precursors were thoroughly mixed using a mortar and pestle and fired in air at 400° C. for approximately 72 hours. The XRD pattern (Cu Kα radiation, λ=1.5406 Å) of LT-LiMn$_{0.475}$Ni$_{0.475}$Co$_{0.05}$O$_2$ is shown in FIG. 10.

Figure 11:
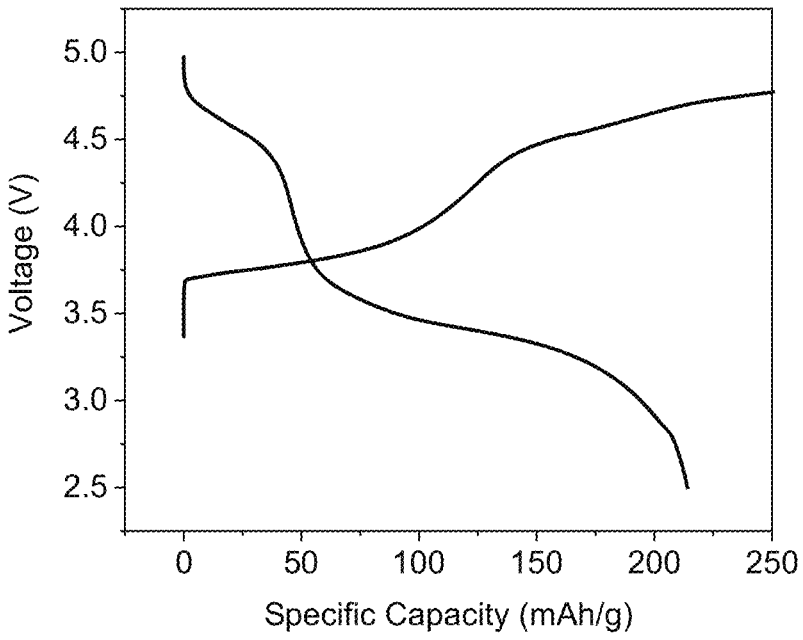
FIG. 11 depicts the electrochemical profile of the initial discharge of a Li/LT-$LiMn_{0.45}Ni_{0.45}Co_{0.1}O_2$ cell.
Figure 12:
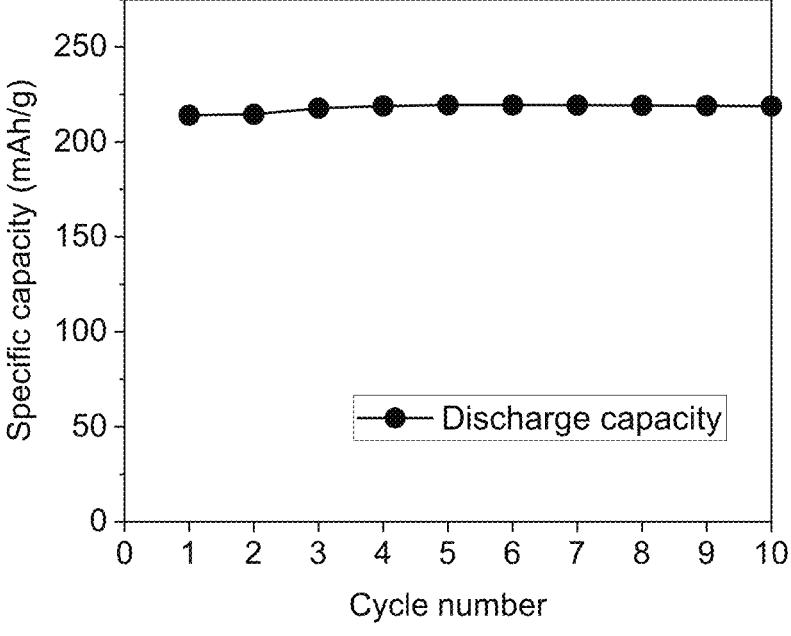
FIG. 12 depicts the voltage (V) vs. specific capacity (mAh/g) plots of a Li/LT-$LiMn_{0.475}Ni_{0.475}Co_{0.05}O_2$ cell.

LT-LiMn$_{0.475}$Ni$_{0.475}$Co$_{0.05}$O$_2$ cells were assembled and evaluated as in Example 1. The electrochemical profile of the initial charge and discharge of a Li/LT-LiMn$_{0.475}$Ni$_{0.475}$Co$_{0.05}$O$_2$ cell when activated to 5 V and discharged to 2.5 V as a function of voltage (V) and specific capacity (mAh/g) is shown in FIG. 11. Corresponding voltage (V) vs. specific capacity (mAh/g) plots of this cell, when cycled between 5.0 and 2.5 V for the first 10 cycles is shown in FIG. 12.

In the above examples, the upper cut-off voltage was 5.0 V for the cells with a Li anode, and 4.9 V for the cell with a graphite anode. This high voltage was selected to maximize capacity and assess the stability of the electrode materials. In practice, it is anticipated that greater cycling stability of the cells will be achieved by lowering the upper cut-off voltage, for example to 4.75 V or lower, albeit with lower capacity. In this respect, improvements in the electrochemical properties of the electrode materials described herein can be expected by tailoring their synthesis and the voltage window of the cells during electrochemical cycling to achieve optimum cell performance.

EXAMPLE 6

Structural and Electrochemical Analyses of LT-LiMn$_{0.5}$Ni$_{0.5}$O$_2$

Structure Analysis

Structural refinements of a LT-LiMn$_{0.5}$Ni$_{0.5}$O$_2$ sample, prepared by the method described in Example 1, were undertaken to determine the structure-type and the extent of disorder, if any, between the lithium, manganese, and nickel ions in the structure. For these studies, high quality synchrotron X-ray diffraction data ($\lambda$=0.1173 Å) were collected at the Advanced Photon Source at Argonne National Laboratory (FIG. 1C). It was discovered, very surprisingly, that a remarkably good fit to the data was obtained with either a disordered, lithiated-spinel model structure (FIG. 1D) or a disordered, layered model structure (FIG. 1E), as highlighted by the refined parameters and goodness-of-fit factors, R=8.56 and R=8.80 in Tables 2 and 3, respectively, making it extremely difficult, or impossible, to determine, unequivocally, the precise structure type, or whether both structure types were present in the sample.

TABLE 2

Refined crystallographic parameters of a disordered lithiated-spinel structural model with cubic symmetry for LT-$Li_2MnNiO_4$.
Space group: Fd-3m, a = 8.217 Å, $R_{wp}$ = 8.56%

| Atom | Site | x | y | z | Occ | $B_{eq}$ |
|------|------|-----|-----|-----|-------|-------|
| Li1 | 16c | 0 | 0 | 0 | 0.834 | 1 |
| Li2 | 16d | 0.5 | 0.5 | 0.5 | 0.166 | 1 |
| Mn1 | 16c | 0 | 0 | 0 | 0.083 | 1 |
| Mn2 | 16d | 0.5 | 0.5 | 0.5 | 0.417 | 1 |
| Ni1 | 16c | 0 | 0 | 0 | 0.083 | 1 |
| Ni2 | 16d | 0.5 | 0.5 | 0.5 | 0.417 | 1 |
| O | 32e | 0.258 | 0.258 | 0.258 | 1 | 1.691 |

TABLE 3

Refined crystallographic parameters of a disordered layered structural model with cubic symmetry for LT-$LiMn_{0.5}Ni_{0.5}O_2$.
Space group: R-3m, a = 2.902 Å, c = 14.277 Å (c/a = 4.92), $R_{wp}$ = 8.80%

| Atom | Site | x | y | z | Occ | $B_{eq}$ |
|------|------|---|---|-------|-------|-------|
| Li1 | 3a | 0 | 0 | 0 | 0.838 | 1 |
| Li2 | 3b | 0 | 0 | 0.5 | 0.162 | 1 |
| Mn1 | 3a | 0 | 0 | 0 | 0.081 | 1 |
| Mn2 | 3b | 0 | 0 | 0.5 | 0.419 | 1 |
| Ni1 | 3a | 0 | 0 | 0 | 0.081 | 1 |
| Ni2 | 3b | 0 | 0 | 0.5 | 0.419 | 1 |
| O | 6c | 0 | 0 | 0.242 | 1 | 1.605 |

Electrochemical Analysis

Figure 16:
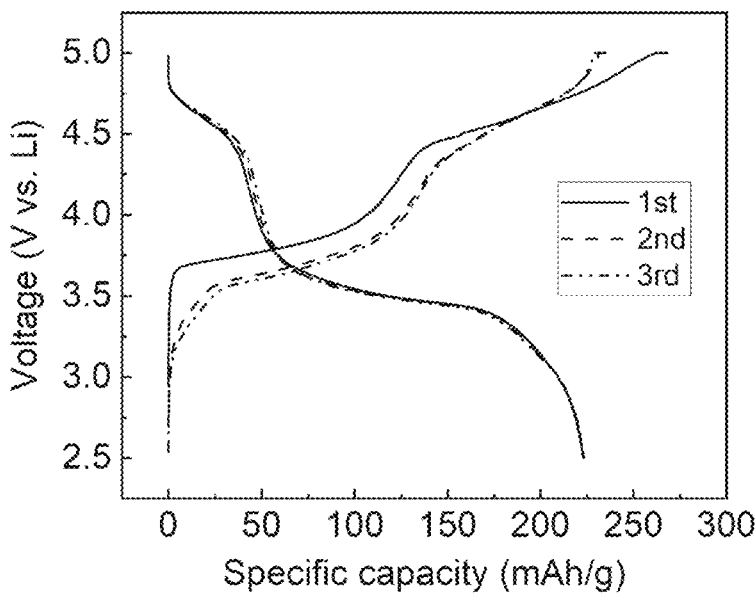
FIG. 16 depicts the first three cycles of a Li/LT-$LiMn_{0.5}Ni_{0.5}O_2$ cell.
Figure 17:
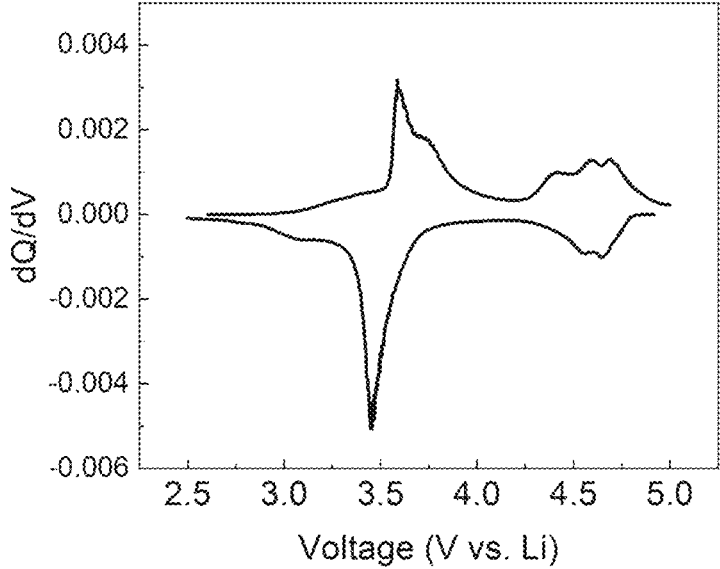
FIG. 17 depicts a dQ/dV plot of the $3^{rd}$ cycle of a Li/LT-$LiMn_{0.5}Ni_{0.5}O_2$ cell.
Figure 18:
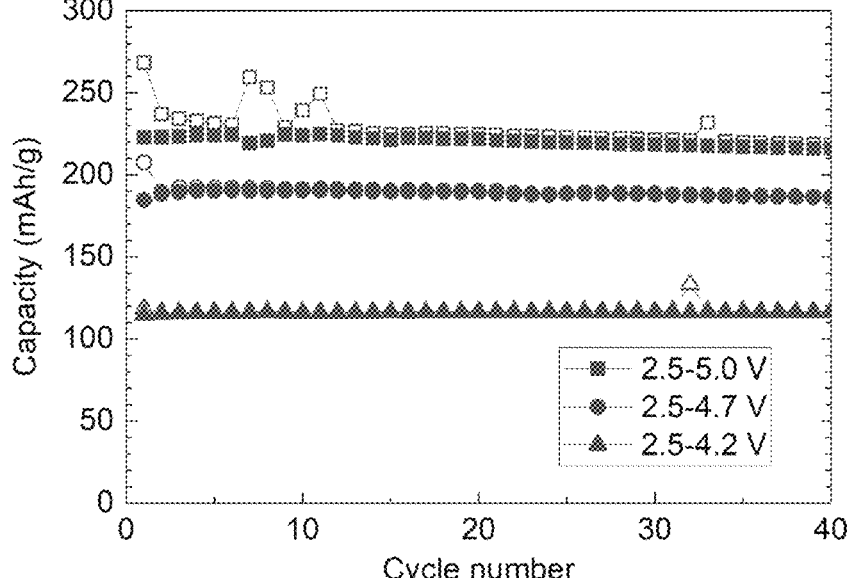
FIG. 18 depicts the cycling stability of a Li/LT-$LiMn_{0.5}Ni_{0.5}O_2$ cell when discharged and charged between 2.5-5.0 V; 2.5-4.7 V; and 2.5-4.2 V.

Li/LT-$LiMn_{0.5}Ni_{0.5}O_2$ cells were assembled and evaluated as described in Example 1. FIG. 16 shows the electrochemical profile of a Li/LT-$Li_2MnNiO_4$ (Li/LT-$LiMn_{0.5}Ni_{0.5}O_2$) lithium cell for the first three cycles between 5.0 and 2.5 V, delivering a discharge capacity of 225 mAh/g. The corresponding dQ/dV plot of the $3^{rd}$ cycle shows that the dominant reactions occur at approximately 3.6 V and 4.6 V, which involve two or more redox processes (FIG. 17). For the charge process, the low voltage (LV) plateau in FIG. 16 corresponds to the extraction of 0.9 Li from the LT-$Li_2MnNiO_4$ electrode structure and a specific capacity of about 130 mAh/g, while the high voltage (HV) plateau accounts for a further extraction of about 0.8 Li and a specific capacity of about 110 mAh/g. The reactions that occur on the LV plateau at approximately 3.6 V are attributed predominantly to the redox reactions of $Ni^{2+}$ ions, whereas the reactions that occur on the HV plateau at approximately 4.6 V are attributed to reversible redox reactions of $Ni^{3+}$ ions as well as the $O^{2-}$ ions of the cubic-close-packed oxygen sublattice. The electrochemical capacities associated with the LV and HV plateaus during charge and discharge are different. While the HV and LV capacities are almost equal during charge, the HV capacity decreases to about 50 mAh/g (about 0.35 Li intercalation) whereas the LV capacity increases to about 170 mAh/g (about 1.2 Li intercalation). The asymmetry in the charge and discharge processes suggests that structural hysteresis occurs during the lithium extraction and insertion reactions. Nevertheless, Li/LT-$Li_2MnNiO_4$ cells exhibit excellent capacity-cycling stability when cycled 50 times between 2.5 to 4.2 V; 2.5 to 4.7 V; and 2.5 to 5.0 V (FIG. 18).

EXAMPLE 7

LT-$LiNi_{1/3}Mn_{1/3}Co_{1/3}O_2$

A partially-disordered lithiated spinel material, $LiNi_{1/3}Mn_{1/3}Co_{1/3}O_2$, also hereafter referred to as LT-NMC111 (where LT refers to the 'low-temperature' at which the material was synthesized (400-650° C.) relative to conventional 'high-temperature' (HT) solid state synthesis (800-900° C.)), was prepared by a flame spray pyrolysis (FSP) method as follows.

Stoichiometric amounts of nickel acetylacetonate, manganese acetylacetonate, and cobalt acetylacetonate in the required 1:1:1 Ni:Mn:Co_ratio for LT-NMC111, and a small excess of lithium propionate to compensate for lithium loss in the flame, typically about 1 to about 10% excess lithium, and preferably less than 10% excess lithium, were dissolved in acetonitrile and 2-ethylhexanoic acid (5:5 by volume) at a concentration of 0.31 mol/L. The precursor solution was then sprayed into the flame of a flame-spraying pyrolysis unit at Argonne National Laboratory. Samples of the resulting powder were subsequently fired at various temperatures ranging from 400 to 650° C. in air for 3-5 days.

1. X-Ray Diffraction

Figure 19A:
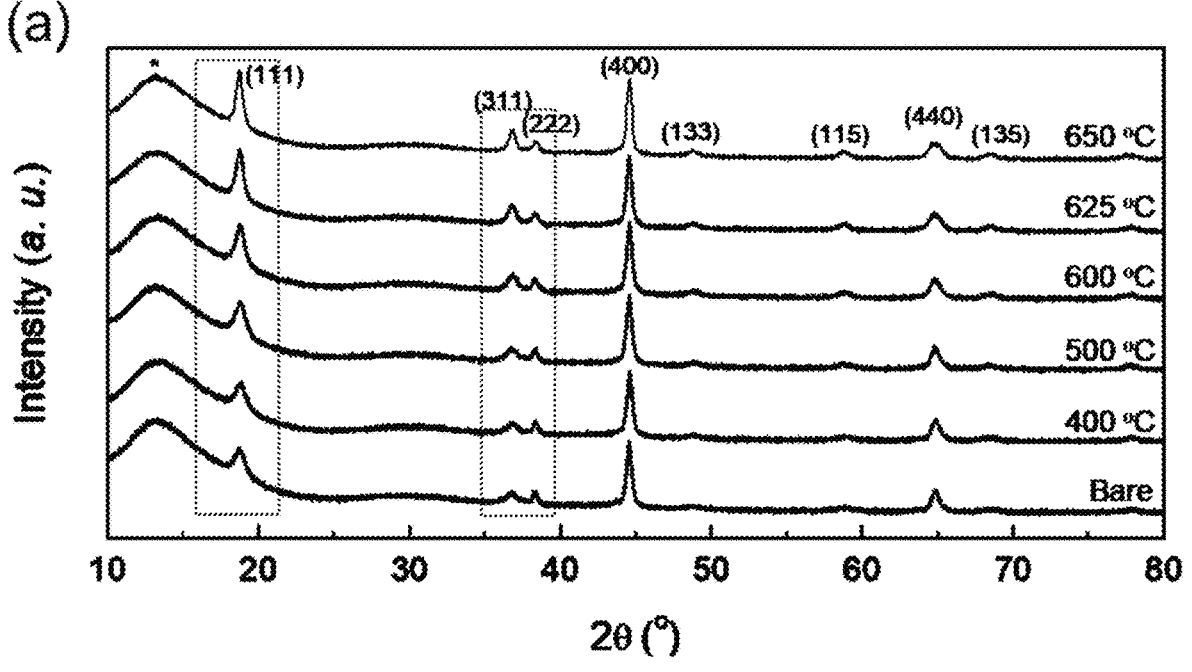
FIG. 19A depicts an X-ray diffraction patterns of a $LiNi_{1/3}Mn_{1/3}Co_{1/3}O_2$ electrode powder prepared by a flame-spray pyrolysis method (indicated as 'bare'), and after heating in air at 400, 500, 600, 625 and 650° C.
Figure 19B:
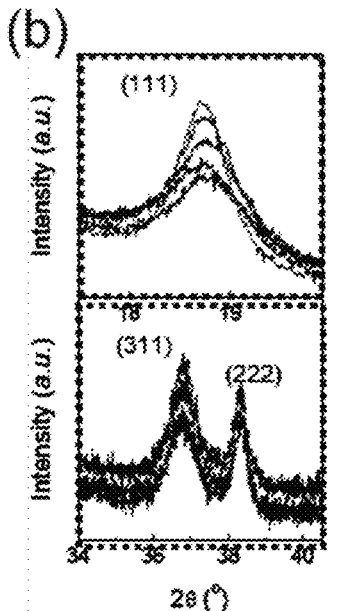
FIG. 19B provides a detail of the X-ray diffraction patterns of FIG. 19A.

X-ray diffraction (XRD) patterns of the LT-NMC111 powders were obtained with a D8 ADVANCE, BRUKER diffractometer using Cu K$\alpha$ radiation ($\lambda$=1.54178 Å). Structural parameters of the materials were determined by Rietveld profile refinement using the FOOLPROF program. FIG. 19A shows the XRD pattern of a LT-NMC111 precursor sample prepared by the flame spray method (indicated as 'Bare' in FIG. 19A) and corresponding patterns after heating the precursor powder to 400, 500, 600, 625 and 650° C. The patterns of samples that had been heated at 400, 500 and 600° C. could be indexed to cubic symmetry, indicating that the oxygen array of the LT-NMC111 structure was cubic-close-packed. These peaks are indexed to the crystallographic space group Fd-3m, which is the prototypic symmetry of cubic spinel $LiM_2O_4$ structures and cubic lithiated-spinel structures $Li_2M_2O_4$ (M=metal ion). However, the LT-NMC111 samples heated to 625 and 650° C. show the onset of splitting of the 440 peak at approximately 65°2θ, which is more pronounced in the sample heated to 650° C. This peak splitting is indicative of a reduction in symmetry from cubic to trigonal that could occur, for example, during the transformation of a disordered lithiated-spinel structure to a more pronounced layered arrangement of the lithium and transition metal ions in alternating layers. The extent of ordering can be reflected by the crystallographic axial c/a ratio of a trigonal unit cell, which would vary from a value of 4.90 for an ideal cubic-close-packed oxygen lattice to >4.90 for a trigonal unit cell, which deviates from ideal cubic-close-packing. These subtle changes to the atomic arrangements in the structure are also evident from the changes in the relative peak intensities on increasing the temperature to which the samples were heated (FIG. 19B).

2. High Resolution Transmission Electron Microscopy

Figure 19C:
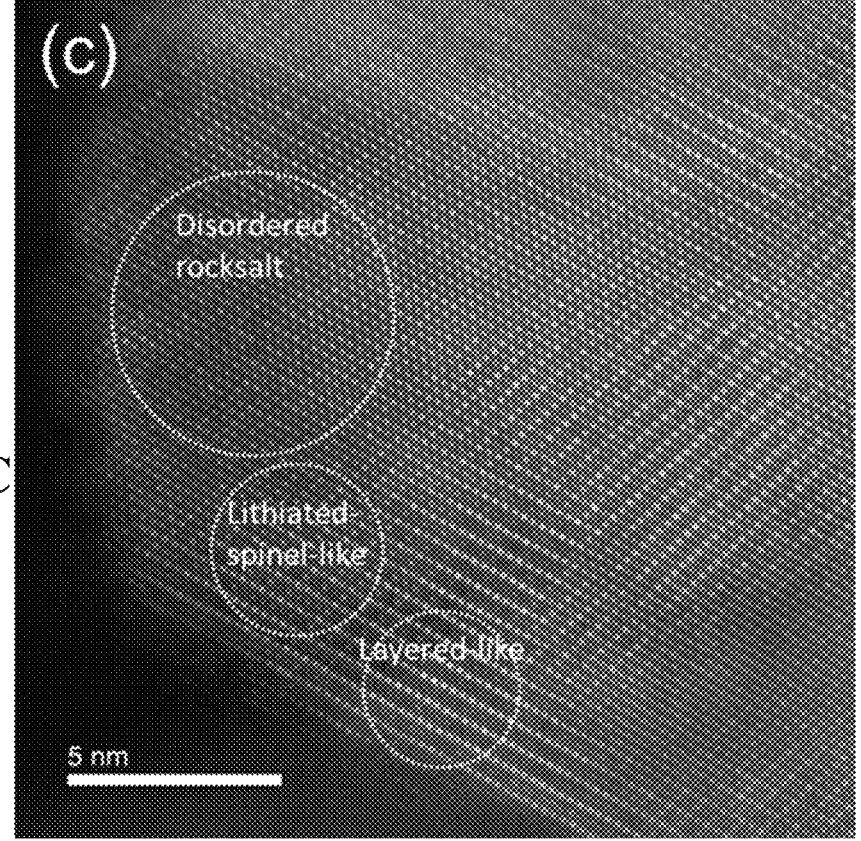
FIG. 19C provides a high-resolution scanning transmission electron microscopy (HR-STEM) image of an unheated ('bare') $LiNi_{1/3}Mn_{1/3}Co_{1/3}O_2$ electrode powder.
Figure 19D:
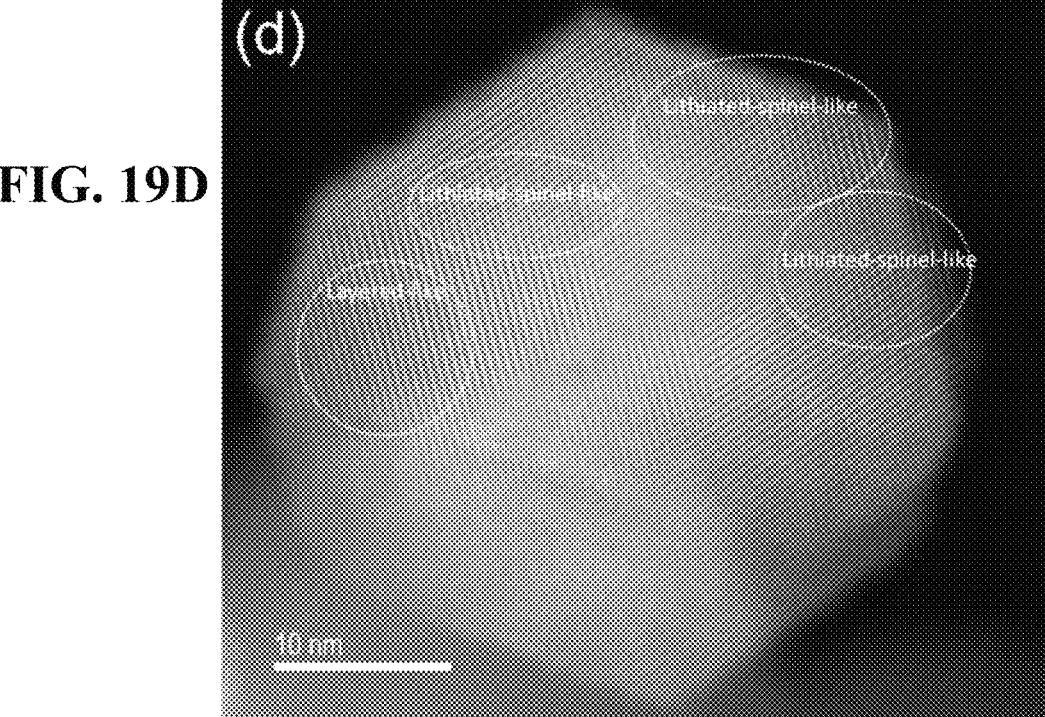
FIG. 19D provides a HR-STEM image of a $LiNi_{1/3}Mn_{1/3}Co_{1/3}O_2$ electrode powder after heating in air at 400° C.

High-angle annular dark-field scanning transmission electron microscopy (HAADF-STEM) images of LT-NMC111 samples were obtained with an aberration-corrected JEOL electron microscope ARM200CF using an operation voltage of 200 kV. The image of an unheated precursor sample prepared by the flame spray pyrolysis (FSP) method, shown in FIG. 19C), provides evidence of an intergrown structure with lithiated-spinel-like and layered-like components as well as more randomly disordered, rock salt-type components. In contrast, FIG. 19D presents the STEM image of a LT-NMC111 sample heated to 625° C., which provides evidence of an intergrown structure comprised predominantly of layered- and lithiated spinel components, i.e., without significant evidence of the more randomly disordered rock salt configurations observed in the unheated FSP sample (cf. FIG. 19C).

3. Electrochemistry a) Cell Assembly and Testing

A slurry of 80 wt % LT-NMC111 material, 10 wt % carbon black (SUPER P, Timcal), and 10 wt % polyvinylidene fluoride (PVDF, Solvay), dissolved in N-methyl-2-pyrrolidone (NMP), was cast onto Al foil. The NMP was removed by drying the coated Al foil at 80° C. in an oven overnight. The electrode was calendared before use. Coin cells (CR2032, Hohsen) were assembled with a LT-NMC111 cathode, a lithium metal disc anode, a CELGARD 2325 separator, and an electrolyte consisting of a 1.2 M solution of $LiPF_6$ in ethylene carbonate/ethyl methyl carbonate (EC/EMC, 3:7 by volume) in an Ar-filled glove box. The coin cells were charged and discharged using a MACCOR cycler (series 4000) between 2.7 and 4.3 V at 30° C. in a temperature-controlled chamber. Constant current, constant voltage charge and constant current discharge protocols were applied at a 0.2 C rate (1 C=100 mA/g) for the first 2 cycles to evaluate the relative electrochemical performance of the LT-NMC111 electrodes when heated to various temperatures.

b) Electrochemical Performance

Figure 20:
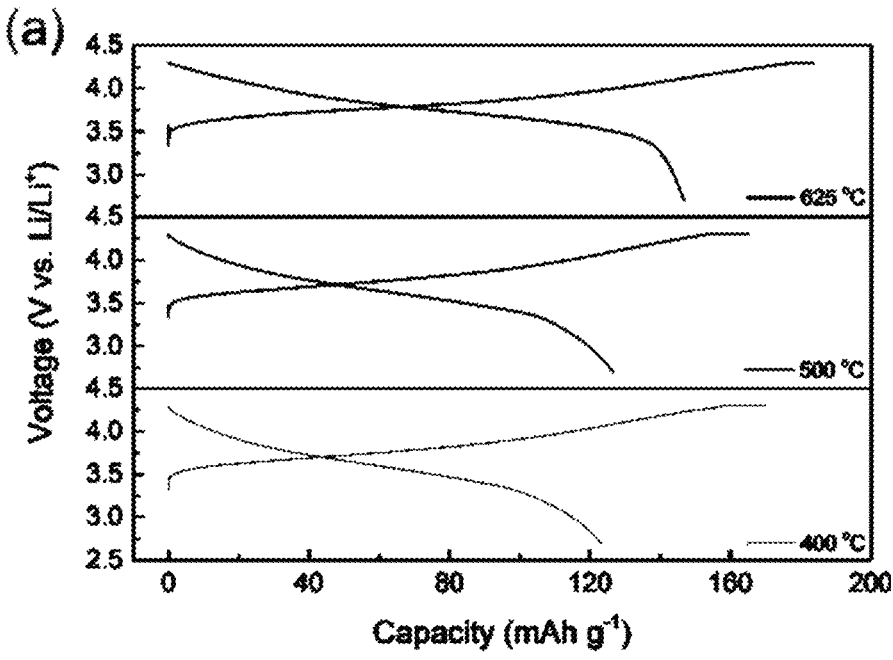
FIG. 20 depicts the voltage profiles of Li/$LiNi_{1/3}Mn_{1/3}Co_{1/3}O_2$ cells containing $LiNi_{1/3}Mn_{1/3}Co_{1/3}O_2$ electrode powders heated to 400, 500, 625° C. when charged and discharged between 4.3-2.7 V.

The voltage profiles for the initial charge/discharge cycle of Li/LT-NMC111 cells with cathodes that had been annealed at 400, 500 and 625° C. are shown in FIG. 20. The initial capacities of LT-NMC111 electrodes annealed at 400° C. and 500° C. were 123 and 126 mAh/g, respectively, whereas the LT-NMC111 provided a significantly higher capacity of 148 mAh/g. This unexpected improvement in performance may be attributed to the absence, or significant reduction in the concentration of the more randomly disordered rock salt configurations observed in the HRTEM image of the LT-NMC111 electrodes annealed at 400° C. (cf. FIG. 19C).

EXAMPLE 8

LT-$0.1Li_2MnO_3 \cdot 0.9LiMn_{0.5}Ni_{0.5}O_2$(Layered-Lithiated Spinel)

Figure 21:
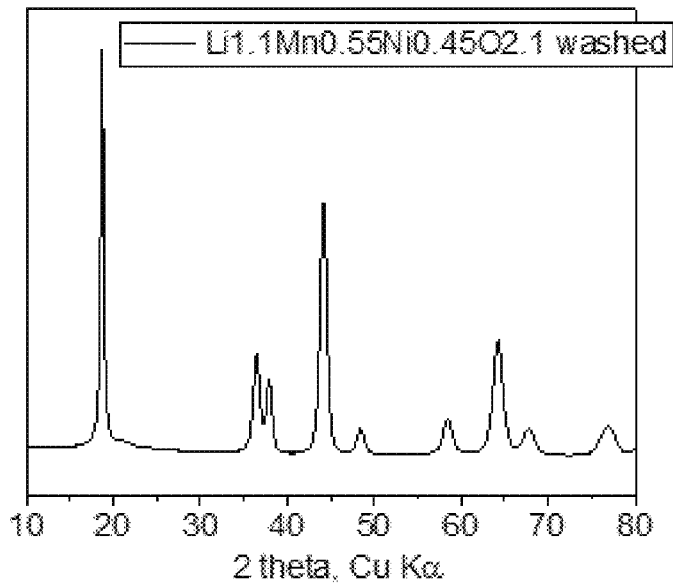
FIG. 21 depicts the X-ray diffraction pattern of LT-$0.1Li_2MnO_3$•$0.9LiMn_{0.5}Ni_{0.5}O_2$ (referred to as $Li_{1.1}Mn_{0.55}Ni_{0.45}O_{2.1}$ in the Figure caption).

A $Mn_{0.55}Ni_{0.45}(OH)_2$ precursor was first prepared by a co-precipitation reaction in an aqueous solution containing manganese sulfate ($MnSO_4$) and nickel sulfate ($NiSO_4$). Stoichiometric amounts of lithium carbonate ($Li_2CO_3$, >99%), $Mn_{0.55}Ni_{0.45}(OH)_2$ precursor were thoroughly mixed using a mortar and pestle to produce an electrode composition, $Li_{1.1}Mn_{0.45}Ni_{0.45}O_2$, alternatively in composite notation, $0.1Li_2MnO_3 \cdot 0.9LiMn_{0.5}Ni_{0.5}O_2$, and the mixture was then fired in air at 400° C. in a furnace for approximately 3 days. The heating rate was about 2° C. per min. The samples were cooled in the furnace without controlling the cooling rate. Thereafter, the product was washed with distilled water at room temperature (25° C.) to remove any unreacted lithium from the surface of the particles. The powder X-ray diffraction of the product is shown in FIG. 21.

Figure 22:
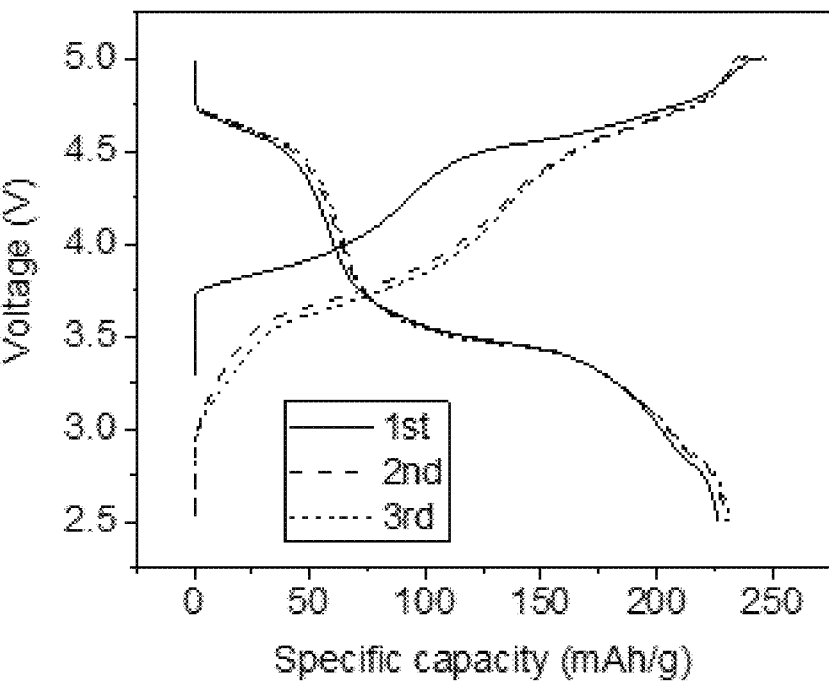
FIG. 22 depicts the voltage (V) vs. specific capacity (mAh/g) plots of a Li/LT-$0.1Li_2MnO_3$•$0.9LiMn_{0.5}Ni_{0.5}O_2$ cell.
Figure 23:
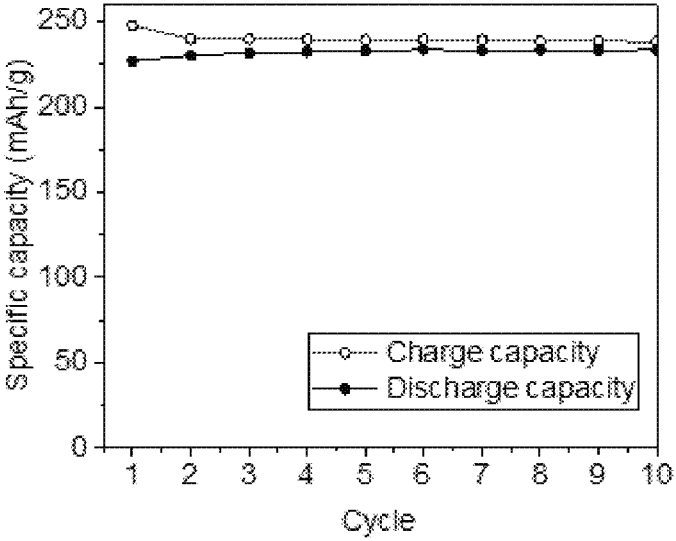
FIG. 23 depicts the specific capacity vs. cycle number plots of a Li/LT-$0.1Li_2MnO_3$•$0.9LiMn_{0.5}Ni_{0.5}O_2$ cell.

Li/LT-$Li_{1.1}Mn_{0.55}Ni_{0.45}O_{2.1}$ cells were assembled and evaluated as follows: Coin-type cells (2032, Hohsen) were assembled in an argon-filled glovebox (<5 ppm 02 and $H_2O$) for electrochemical tests. The cathode electrode consisted of approximately 84 wt % of LT-$Li_{1.1}Mn_{0.55}Ni_{0.45}O_{2.1}$ powder, 8 wt % carbon, and 8 wt % polyvinylidene difluoride (PVDF) binder on an aluminum foil current collector. The anode was metallic lithium foil. The electrolyte was 1.2 M lithium hexafluorophosphate ($LiPF_6$) in a 3:7 mixture of ethylene carbonate and ethyl methyl carbonate. The coin cell was galvanostatically charged and discharged between 2.5 and 5.0 Vat a constant current of approximately 15 mA/g. Electrochemical experiments were conducted at about 30° C. Voltage (V) vs. specific capacity (mAh/g) plots of a Li/LT-$Li_{1.1}Mn_{0.55}Ni_{0.45}O_{2.1}$ cell cycled between 5.0 and 2.5 V for the first 3 cycles are shown in FIG. 22, while the specific capacity vs. cycle number plot for the first cycles of the cell show a stable cycling capacity of approximately 230 mAh/g for ten cycles (FIG. 23).

EXAMPLE 9

LT-$0.09Li_2MnO_3 \cdot 0.81LiMn_{0.5}Ni_{0.5}O_2 \cdot 0.1LiCo_{0.85}Al_{0.15}O_2$ (Layered-Lithiated Spinel-Lithiated Spinel)

Figure 24:
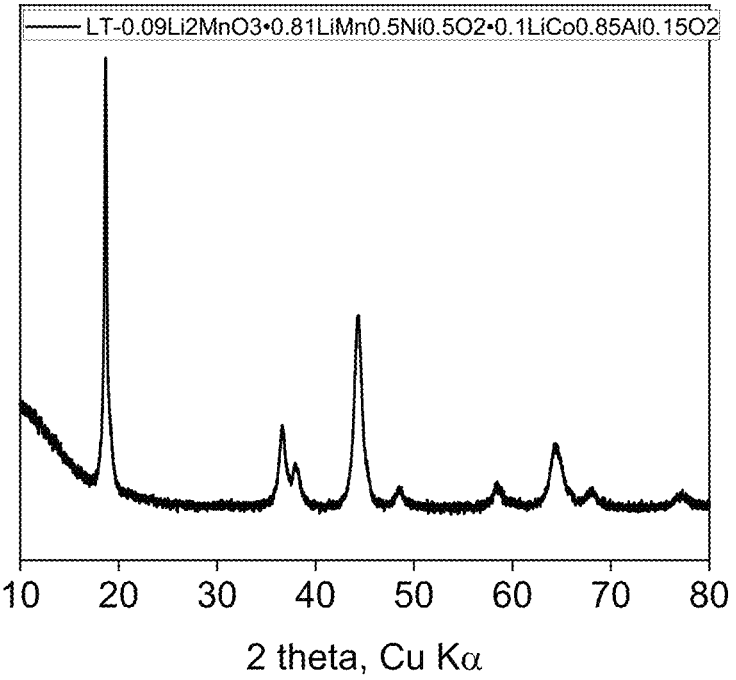
FIG. 24 depicts the X-ray diffraction pattern of $0.09Li_2MnO_3$•$0.81LiMn_{0.5}Ni_{0.5}O_2$•$0.1LiCo_{0.85}Al_{0.15}O_2$

LT-$0.09Li_2MnO_3 \cdot 0.81LiMn_{0.5}Ni_{0.5}O_2 \cdot 0.1LiCo_{0.85}Al_{0.15}O_2$ powder was prepared following a similar procedure described in Example 8. Stoichiometric amounts of lithium carbonate ($Li_2CO_3$, >99%), manganese(II) carbonate ($MnCO_3$>99.9%), nickel(II) nitrate hexahydrate (Ni $(NO_3)_2 \cdot 6H_2O$>99.999%), cobalt(II) carbonate hydrate ($CoCO_3 \cdot xH_2O$>99.99%), aluminum nitrate nonahydrate (Al $(NO_3)_3 \cdot 9H_2O$>98%) were thoroughly mixed by a planetary ball mill machine (RESTCH PM 200). The mixture powder was then fired in air at 400° C. for approximately 3 days. The heating rate was about 2° C. per min, and the samples were cooled in the furnace without controlling the cooling rate. The X-ray diffraction (XRD) pattern of LT-$0.09Li_2MnO_3 \cdot 0.81LiMn_{0.5}Ni_{0.5}O_2 \cdot 0.1LiCo_{0.85}Al_{0.15}O_2$ is shown in FIG. 24.

Figure 25:
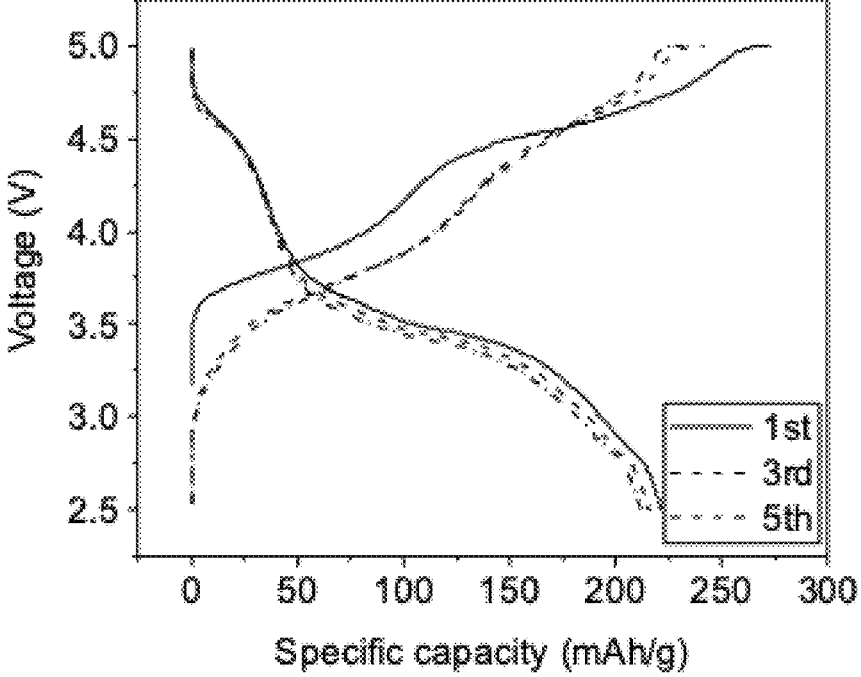
FIG. 25 depicts the first-cycle voltage (V) vs. specific capacity (mAh/g) plot of a Li/LT-$0.09Li_2MnO_3$•$0.81LiMn_{0.5}Ni_{0.5}O_2$•$0.1LiCo_{0.85}Al_{0.15}O_2$ cell.

Li/LT-$0.09Li_2MnO_3 \cdot 0.81LiMn_{0.5}Ni_{0.5}O_2 \cdot 0.1LiCo_{0.85}Al_{0.15}O_2$ cells with a metallic Li anode were assembled and evaluated as described in Example 8. The voltage (V) vs. specific capacity (mAh/g) profile of a Li/LT-$0.1Li_2MnO_3 \cdot 0.8LiMn_{0.5}Ni_{0.5}O_2 \cdot 0.1LiCo_{0.85}Al_{0.15}O_2$ cell, cycled between 5.0 and 2.5V for the five cycles, is consistent with the profile in Example 8, as shown in FIG. 25.

EXAMPLE 10

LT-$0.1LiCo_{0.85}Al_{0.15}O_2 \cdot 0.9LiMn_{0.5}Ni_{0.5}O_2$ (Lithiated Spinel-Lithiated-Spinel)

Figure 26:
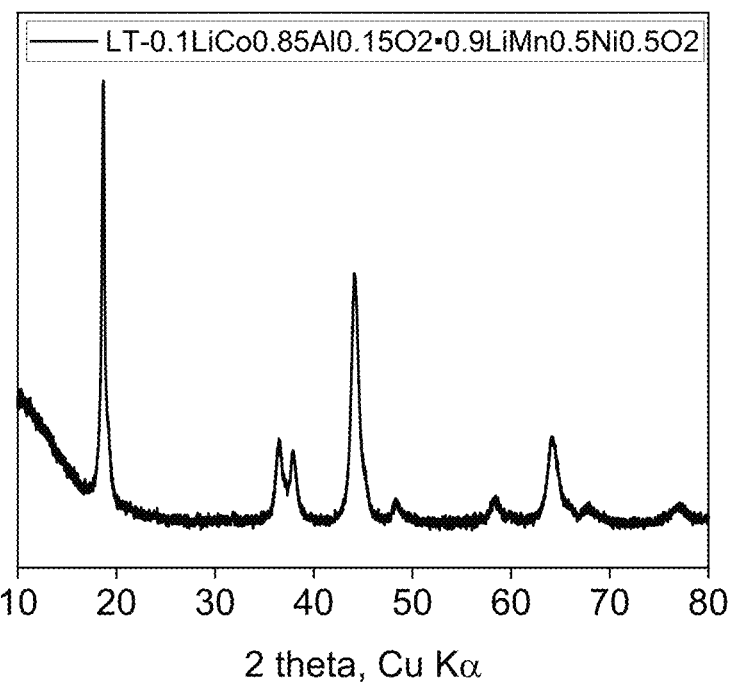
FIG. 26 depicts the X-ray diffraction pattern of LT-$0.1LiCo_{0.85}Al_{0.15}O_2$•$0.9LiMn_{0.5}Ni_{0.5}O_2$.
Figure 27:
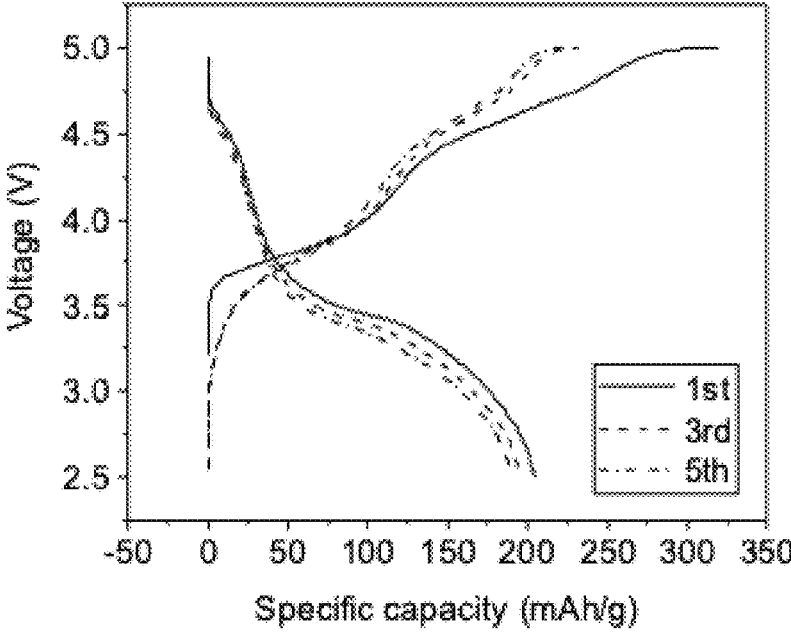
FIG. 27 depicts the first-cycle voltage (V) vs. specific capacity (mAh/g) plot of a Li/LT-$0.1LiCo_{0.85}Al_{0.15}O_2$•$0.9LiMn_{0.5}Ni_{0.5}O_2$ cell.

LT-$0.1LiCo_{0.85}Al_{0.15}O_2 \cdot 0.9LiMn_{0.5}Ni_{0.5}O_2$ was synthesized by the same method as described in Example 9. The X-ray diffraction (XRD) pattern of LT-$0.1LiCo_{0.85}Al_{0.15}O_2 \cdot 0.9LiMn_{0.5}Ni_{0.5}O_2$ is shown in FIG. 26. Li/LT-$0.1LiCo_{0.85}Al_{0.15}O_2 \cdot 0.9LiMn_{0.5}Ni_{0.5}O_2$ cells with a metallic Li anode were assembled and evaluated as described in Example 8. The voltage (V) vs. specific capacity (mAh/g) profile of a LT-$0.1LiCo_{0.85}Al_{0.15}O_2\cdot0.9LiMn_{0.5}Ni_{0.5}O_2$ cell, cycled between 5.0 and 2.5V for the first five cycles, is consistent with the profile of the cell in Example 8, as shown in FIG. 27. In this example, the lithiated spinel-lithiated-spinel electrode of Example 10 delivers slightly less capacity than the layered-lithiated spinel-lithiated spinel electrode of Example 9. This result emphasizes the utility of the layered $Li_2MnO_3$ component in Example 9, consistent with Example 8.

EXAMPLE 11

LT-$LiMn_{0.85}Ni_{0.6}Co_{0.01}Al_{0.04}O_2$ (a Ni-Rich Lithiated Spinel)

Figure 28:
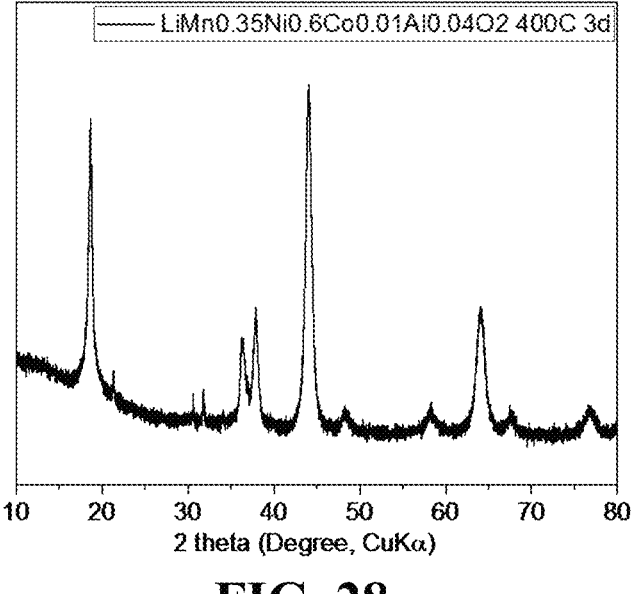
FIG. 28 depicts the X-ray diffraction pattern of LT-$LiMn_{0.35}Ni_{0.6}Co_{0.01}Al_{0.04}O_2$ electrode material, alternatively, LT-$Li_2Mn_{0.70}Ni_{1.2}Co_{0.02}Al_{0.08}O_4$, prepared at 400° C.
Figure 29:
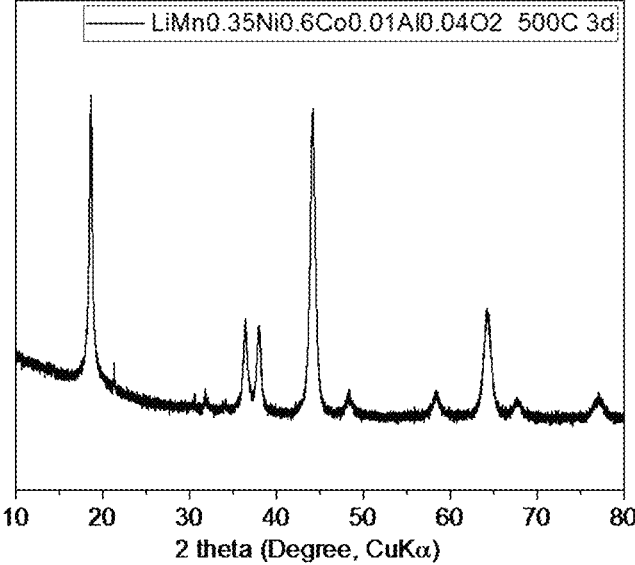
FIG. 29 depicts the X-ray diffraction pattern of LT-$LiMn_{0.35}Ni_{0.6}Co_{0.01}Al_{0.04}O_2$ electrode material, alternatively, LT-$Li_2Mn_{0.70}Ni_{1.2}Co_{0.02}Al_{0.08}O_4$, prepared at 500° C.

A $Mn_{0.35}Ni_{0.6}Co_{0.01}Al_{0.04}(OH)_2$ precursor was first prepared by a co-precipitation reaction in an aqueous solution containing manganese sulfate ($MnSO_4$), nickel sulfate ($NiSO_4$) cobalt sulfate ($CoSO_4$) and aluminum sulfate ($Al_2(SO_4)_3$). LT-$LiMn_{0.35}Ni_{0.6}Co_{0.01}Al_{0.04}O_2$ electrode materials (designated alternatively as LT-$LiMn_{0.70}Ni_{1.2}Co_{0.02}Al_{0.08}O_4$) were synthesized by a 'low-temperature' solid-state reaction of the $Mn_{0.35}Ni_{0.6}Co_{0.01}Al_{0.04}(OH)_2$ precursor and lithium carbonate ($Li_2CO_3$, >99%). Stoichiometric amounts of the precursors were thoroughly mixed using a mortar and pestle and fired in air at 400° C. and at 500° C. for approximately 72 hours. The heating rate for both samples was about 2° C. per minute. The samples were cooled in the furnace without controlling the cooling rate. The X-ray diffraction (XRD) patterns of LT-$LiMn_{0.35}Ni_{0.6}Co_{0.01}Al_{0.04}O_2$ (alternatively, LT-$Li_2Mn_{0.70}Ni_{1.2}Co_{0.02}Al_{0.08}O_4$), prepared at 400° C. and at 500° C., are shown in FIG. 28 and FIG. 29, respectively. Apart from a minor amount of an impurity product phase as indicated by the weak peaks between 20 and 30°2θ, these patterns are consistent with those reported for a LT-$LiMn_{0.5}Ni_{0.5}O_2$ electrode structure reported by Shi et al., in Chemical Communications, Volume 57, pages 11009 to 11012 (2021) that are described as being composed of intergrown disordered lithiated-spinel and layered components, the relative amounts of which are highly dependent on the synthesis temperature as reflected by the changes in the relative intensity of the diffraction peaks in FIGS. 28 and 29. This behavior provides a technique for tailoring the structural composition of the electrode and optimizing the number of stabilizing ions in the lithium-rich layers to enhance electrochemical performance.

Electrochemistry

Li/LT-$LiMn_{0.35}Ni_{0.6}Co_{0.01}Al_{0.04}O_2$ electrochemical cells were assembled and evaluated as follows: Coin-type cells (2032, Hohsen) were assembled in an argon-filled glovebox (<5 ppm $O_2$ and $H_2O$). The cathode consisted of approximately 84 wt % of LT-$LiMn_{0.35}Ni_{0.6}Co_{0.01}Al_{0.04}O_2$ powder, 8 wt % carbon, and 8 wt % polyvinylidene difluoride (PVDF) binder on an aluminum foil current collector. The anode was metallic lithium foil. The electrolyte was 1.2 M lithium hexafluorophosphate ($LiPF_6$) in a 3:7 mixture of ethylene carbonate and ethyl methyl carbonate. The coin cells were charged and discharged galvanostatically between 2.5 and 5.0 V at a constant current rate of approximately 15 mA/g. Electrochemical experiments were conducted at about 30° C.

Figure 30:
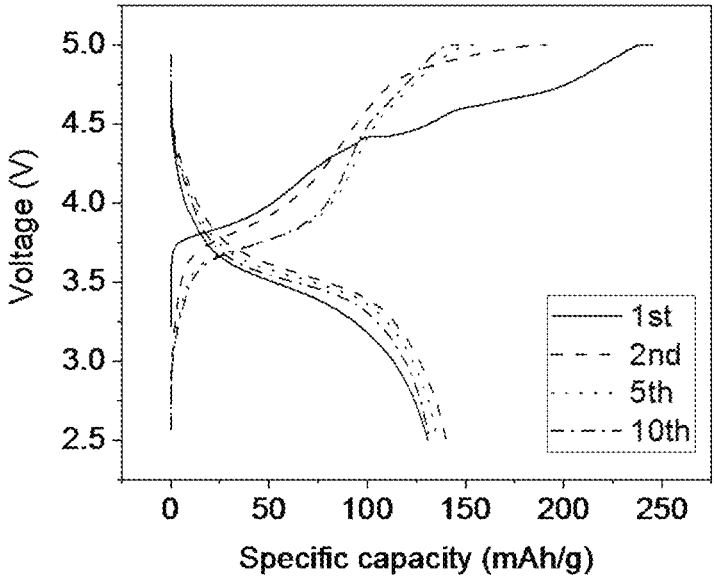
FIG. 30 depicts the electrochemical charge and discharge profiles of a lithium cell containing a Li/LT-$Li_2Mn_{0.70}Ni_{1.2}Co_{0.02}Al_{0.08}O_4$ cathode prepared at 400° C. for the first 10 cycles.
Figure 31:
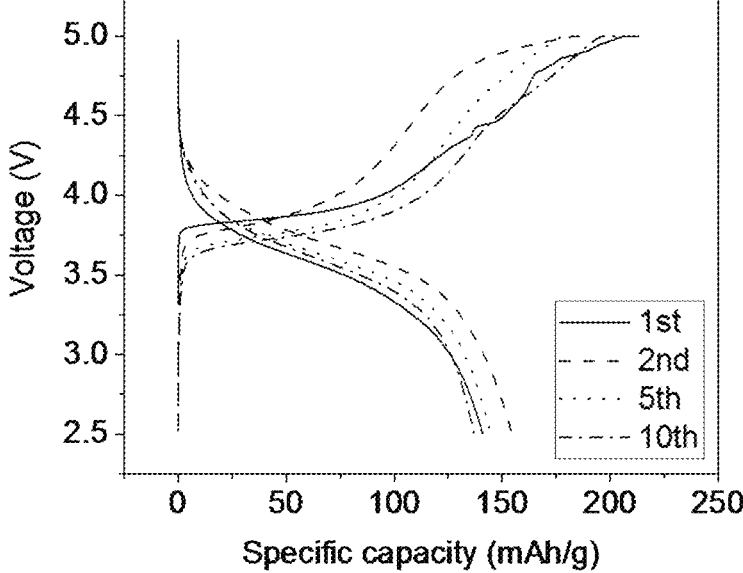
FIG. 31 depicts the electrochemical charge and discharge profiles of a lithium cell containing a Li/LT-$Li_2Mn_{0.70}Ni_{1.2}Co_{0.02}Al_{0.08}O_4$ cathode prepared at 500° C. for the first 10 cycles.

The electrochemical charge and discharge profiles of Li/LT-$LiMn_{0.35}Ni_{0.6}Co_{0.01}Al_{0.04}O_2$ cells with LT-$LiMn_{0.35}Ni_{0.6}Co_{0.01}Al_{0.04}O_2$ cathodes that had been annealed at 400 and 500° C. and cycled ten times, are shown in FIG. 30 and FIG. 31, respectively. Note that the capacity of both cells increased with cycling, yielding approximately 140 and 160 mAh/g on the $10^{th}$ cycle, respectively. The superior capacity of the electrode annealed at 500° C. is attributed to a greater conversion of the lithiated spinel component towards a layered configuration. Note also that the average discharge voltage of both cells increases with cycling.

Electrochemical Cells and Batteries

Figure 13:
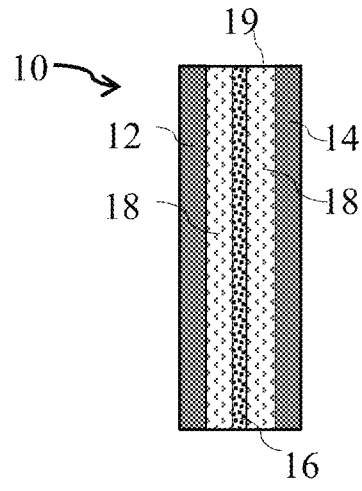
FIG. 13 depicts a schematic representation of an electrochemical cell.
Figure 14:
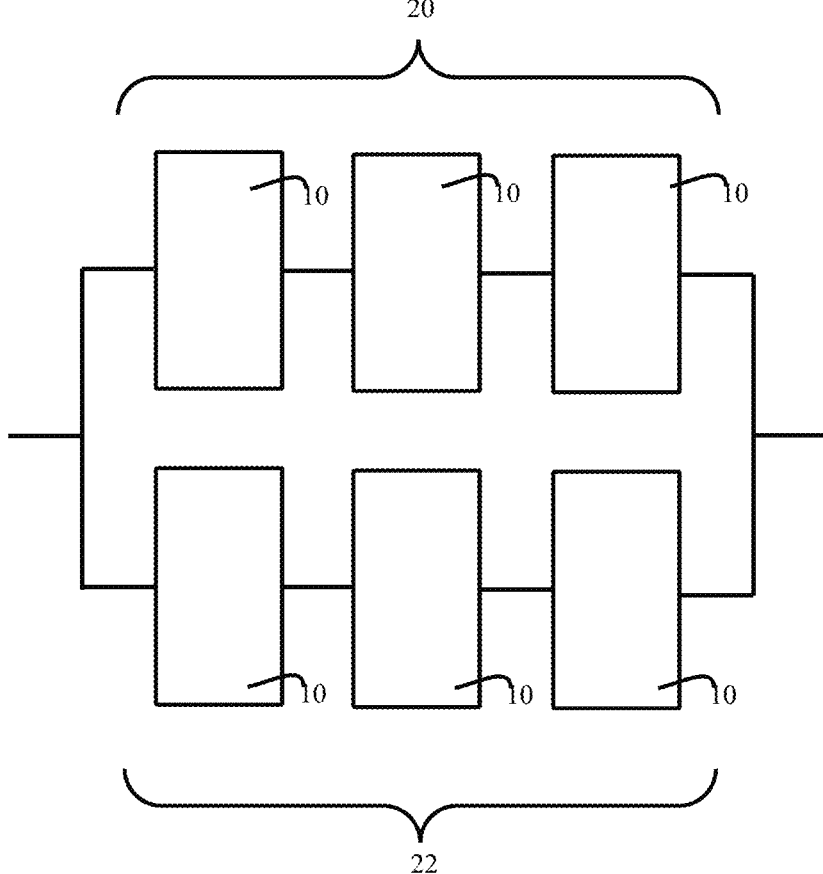
FIG. 14 depicts a schematic representation of a battery consisting of a plurality of cells connected electrically in series and in parallel.

FIG. 13 schematically illustrates a cross-sectional view of a lithium-ion electrochemical cell 10 comprising first electrode 12 comprising a lithiated spinel electrode active material as described herein, and a second electrode 14, with separator 16 therebetween. A lithium-containing electrolyte 18 (e.g., comprising a solution of a lithium salt in a non-aqueous solvent) contacts electrodes 12 and 14 and separator 16. The electrodes, separator and electrolyte are sealed within housing 19. FIG. 14 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing materials or methods (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the materials or methods described herein and does not pose a limitation on the scope of the claims unless otherwise stated. No language in the specification should be construed as indicating any non-claimed element as essential to the practice of the claims.

Preferred embodiments are described herein, including the best mode known to the inventors for carrying out the claimed invention. Variations of those preferred embodiments may become apparent to those of ordinary skill in the art upon reading the foregoing description. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

The embodiments of the invention in which an exclusive property or privilege is claimed are defined as follows:

1. A composite electrode active material comprising a first electrode active material blended or structurally-integrated with a second electrode active material that is different from the first electrode active material;

wherein the electrode active composite material is a lithiated spinel-lithiated spinel of formula $aLiM^1O_2\bullet(1-a)LiM^7O_2$ in which a is about 0.9; wherein the first electrode active material is a lithiated spinel of formula $LiM^1O_2$, wherein $M^1$ comprises a combination of Mn and Ni transition metal ions in a ratio of Mn to Ni ions of about 2:1 to about 1:1; and the second electrode active material is a lithiated-spinel of formula $LiM^7O_2$, wherein $M^7$ comprises two or more cations selected from the group consisting of a Mn cation, a Ni cation, a Co cation, and a $M^6$ cation; wherein $M^6$ comprises at least one cation other than Mn, Ni, and Co cations.

2. The electrode active material of claim 1, wherein $M^6$ is at least one cation of a metal selected from the group consisting of Al, Ga, Mg, and Ti.

3. The electrode active composite material of claim 2, wherein the lithiated spinel-lithiated spinel is a material of formula $0.9LiMn_{0.5}Ni_{0.5}O_2\bullet0.1LiCo_{0.85}Al_{0.15}O_2$.

4. The electrode active material of claim 1, wherein a portion of the oxygen thereof is replaced by fluorine.

5. The electrode active composite material of claim 1, wherein the metal ions of the lithiated spinel of the first and second electroactive materials are partially disordered relative to an ideal lithiated spinel structure.

6. An electrochemical cell comprising an anode, a cathode, and a lithium-containing electrolyte contacting the anode and cathode, wherein the cathode comprises the electrode active composite material of claim 1.

7. A battery comprising a plurality of the electrochemical cell of claim 6 electrically connected in series, in parallel, or in both series and parallel.

8. A composite electrode active material comprising a first electrode active material that is structurally-integrated with a second electrode active material;

wherein:

the first electrode active material is a layered material of empirical formula $Li_2M^4O_3$, wherein $M^4$ is at least one metal cation selected from the group consisting of a Mn cation, a Ti cation, and a Zr cation;

the second electrode active material is a lithiated spinel of formula $LiM^1O_2$, wherein $M^1$ comprises a combination of Mn and Ni transition metal ions in a ratio of Mn to Ni ions of about 2:1 to about 1:1; and the composite electrode active material is a layered-lithiated spinel material of formula $bLi_2M^4O_3\bullet(1-b)LiM^1O_2$, in which b is about 0.1.

9. The composite electrode active material of claim 8, wherein the material of formula $LiM^1O_2$ comprises domains of a disordered lithiated-spinel component, a disordered layered component, and a disordered rock salt component, in which the oxygen lattice of the components is cubic-close packed, and in which greater than 0 percent and less than 20 percent of lithium ions of the lithiated spinel and layered components are disordered among the octahedral sites normally occupied by the transition metal ions, and a corresponding percentage of the transition metal ions are disordered among the octahedral sites normally occupied by lithium ions, in fully-ordered, lithiated spinel and layered structures.

10. The composite material of claim 9, wherein greater than about 1 percent and less than 20 percent of the lithium ions of the material of formula $bLi_2M^4O_3\bullet(1-b)LiM^1O_2$ are disordered among the octahedral sites normally occupied by the transition metal ions, and a corresponding percentage of the transition metal ions are disordered among the octahedral sites normally occupied by lithium ions, in fully-ordered, lithiated spinel and layered structures.

11. The composite material of claim 9, wherein greater than 10 percent and less than 20 percent of the lithium ions of the material of formula $bLi_2M^4O_3\bullet(1-b)LiM^1O_2$ are disordered among the octahedral sites normally occupied by the transition metal ions, and a corresponding percentage of the transition metal ions are disordered among the octahedral sites normally occupied by lithium ions, in fully-ordered, lithiated spinel and layered structures.

12. The composite electrode active material of claim 8, wherein in $M^1$ is $M^2_{(1-w)}M^3_w$; $M^2$ comprises a combination of Mn and Ni transition metal ions; and $M^3$ is at least one metal cation selected from the group consisting of an Al cation, a Ga cation, a Mg cation, a Ti cation; and a Co cation; and $0<w\leq0.1$.

13. The composite electrode active material of claim 8, wherein the composite electrode active material is a structurally integrated layered-lithiated spinel of formula $0.1Li_2MnO_3\bullet0.9LiMn_{0.5}Ni_{0.5}O_2$.

14. An electrode active material comprising the electrode active composite material of claim 8, mechanically blended with or structurally integrated with a lithiated spinel of formula $LiM^7O_2$; wherein $M^7$ comprises two or more cations selected from the group consisting of a Mn cation, a Ni cation, a Co cation, and a $M^6$ cation; and $M^6$ comprises at least one cation other than Mn, Ni, and Co cations.

15. The electrode active material of claim 14, wherein $M^6$ is at least one cation of a metal selected from the group consisting of Al, Ga, Mg, and Ti.

16. An electrode active material comprising the composite electrode active material of claim 8, mechanically blended with or structurally integrated with a layered compound of formula $LiM^5O_2$, wherein $M^5$ comprises at least one first row transition metal cation.

17. The composite material of claim 16, wherein $M^5$ further comprises at least one non-transition metal cation.

18. The electrode active material of claim 8, wherein a portion of the oxygen thereof is replaced by fluorine.

19. The electrode active composite material of claim 8, wherein the metal ions of the lithiated spinel of the second electroactive material are partially disordered relative to an ideal lithiated spinel structure.

20. An electrochemical cell comprising an anode, a cathode, and a lithium-containing electrolyte contacting the anode and cathode, wherein the cathode comprises the electrode active composite material of claim 8.

21. A battery comprising a plurality of the electrochemical cell of claim 20 electrically connected in series, in parallel, or in both series and parallel.

22. An electrode active composite material comprising a first electrode active material that is mechanically blended with or structurally-integrated with a second electrode active material different from the first electrode active material, and a third electrode active material different from the first and second electrode active materials;
  wherein:
    the first electrode active material is a layered material of formula $Li_2M^4O_3$, wherein $M^4$ is at least one metal cation selected from the group consisting of a Mn cation, a Ti cation, and a Zr cation;
    the second electrode active material is a lithiated spinel of formula $LiM^1O_2$, wherein $M^1$ comprises a combination of Mn and Ni transition metal ions in a ratio of Mn to Ni ions of about 2:1 to about 1:1; and
    the third electrode active material is a lithiated spinel of formula $LiM^7O_2$, wherein $M^7$ comprises two or more cations selected from the group consisting of a Mn cation, a Ni cation, a Co cation, and a $M^6$ cation; and $M^6$ comprises at least one cation other than Mn, Ni, and Co cations;
    wherein the composite electrode active material is a structurally integrated layered-lithiated spinel-lithiated spinel of formula $cLi_2M^4O_3 \cdot (1-c-d)LiM^1O_2 \cdot dLiM^7O_2$ in which $0 < |c-d| < 1$; $0 < c < 0.2$; and $0 < d < 0.8$.

23. The electrode active composite material of claim 22, wherein $M^6$ is at least one cation of a metal selected from the group consisting of Al, Ga, Mg, and Ti.

24. The composite material of claim 22, wherein the composite electrode active material is a structurally integrated layered-lithiated spinel-lithiated spinel material of formula
$0.1Li_2MnO_3 \cdot 0.8LiMn_{0.5}Ni_{0.5}O_2 \cdot 0.1LiCo_{0.85}Al_{0.15}O_2$.

25. The electrode active material of claim 22, wherein a portion of the oxygen thereof is replaced by fluorine.

26. The electrode active composite material of claim 22, wherein the metal ions of the lithiated spinel of the second and third electroactive materials are partially disordered relative to an ideal lithiated spinel structure.

27. An electrochemical cell comprising an anode, a cathode, and a lithium-containing electrolyte contacting the anode and cathode, wherein the cathode comprises the electrode active composite material of claim 22.

28. A battery comprising a plurality of the electrochemical cell of claim 27 electrically connected in series, in parallel, or in both series and parallel.

29. An electrode active composite material comprising a first electrode active material that is mechanically blended with or structurally-integrated with a second electrode active material different from the first electrode active material, and a third electrode active material different from the first and second electrode active materials;
  wherein:
    the first electrode active material is a layered material of formula $Li_2M^4O_3$, wherein $M^4$ is at least one metal cation selected from the group consisting of a Mn cation, a Ti cation, and a Zr cation;
    the second electrode active material is a lithiated spinel of formula $LiM^1O_2$, wherein $M^1$ comprises a combination of Mn and Ni transition metal ions in a ratio of Mn to Ni ions of about 2:1 to about 1:1; and
    the third electrode active material is a layered material of formula $LiM^5O_2$; wherein $M^5$ comprises at least one first-row transition metal cation;
    wherein the composite electrode active material is a structurally-integrated layered-lithiated spinel-layered material of formula $eLi_2M^4O_3 \cdot (1-e-f)LiM^1O_2 \cdot fLiM^5O_2$ in which $0 < |e-f| < 1$; $0 < e < 0.2$; and $0 < f < 0.8$.

30. The electrode active composite material of claim 29, wherein $M^5$ additionally comprises at least one non-transition metal cation.

31. The electrode active composite material of claim 29, wherein $M^5$ is a combination of at least one first-row transition metal cation and at least one non-transition metal cation selected from the group consisting of an Al cation, a Ga cation, and a Mg cation.

32. The electrode active composite material of claim 29, wherein the layered-lithiated spinel-layered material is a compound of formula $0.1Li_2MnO_3 \cdot 0.8LiMn_{0.5}Ni_{0.5}O_2 \cdot 0.1LiCo_{0.98}Ti_{0.01}Mg_{0.01}O_2$.

33. The electrode active material of claim 29, wherein a portion of the oxygen thereof is replaced by fluorine.

34. The electrode active composite material of claim 29, wherein the metal ions of the lithiated spinel of the second electroactive material are partially disordered relative to an ideal lithiated spinel structure.

35. An electrochemical cell comprising an anode, a cathode, and a lithium-containing electrolyte contacting the anode and cathode, wherein the cathode comprises the electrode active composite material of claim 29.

36. A battery comprising a plurality of the electrochemical cell of claim 35 electrically connected in series, in parallel, or in both series and parallel.

* * * * *